US011218241B2

(12) United States Patent
Shin et al.

(10) Patent No.: US 11,218,241 B2
(45) Date of Patent: Jan. 4, 2022

(54) DMRS PORT GROUPING METHOD AND APPARATUS FOR USE IN WIRELESS CELLULAR COMMUNICATION SYSTEM

(71) Applicant: Samsung Electronics Co., Ltd., Gyeonggi-do (KR)

(72) Inventors: Cheolkyu Shin, Gyeonggi-do (KR); Youngwoo Kwak, Gyeonggi-do (KR); Hoondong Noh, Gyeonggi-do (KR); Taehan Bae, Seoul (KR); Jeongho Yeo, Gyeonggi-do (KR); Jinyoung Oh, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/871,639

(22) Filed: May 11, 2020

(65) Prior Publication Data
US 2020/0343989 A1    Oct. 29, 2020

Related U.S. Application Data

(63) Continuation of application No. 16/111,935, filed on Aug. 24, 2018, now Pat. No. 10,651,963.

(30) Foreign Application Priority Data

Aug. 24, 2017   (KR) .................. 10-2017-0107485
Sep. 1, 2017    (KR) .................. 10-2017-0111949
(Continued)

(51) Int. Cl.
*H04J 13/12*     (2011.01)
*H04W 76/27*    (2018.01)
(Continued)

(52) U.S. Cl.
CPC .............. *H04J 13/12* (2013.01); *H04J 13/00* (2013.01); *H04J 13/0003* (2013.01);
(Continued)

(58) Field of Classification Search
CPC ........ H04J 13/12; H04J 13/00; H04J 13/0003; H04J 2013/0096; H04W 76/27;
(Continued)

(56) References Cited

U.S. PATENT DOCUMENTS

2012/0057562 A1    3/2012   Kim et al.
2015/0003356 A1    1/2015   Seo et al.
(Continued)

FOREIGN PATENT DOCUMENTS

EP           3 471 326        4/2019

OTHER PUBLICATIONS

ITL, "Remaining Details on DMRS Configuration for NR", R1-1714464, 3GPP TSG RAN WG1 Meeting #90, Aug. 21-25, 2017, 8 pages.
(Continued)

*Primary Examiner* — Duc C Ho
(74) *Attorney, Agent, or Firm* — The Farrell Law Firm, P.C.

(57) ABSTRACT

The present disclosure relates to a communication method and system for converging a 5$^{th}$ Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
A method of a terminal in a wireless communication system is provided. The method includes identifying demodulation reference signal (DMRS) type information and DMRS symbol length information, identifying port number information for receiving a DMRS and receiving the DMRS based on the
(Continued)

DMRS type information, the DMRS symbol length information and port number information, wherein the port number information indicates a port number for the terminal in DMRS information including parameters for code division multiplexing (CDM) group information, offset information, frequency-domain orthogonal cover code (OCC) information, and time-domain OCC information corresponding respectively to multiple port numbers, and wherein the DMRS information is defined per DMRS type.

20 Claims, 21 Drawing Sheets

(30) Foreign Application Priority Data

Sep. 29, 2017 (KR) .................. 10-2017-0128078
Nov. 10, 2017 (KR) .................. 10-2017-0149873

(51) Int. Cl.
| | | |
|---|---|---|
| *H04L 1/18* | (2006.01) | |
| *H04W 72/04* | (2009.01) | |
| *H04J 13/00* | (2011.01) | |
| *H04L 5/00* | (2006.01) | |
| *H04B 7/0413* | (2017.01) | |

(52) U.S. Cl.
CPC .......... *H04L 1/1861* (2013.01); *H04L 5/0016* (2013.01); *H04L 5/0023* (2013.01); *H04L 5/0048* (2013.01); *H04L 5/0051* (2013.01); *H04W 72/042* (2013.01); *H04W 76/27* (2018.02); *H04B 7/0413* (2013.01); *H04J 2013/0096* (2013.01)

(58) Field of Classification Search
CPC .. H04W 72/042; H04L 1/1861; H04L 5/0016; H04L 5/0023; H04L 5/0048; H04L 5/0051; H04B 7/0413
See application file for complete search history.

(56) References Cited

U.S. PATENT DOCUMENTS

| | | |
|---|---|---|
| 2016/0255519 A1 | 9/2016 | Cheng et al. |
| 2017/0223695 A1 | 8/2017 | Kwak |
| 2019/0140801 A1* | 5/2019 | Ko ............... H04L 27/2613 |
| 2019/0260528 A1 | 8/2019 | Ko |
| 2020/0028643 A1 | 1/2020 | Kim et al. |

OTHER PUBLICATIONS

LG Electronics, "On DL and UL DMRS Design", R1-1713156, 3GPP TSG RAN WG1 Meeting #90, Aug. 21-25, 2017, 16 pages.
International Search Report dated Dec. 3, 2018 issued in counterpart application No. PCT/KR2018/009830, 3 pages.
Huawei, HiSilicon, "Signaling of DMRS Ports for SU/MU-MIMO", R1-1713772, 3GPP TSG RAN WG1 Meeting #90, Aug. 21-25, 2017, 14 pages.
CATT, "On DMRS Design for DL", R1-1712383, 3GPP TSG RAN WG1 Meeting #90, Aug. 21-25, 2017, 8 pages.
European Search Report dated Jun. 3, 2020 issued in counterpart application No. 18848725.0-1220, 11 pages.

* cited by examiner

FIG. 6B $$\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

a  b  c  d  →

Layer ↓

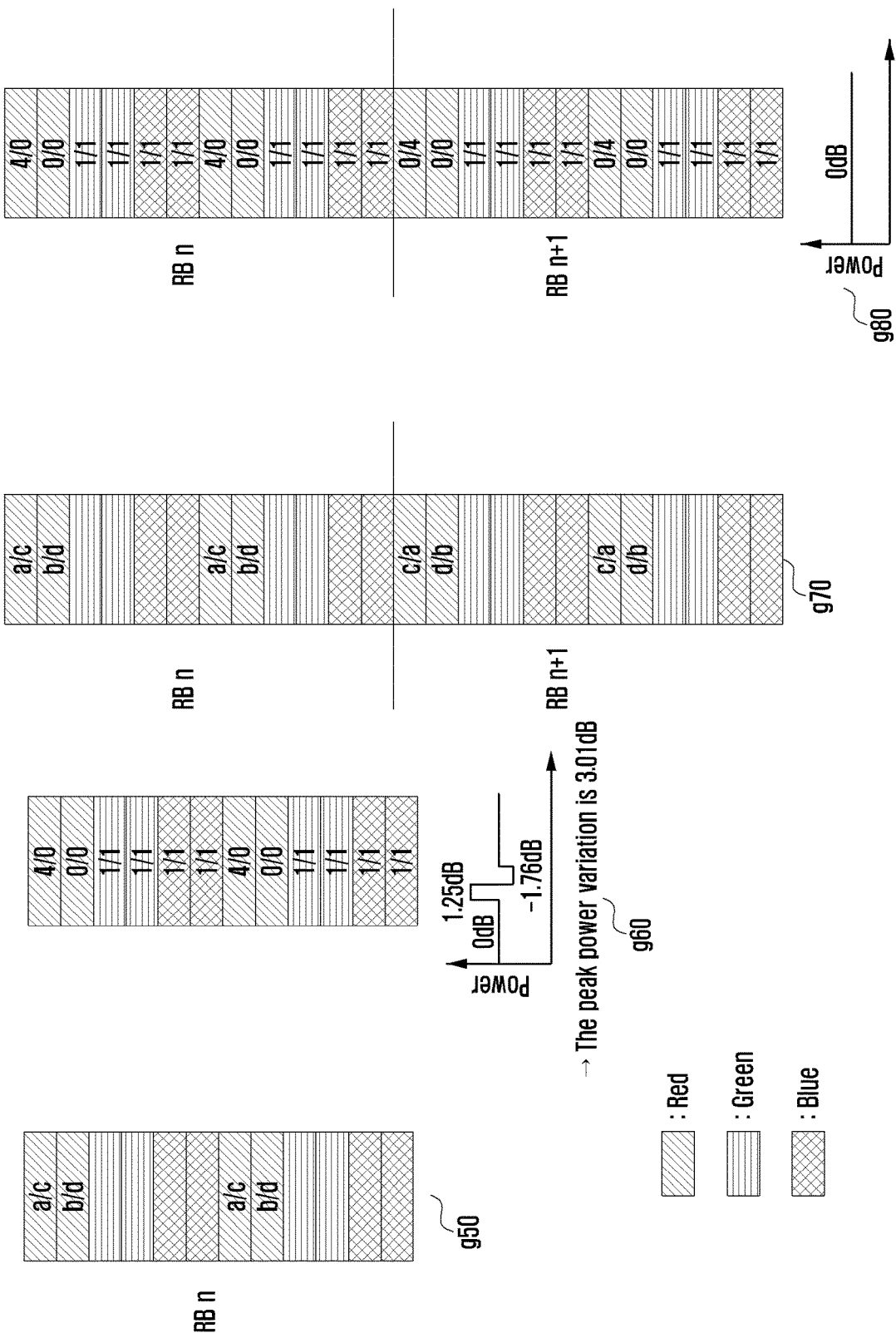

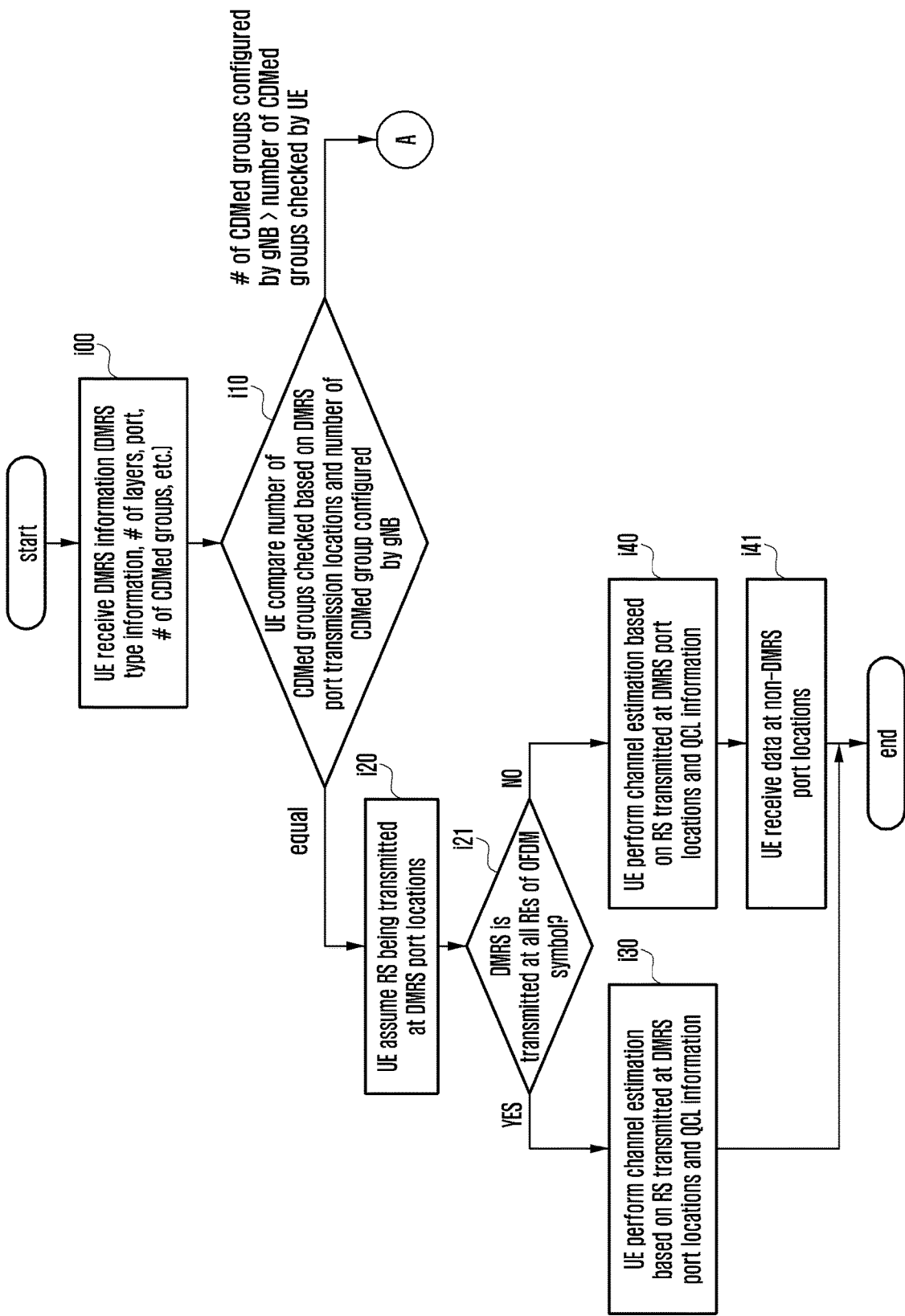

FIG. 10C
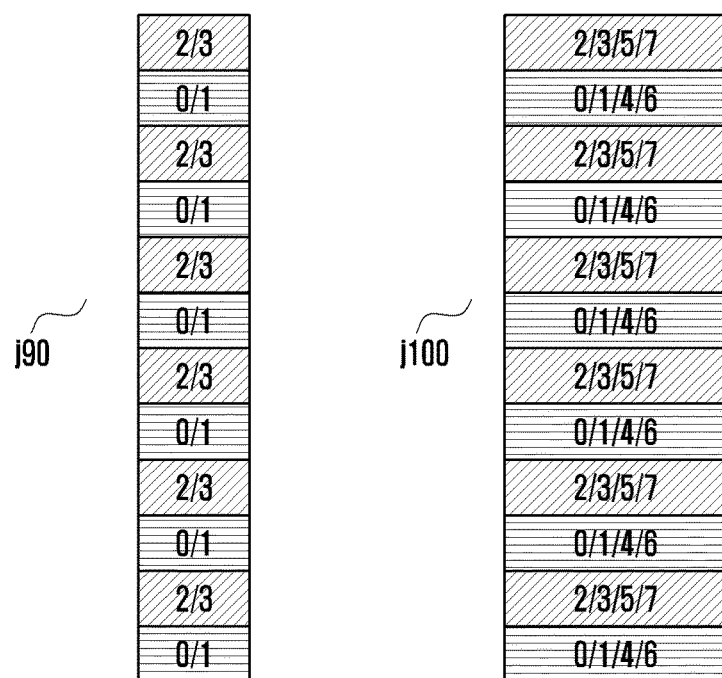
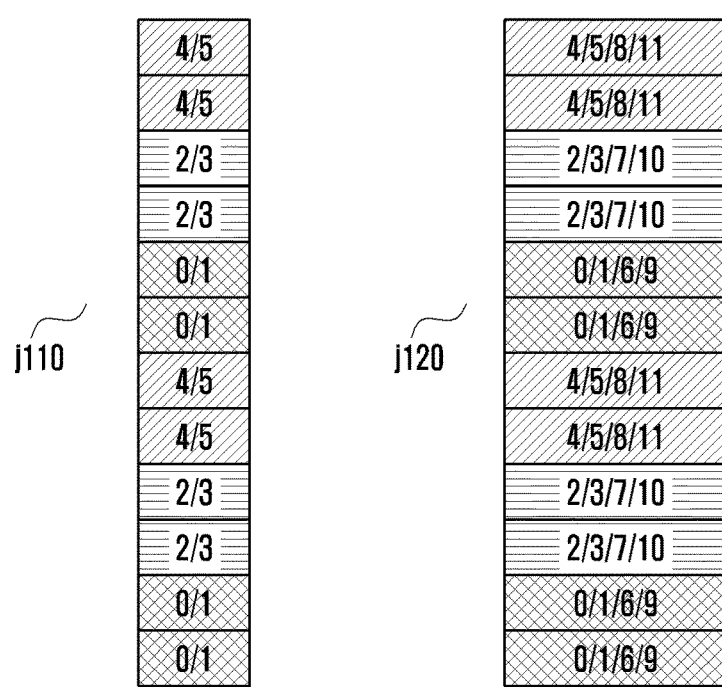

DMRS PORT GROUPING METHOD AND APPARATUS FOR USE IN WIRELESS CELLULAR COMMUNICATION SYSTEM

CROSS-REFERENCE TO RELATED APPLICATION(S)

This application is a Continuation Application of U.S. Pat. No. 10,651,963, scheduled to issue on May 12, 2020, which is based on and claims priority under 35 U.S.C. § 119(a) to Korean Patent Application Serial No. 10-2017-0107485, which was filed on Aug. 24, 2017 in the Korean Intellectual Property Office, Korean Patent Application Serial No. 10-2017-0111949, which was filed on Sep. 1, 2017 in the Korean Intellectual Property Office, Korean Patent Application Serial No. 10-2017-0128078, which was filed on Sep. 29, 2017 in the Korean Intellectual Property Office, and Korean Patent Application Serial No. 10-2017-0149873, which was filed on Nov. 10, 2017 in the Korean Intellectual Property Office, the entire disclosure of each of which is incorporated herein by reference.

BACKGROUND

1. Field

The present disclosure relates, generally, to a wireless communication system, and more particularly, to a method for a base station to group demodulation reference signal (DMRS) ports and transmit DMRS port group information to a terminal.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a wireless communication system, a base station transmits a reference signal for use by a terminal in estimating a channel. The terminal may perform channel estimation based on the reference signal and demodulate received signals with the channel estimation result. The terminal may also estimate channel condition base on the reference signal and report the estimated channel condition to the base station. Unlike the legacy LTE systems, the $5^{th}$ generation (5G) wireless communication systems are designed to support an increased number of orthogonal DMRS antenna ports, an increased number of cell-IDs, an increased channel bandwidth, various subcarrier spacings, slot-based transmission and slot aggregation, DMRS bundling in time domain, and a configurable DMRS structure. In order to support such features, the base station has to generate DMRS and transmit DMRS-related information to a terminal in a method different from that currently being used for the legacy LTE systems.

SUMMARY

The present disclosure has been made to address at least the disadvantages described above and to provide at least the advantages described below.

An aspect of the disclosure provides a DMRS port grouping and signaling method in a 5G wireless communication system supporting non-coherent joint transmission (NC-JT). An aspect of the disclosure provides a method for generating additional DMRS and signaling additional DMRS information in the 5G wireless communication system.

In accordance with an aspect of the disclosure, there is provided a method of a terminal in a wireless communication system. The method includes identifying demodulation reference signal (DMRS) type information and DMRS symbol length information, identifying port number information for receiving a DMRS and receiving the DMRS based on the DMRS type information, the DMRS symbol length information and port number information, wherein the port number information indicates a port number for the terminal in DMRS information including parameters for code division multiplexing (CDM) group information, offset information, frequency-domain orthogonal cover code (OCC) information, and time-domain OCC information corresponding respectively to multiple port numbers, and wherein the DMRS information is defined per DMRS type.

In accordance with an aspect of the disclosure, there is provided a terminal in a wireless communication system. The terminal includes a transceiver and a controller operably connected to the transceiver and configured to identified demodulation reference signal (DMRS) type information and DMRS symbol length information, identified port number information for receiving a DMRS, and control the transceiver to receive the DMRS based on the DMRS type information, the DMRS symbol length information and port number information, wherein the port number information indicates a port number for the terminal in DMRS information including parameters for code division multiplexing (CDM) group information, offset information, frequency-domain orthogonal cover code (OCC) information, and time-domain OCC information corresponding respectively to multiple port numbers, and wherein the DMRS information is defined per DMRS type.

In accordance with an aspect of the disclosure, there is provided a method of a base station in a wireless communication system. The method includes transmitting a first message associated with demodulation reference signal (DMRS) type information and DMRS symbol length information, transmitting a second message including port number information for receiving a DMRS by a terminal and transmitting the DMRS to the terminal based on the information included in the first and second messages, wherein the port number information indicates a port number for the terminal in DMRS information including parameters for code division multiplexing (CDM) group information, offset information, frequency-domain orthogonal cover code (OCC) information, and time-domain OCC information corresponding respectively to multiple port numbers, and wherein the DMRS information is defined per DMRS type.

In accordance with an aspect of the disclosure, there is provided a base station in a wireless communication system. The base station includes a transceiver and a controller operably connected to the transceiver and configured to control the transceiver to transmit a first message associated with demodulation reference signal (DMRS) type information and DMRS symbol length information, transmit a second message including port number information for receiving a DMRS by a terminal, and transmit the DMRS to the terminal based on the information included in the first and second messages, wherein the port number information indicates a port number for the terminal in DMRS information including parameters for code division multiplexing (CDM) group information, offset information, frequency-domain orthogonal cover code (OCC) information, and time-domain OCC information corresponding respectively to multiple port numbers, and wherein the DMRS information is defined per DMRS type.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 6B is a diagram of CDM with OCC of length 4, according to an embodiment;

FIGS. 7A to 7C are diagrams of a power imbalance problem;

FIGS. 9A to 9B are flowcharts of a method for a UE to receive information on a number of CDM groups and operate based on the received information, according to an embodiment;

FIGS. 10A to 10C are diagrams of a signaling overhead reduction method, according to the embodiment;

DETAILED DESCRIPTION

Figure 1:
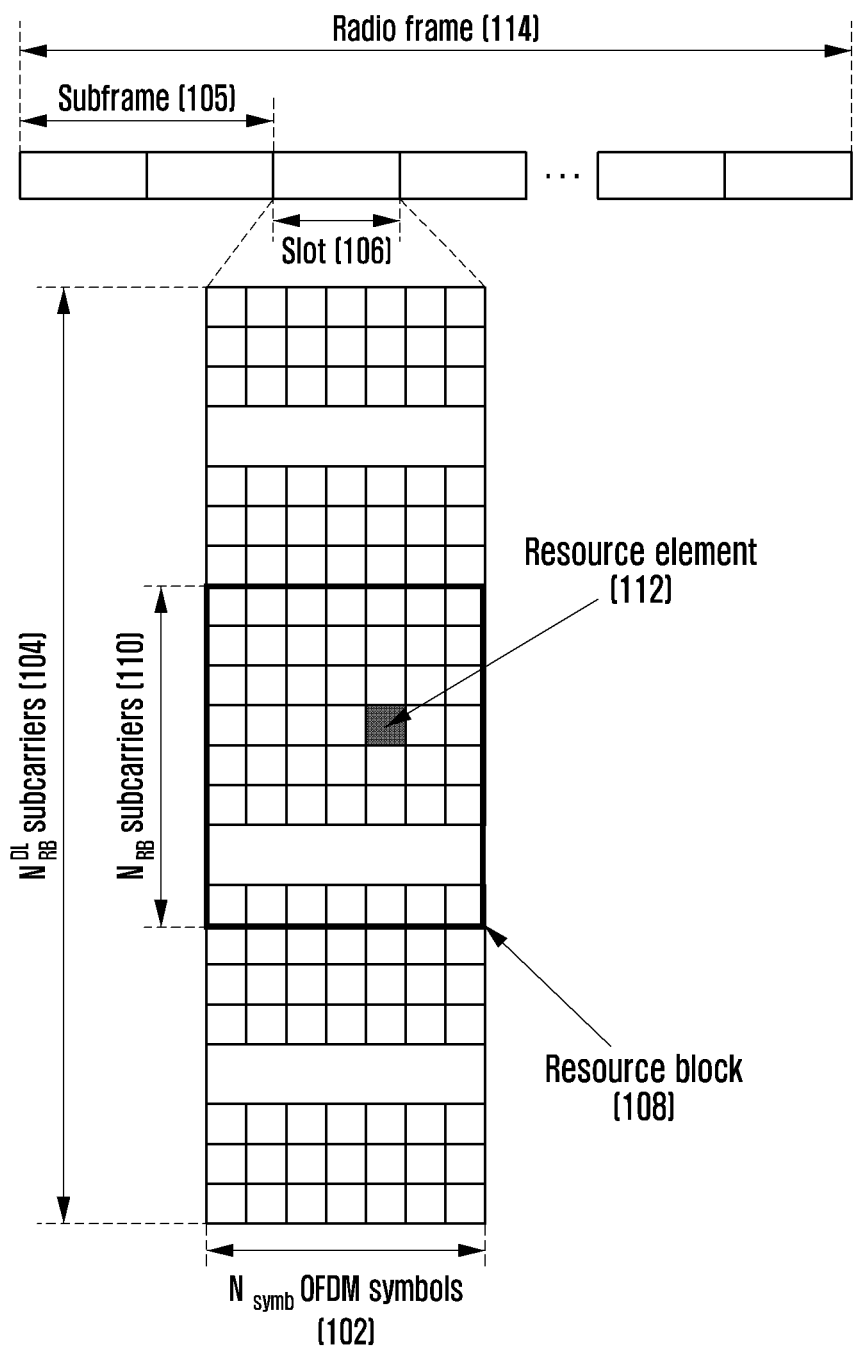
FIG. 1 is a diagram of a basic time-frequency resource structure for transmitting downlink data or control channels in the legacy LTE/LTE-advanced (LTE-A) system.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Mobile communication systems have evolved to a high-speed, high-quality packet data communication systems (such as high speed packet access (HSPA), LTE (or evolved universal terrestrial radio access (E-UTRA)), and LTE-A defined in $3^{rd}$ generation partnership project (3GPP), high rate packet data (HRPD) defined in $3^{rd}$ GPP-2 (3GPP2), and 802.16e defined in IEEE) that are capable of providing data and multimedia services beyond the early voice-oriented services. 5G wireless communications are being standardized under the title of 5G or new radio (NR).

The LTE system, as one of the representative broadband wireless communication systems, uses orthogonal frequency division multiplexing (OFDM) in the downlink and single carrier frequency division multiple access (SC-FDMA) in the uplink. The term uplink denotes a radio transmission path from a terminal which is interchangeably referred to as a UE) and a mobile station (MS) to a base station (BS) which is interchangeably referred to as an evolved node B (eNB), and the term downlink denotes a radio transmission path from a base station to a terminal. Such multiple access schemes allocate time-frequency resources for transmitting user-specific data and control information without overlapping each other, i.e. maintaining orthogonality, so as to distinguish among user-specific data and control information.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of a basic time-frequency resource structure for transmitting downlink data or control channels in the legacy LTE/LTE-A system.

In FIG. 1, the horizontal axis denotes the time, and the vertical axis denotes the frequency. The smallest transmission unit in the time domain is an OFDM symbol, and $N_{symb}$ OFDM symbols 102 forms a slot 106, and 2 slots forms a subframe 105. Each slot spans 0.5 ms, and each subframe spans 1.0 ms. A radio frame 114 is a time unit consisted of 10 subframes. In the frequency domain, the smallest transmission unit is a subcarrier, and the total system transmission bandwidth consists of $N_{BW}$ subcarriers 104.

In the time-frequency resource structure, the basic resource unit is a resource element (RE) indicated by an OFDM symbol index and a subcarrier index. An RB (or physical resource block (PRB) 108 is defined by $N_{symb}$ consecutive OFDM symbols 102 in the time domain and $N_{RB}$ consecutive subcarriers 110 in the frequency domain. One RB 108 consists of $N_{symb} \times N_{RB}$ REs 112. Typically, the RB is the smallest data transmission unit. In the LTE system, $N_{symb}=7$, $N_{RB}=12$, and $N_{RB}^{DL}$ is proportional to the system transmission bandwidth. The data rate increased in proportion to the number of RBs scheduled to the terminal. For the LTE system, 6 transmission bandwidths are defined. When a frequency division duplex (FDD) system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. An LTE system having 10 MHz channel bandwidth uses the transmission bandwidth of 50 RBs.

TABLE 1

| | Channel bandwidth $BW_{Channel}$ [MHz] | | | | |
|---|---|---|---|---|---|
| 1.4 | 3 | 5 | 10 | 15 | 20 |
| Transmission bandwidth configuration $N_{RB}$ | | | | | |
| 6 | 15 | 25 | 50 | 75 | 100 |

Figure 2:
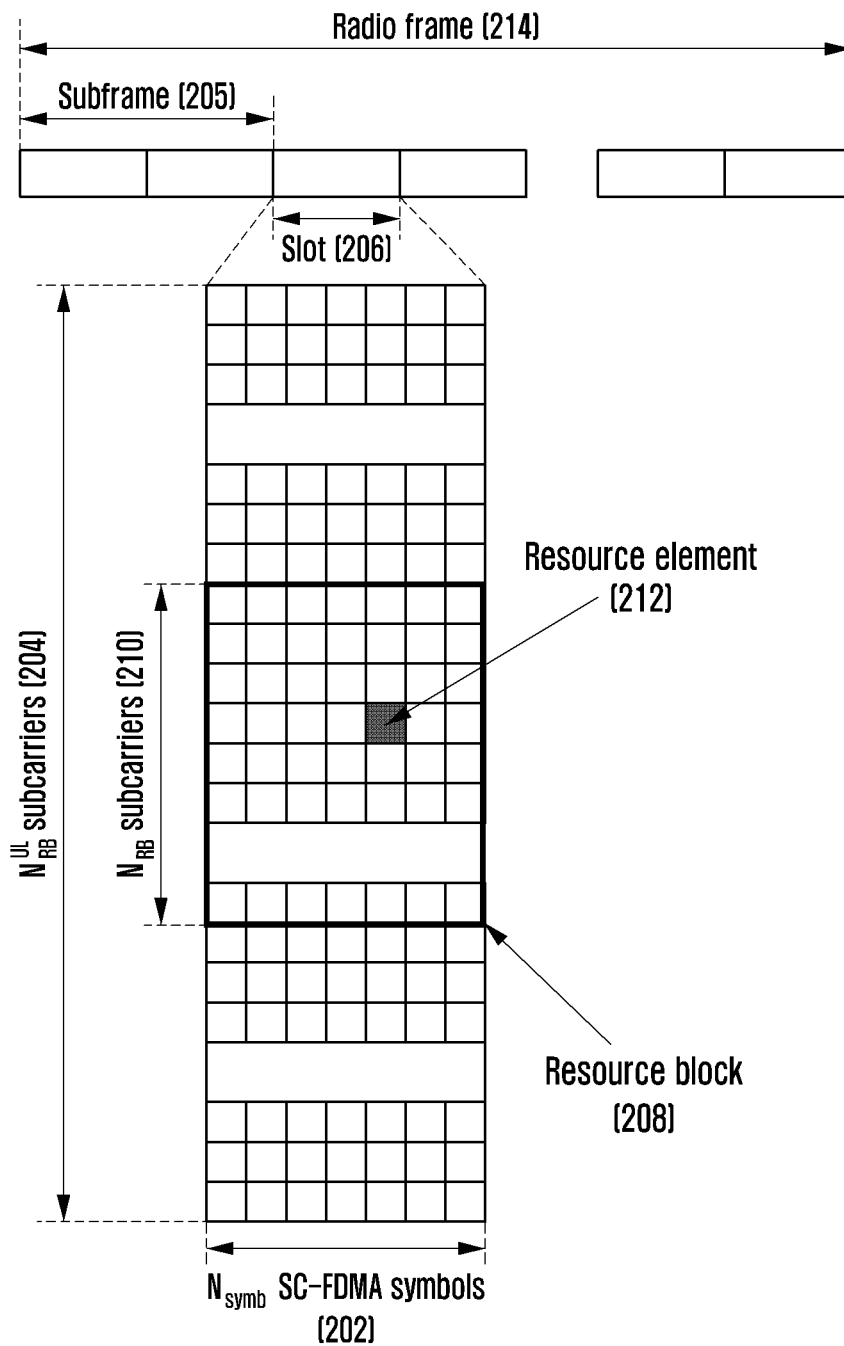
FIG. 2 is a diagram of a basic time-frequency resource structure of the radio resource for data and/or control information in uplink of LTE and LTE-A systems.

FIG. 2 is a diagram of a basic time-frequency resource structure of the radio resource for data and/or control information in the uplink of the legacy LTE/LTE-A system.

In FIG. 2, the horizontal axis denotes the time, and the vertical axis denotes the frequency. The smallest transmission unit in the time domain is SC-FDMA symbol, and $N_{symb}$ SC-FDMA symbols 202 form a slot 206. Two slots form a subframe 205. The smallest transmission unit in the frequency domain is subcarrier, and the total system transmission bandwidth consists of $N_{RB}^{UL}$ subcarriers 204. $N_{RB}^{UL}$ is proportional with the system transmission bandwidth.

Figure 3:
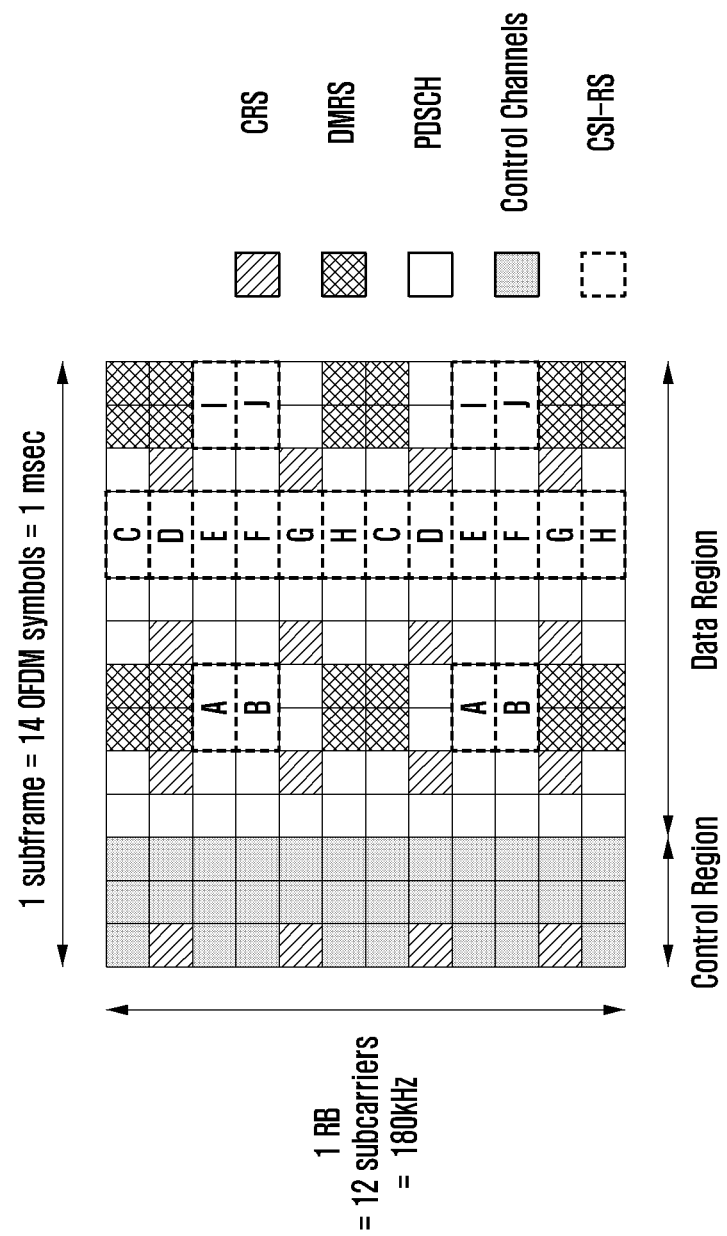
FIG. 3 is a diagram of radio resources corresponding to one resource block (RB) as a smallest downlink scheduling unit in the LTE/LTE-A system.

In the time-frequency domain, the basic resource unit is RE 212, and each RE is defined by one SC-FDMA symbol index and one subcarrier index. An RB or PRB 208 is defined by $N_{symb}$ consecutive SC-FDMA symbols in the time domain and $N_{RB}$ consecutive subcarriers in the frequency domains. Accordingly, one RB consists of $N_{symb} \times N_{RB}$ REs. Typically, the smallest data or control information transmission unit is RB. A physical uplink control channel (PUCCH) is mapped to a frequency region corresponding to one RB and transmitted during a time period of one subframe. FIG. 3 is a diagram of radio resources corresponding to one RB as a smallest downlink scheduling unit in LTE/LTE-A. As shown in FIG. 3, the radio resources are allocated for transmitting different signals as follows:

1. Cell-specific Reference Signal (CRS): This is a reference signal broadcast periodically for use commonly by all UEs within one cell;

2. DMRS: This is a reference signal transmitted for specific UE and used only for transmitting data to corresponding UE. It may be possible to support up to 8 DMRS ports. In LTE/LTE-A, antenna ports 7 to 14 are assigned for DMRS and these ports maintain orthogonality with CDM or FDM to avoid interference to each other;

3. Physical downlink shared channel (PDSCH): This is a downlink channel for traffic from an eNB to a UE. The eNB may transmit data using REs to which no reference signal is mapped in the data region in FIG. 3;

4. Channel status information reference signal (CSI-RS): This is a reference signal transmitted for use by UEs within a cell in channel status measurement. There may be multiple CSI-RSs transmitted within a cell; and 5. Other control channels (physical hybrid-ARQ indicator channel (PHICH), physical control format indicator channel (PCFICH), and physical downlink control channel (PDCCH)): An eNB may provide a UE with control information for use in receiving data on PDSCH or transmit HARQ ACK/NACK corresponding to uplink data transmission.

For DMRS, Tables 2-1 and 2-2 contain information as follows that is transmitted via downlink control information (DCI):

Antenna port(s);
Scrambling identity ($n_{SCID}$); and
Number of layers (rank).

Signaling the DMRS information from an eNB to a UE makes it possible to facilitate dynamic rank adaptation in a single user MIMO (SU-MIMO) mode and support dynamic switching between SU-MIMO and MU-MIMO. It may also be possible to make a distinction between DMRSs from neighboring cells with $n_{SCID}$ in a coordinated multipoint transmission/reception (CoMP) mode.

TABLE 2-1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2-2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layer, port 7-8, $n_{SCID} = 0$ (OOC = 2) |
| 1 | 1 layer, port 7, $n_{SCID} = 1$ (OOC = 2) | 1 | 2 layer, port 7-8, $n_{SCID} = 1$ (OOC = 2) |
| 2 | 1 layer, port 8, $n_{SCID} = 0$ (OOC = 2) | 2 | 2 layer, port 7-8, $n_{SCID} = 0$ (OCC = 4) |
| 3 | 1 layer, port 8, $n_{SCID} = 1$ (OOC = 2) | 3 | 2 layer, port 7-8, $n_{SCID} = 1$ (OOC = 4) |
| 4 | 1 layer, port 7, $n_{SCID} = 0$ (OCC = 4) | 4 | 2 layer, port 11, 13, $n_{SCID} = 0$ (OOC = 4) |
| 5 | 1 layer, port 7, $n_{SCID} = 1$ (OOC = 4) | 5 | 2 layer, port 11, 13, $n_{SCID} = 1$ (OOC = 4) |
| 6 | 1 layer, port 8, $n_{SCID} = 0$ (OOC = 4) | 6 | 3 layer, port 7-9 |
| 7 | 1 layer, port 8, $n_{SCID} = 1$ (OOC = 4) | 7 | 4 layer, port 7-10 |
| 8 | 1 layer, port 11, $n_{SCID} = 0$ (OOC = 4) | 8 | 5 layer, port 7-11 |
| 9 | 1 layer, port 11, $n_{SCID} = 1$ (OOC = 4) | 9 | 6 layer, port 7-12 |
| 10 | 1 layer, port 13, $n_{SCID} = 0$ (OOC = 4) | 10 | 7 layers, ports 7-13 |
| 11 | 1 layer, port 13, $n_{SCID} = 1$ (OOC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Table 2-1 is a signaling table for supporting up to 2 orthogonal DMRS ports for MU-MIMO, Table 2-2 is a signaling table for supporting up to 4 orthogonal DMRS ports for MU-MIMO, and the tables may be configured via radio resource control (RRC) signaling.

Unlike LTE, the 5G wireless communication supports downlink/uplink common DMRS structure at least for cyclic prefix (CP)-OFDM waveform as well as 12 orthogonal DMRS ports for MU-MIMO. When supporting 12 orthogonal DMRS ports for MU-MIMO, a signaling overhead problem arises. When supporting the downlink/uplink common DMRS structure, it is important to consider DMRS information signaling efficiency. In the NR system, the DMRS information may include information as follows:
   DMRS type;
   Number of layers & port number;
   SCID (Scrambling ID);
   One symbol and two symbol indicators;
   Additional DMRS configuration;
   DMRS port grouping information; and
   MU-pairing information.

The DMRS type is transmitted via higher layer signaling, which is described in detail below with respect to a first embodiment of the disclosure. A second embodiment of the disclosure is directed to a method for solving a power imbalance problem. The number of layer & port number is the information necessary for SU/MU dynamic switching and MU operations. A third embodiment of the disclosure is directed to a method for SU/MU dynamic switching and MU operations. The SCID is a parameter for use in a CoMP operation as a virtual cell ID for making a distinction between DMRSs from different cells. The SCID may also be used for making a distinction among multiple users within a cell. Although 1-bit SCID is used in the LTE system, the bitwidth of the SCID may be increased for use in the NR system. The number of layer & port number and SCID should be signaled dynamically via DCI because they are information necessary for dynamic switching. The one symbol/two symbol indicator is 1-bit information transmitted by the eNB for indicating whether a DMRS pattern is configured with one symbol or two symbols because it may be configured with two symbols even in a low layer transmission.

The one symbol/two symbol indicator may be configured by higher layers or dynamically signaled via DCI. If the one symbol/two symbol indicator is configured by higher layers, the DMRS may be restricted to occupy one symbol or two symbols. The additional DMRS configuration may be configured in addition to front-loaded DMRS to support a high mobility. Since the UE mobility does not change frequently, this information may be configured by high layers. The DMRS port grouping information is used for the NC-JT or phase tracking reference signal (PTRS) transmission, and the signaling method thereof is described with respect to a fourth embodiment of the disclosure. Finally, the MU-pairing information is necessary for supporting MU-MIMO non-transparently, and the signaling method is described with respect to a fifth embodiment of the disclosure. In summary, the disclosure provides a method for configuring DMRS with various DMRS information and signaling DMRS information efficiently.

First Embodiment

The first embodiment is directed to a front-loaded DMRS pattern-based antenna port mapping method. The front-loaded DMRS pattern may be categorized into two types (Type1 and Type2) and configured via higher layer signaling. The DMRS density is determined differently according to the antenna port mapping scheme and, as a consequence, it is associated with channel estimation performance. Accordingly, it is important to optimize the antenna port mapping per type in DMRS design. When an additional DMRS is transmitted in a transmission slot, a DMRS pattern characterized as follows is repeated after the front-loaded DMRS.
   Configuration type1:
      One symbol: Comb 2+2 CS, up to 4 ports; and
      Two symbols: Comb 2+2 CS+TD-OCC ({1 1} and {1−1}), up to 8 ports.
         Note: It should be possible to schedule up to 4 ports without using both {1,1} and {1,−1}.
   Configuration type2:
      One symbol: 2-FD-OCC across adjacent REs in the frequency domain, up to 6 ports; and
      Two symbols: 2-FD-OCC across adjacent REs in the frequency domain+TD-OCC (both {1,1} and {1,−1}) up to 12 ports.
         Note: It should be possible to schedule up to 6 ports without using both {1,1} and {1,−1}.

Figure 4:
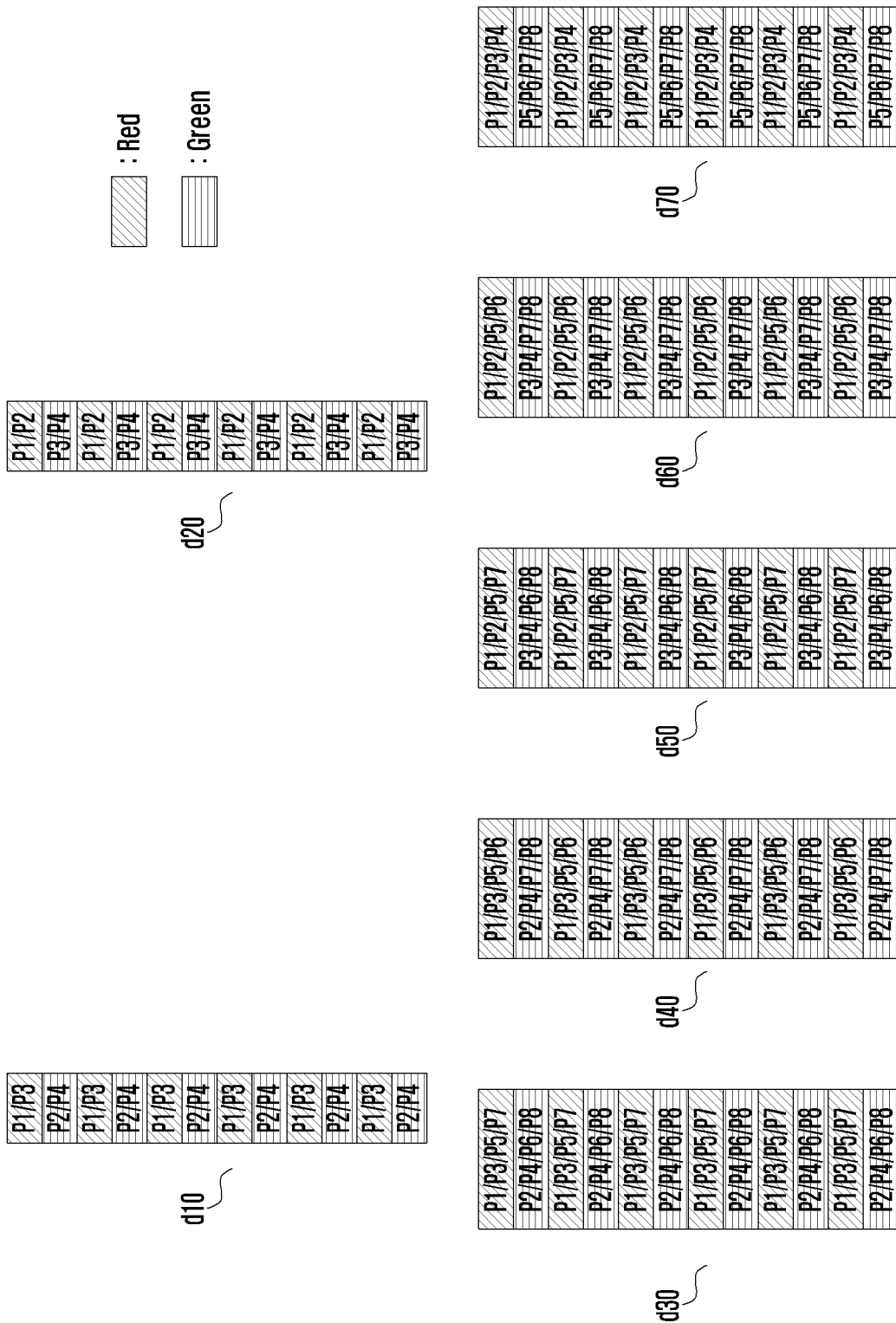
FIG. 4 is a diagram of patterns available for Type1, in an antenna port mapping method, according to an embodiment.
Figure 5:
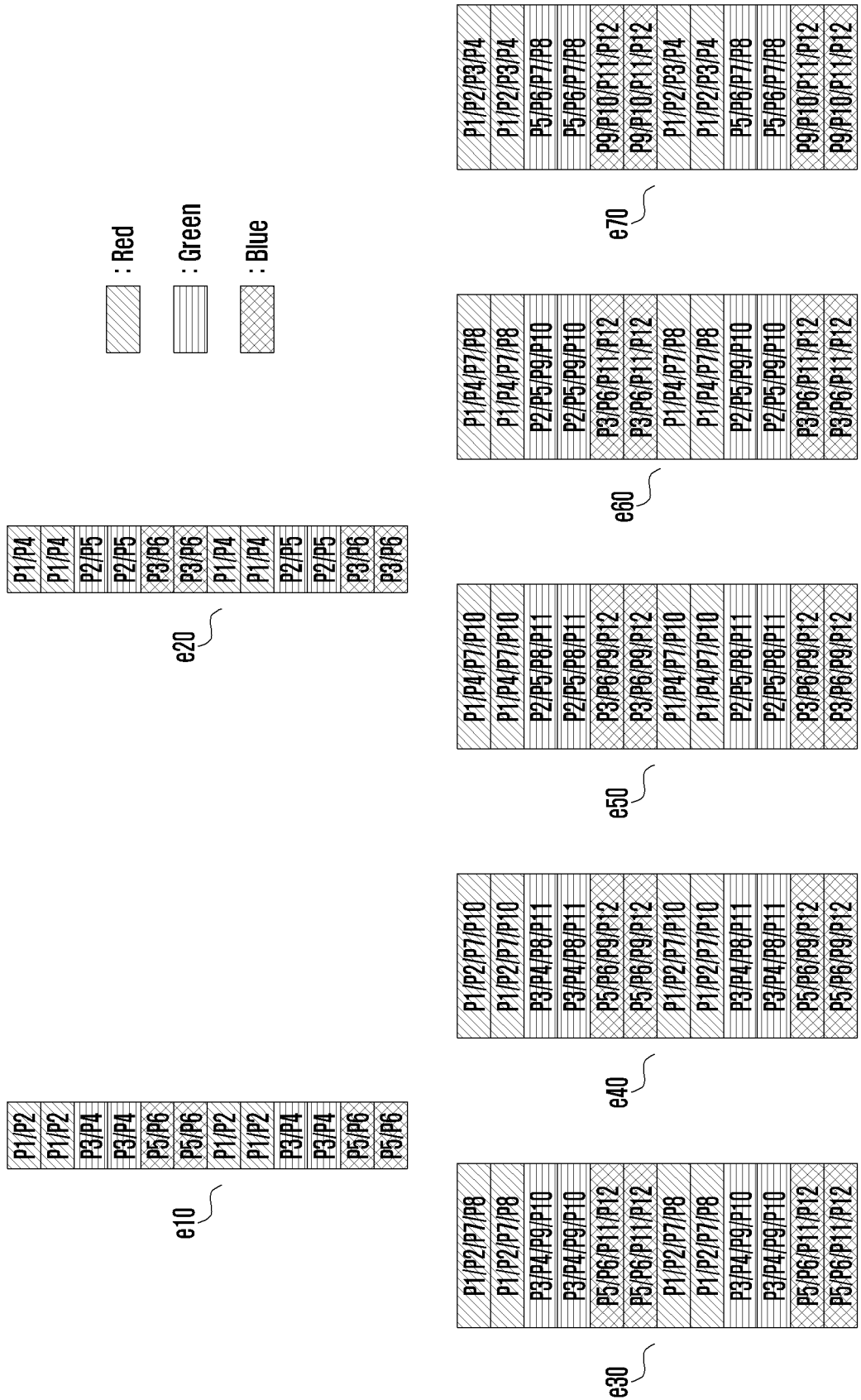
FIG. 5 is a diagram of patterns available for Type2, in an antenna port mapping method, according to an embodiment.

In view of the foregoing, a description is made of the change of the pattern according to the antenna port mapping pattern with reference to FIGS. 4 and 5. In the following description, the antenna port p is expressed as p=P1~P8 for Type1 and p=P1~P12 for Type2. However, it should be noted that the port numbers may be expressed differently. For example, the antenna port p may be expressed as p=1000~1007 for Type1 and p=1000~1011 for Type2; the antenna ports p may also be expressed using other nomenclature.

By applying a method for supporting multiple antenna ports, the DMRS can be mapped to the $l^{th}$ OFDM symbol in the time domain and the $k^{th}$ subcarrier as shown in Equation (1).

$$a_{k,l}^{(p,\mu)} = w_f(k') \cdot w_t(l') \cdot r(2m + k' + m_0) \quad (1)$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = l_0 + l'$$

In Equation (1), r(m) denotes a DMRS sequence in the second embodiment, which is defined by Equation (2a) as follows:

$$r(m) = \frac{1}{\sqrt{2}}(1 - 2 \cdot c(2m)) + j\frac{1}{\sqrt{2}}(1 - 2 \cdot c(2m + 1)) \quad (2a)$$

where c(i) denotes a pseudo-random (PN) sequence. In Equation (1), µ denotes an index indicating a numerology, which is given using the values shown in Table 3.

TABLE 3

| µ | Δf = $2^\mu$ · 15 [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In Equation (1), p denotes a DMRS port index, $w_t(l')$ denotes application of time domain orthogonal cover codes (TD-OCC) in use for a two-symbol pattern, and $w_f(k')$ denotes application of 2CS or 2-FD-OCC in the frequency domain. The variable values according to the antenna port mapping method are described in the Tables below.

FIG. 4 is a diagram of patterns available for Type1 in an antenna port mapping method, according to an embodiment.

FIG. 4 illustrates the patterns available for Type1 in the disclosed antenna port mapping method. With respect to the pattern of Type1, with the basic structure of Comb2 and 2 cyclic shift (2CS), up to 8 orthogonal DMRS ports are supported by applying TD-OCC ({1 1} and {1 −1}) for the two-symbol pattern. Parts d10 and d20 of FIG. 4 are examples of when Type1 is mapped to one symbol. Part d10 of FIG. 4 is a mapping scheme in which DMRS ports P1/P3 and P2/P4 are multiplexed with Comb 2, part d20 of FIG. 4 is a mapping scheme in which DMRS ports P1/P2 and P3/P4 are multiplexed with Comb 2. In the mapping schemes of parts d10 and d20 of FIG. 4, it is possible to distinguish between the two ports in the same Comb with 2 CS. The mapping scheme of part d10 of FIG. 4 has a DMRS density as follows;
  6 REs are used <=1 layer transmission; and
  12 REs are used >1 layer transmission.
The mapping scheme of part d20 of FIG. 4 has a DMRS density as follows;
  6 REs are used <=2 layer transmission; and
  12 REs are used >2 layer transmission.

Accordingly, the mapping schemes of parts d10 and d20 of FIG. 4 may have different DMRS densities depending on the number of DMRS ports. Parts d30 to d70 of FIG. 4 are examples of when Type1 is mapped to two symbols. Part d30 of FIG. 4 is a mapping scheme in which DMRS ports P1/P3/P5/P7 and P2/P4/P6/P8 are multiplexed with Comb 2, and part d40 of FIG. 4 is a mapping scheme in which DMRS ports P1/P3/P5/P6 and P2/P4/P7/P8 are multiplexed with Comb 2. Part d50 of FIG. 4 is a mapping scheme in which DMRS ports P1/P2/P5/P7 and P3/P4/P6/P8 are multiplexed with Comb 2, and part d60 of FIG. 4 is a mapping scheme in which DMRS ports P1/P2/P5/P6 and P3/P4/P7/P8 are multiplexed with Comb 2. Part d70 of FIG. 4 is a mapping scheme in which DMRS ports P1/P2/P3/P4 and P5/P6/P7/P8 are multiplexed with Comb 2. In the mapping schemes of parts d30 to d70, it is possible to distinguish among up to 4 ports with 2 CS in the same comb and TD-OCC. The mapping schemes of parts d30 and d40 of FIG. 4 have a DMRS density as follows:
  12 REs are used <=1 layer transmission; and
  24 REs are used >1 layer transmission.
The mapping schemes of parts d50 and d60 of FIG. 4 has a DMRS density as follows:
  12 REs are used <=2 layer transmission; and
  24 REs are used >2 layer transmission.
The mapping scheme of part d70 of FIG. 4 has a DMRS density as follows:
  12 REs are used <=4 layer transmission; and
  24 REs are used >4 layer transmission.
The DMRS density varies according to the antenna port mapping scheme for Type1, which means that the one-symbol pattern and two-symbol pattern for DMRS may use different mapping patterns according to the optimized mapping scheme.

The parameters of Equation (1) may be set to different values depending on the antenna port mapping scheme for the one-symbol pattern and two-symbol pattern for DMRS Type1. The one-symbol pattern and two-symbol pattern configurations for DMRS according to the antenna port mapping schemes of FIG. 4 may be categorized into 10 categories as follows:
  Case1: One symbol part d10 and Two symbol part d30;
  Case2: One symbol part d10 and Two symbol part d40;
  Case3: One symbol part d10 and Two symbol part d50;
  Case4: One symbol part d10 and Two symbol part d60;
  Case5: One symbol part d10 and Two symbol part d70;
  Case6: One symbol part d20 and Two symbol part d30;
  Case7: One symbol part d20 and Two symbol part d40;
  Case8: One symbol part d20 and Two symbol part d50;
  Case9: One symbol part d20 and Two symbol part d60; and
  Case10: One symbol part d20 and Two symbol part d70.

For the two-symbol patterns, it may be possible to consider additional cases according to the order of the application of the 2 CS and TD-OCC to the antenna ports in the Comb as follows. Here, 20 total available mapping schemes can be considered.
  Alt-1: to apply 2 CS first and then TD-OCC in two symbol patterns; and
  Alt-2: to apply TD-OCC first and then 2 CS in two symbol patterns.

FIG. 5 is a diagram of patterns available for Type2 when using an antenna port mapping method, according to an embodiment.

FIG. 5 illustrates the patterns available for Type2 in the disclosed antenna port mapping method. With respect to the pattern of Type2, with the basic structure of FD-OCC at two adjacent REs, up to 12 orthogonal DMRS ports are supported by applying TD-OCC ({1 1} and {1 −1}) to the two symbol patterns. Parts e10 and e20 of FIG. 5 are examples of when Type2 is mapped to one symbol. Part e10 of FIG. 5 is a mapping scheme in which DMRS ports P1/P2, P3/P4, and P5/P6 are multiplexed with frequency division multiplexing (FDM), part e20 of FIG. 5 is a mapping scheme in which P1/P4, P2/P5, and P3/P6 are multiplexed in FDM. In parts e10 and e20 of FIG. 5, the two ports mapped to two adjacent REs may be distinguished using FD-OCC. The mapping scheme of part e10 of FIG. 5 has a DMRS density as follows:

- 4 REs are used <=2 layer transmission;
- 8 REs are used >2 and <=4 layer transmission; and
- 12 REs are used >4 layer transmission.

The mapping scheme of part e20 has a DMRS density as follows:

- 4 REs are used 1 layer transmission;
- 8 REs are used 2 layer transmission; and
- 12 REs are used >2 layer transmission.

Accordingly, the mapping schemes of parts e10 and e20 of FIG. 5 may have different DMRS densities depending on the number of DMRS ports. Parts e30 to e70 of FIG. 5 are examples of when the Type2 is mapped to two symbols. Part e30 is a mapping scheme in which DMRS ports P1/P2/P7/P8 and P3/P4/P9/P10 are multiplexed in FDM, and part e40 of FIG. 5 is a mapping scheme in which DMRS ports P1/P2/P7/P10, P3/P4/P8/P11, and P5/P6/P9/P12 are multiplexed in FDM. Part e50 is a mapping scheme in which DMRS ports P1/P4/P7/P10, P2/P5/P8/P11, and P3/P6/P9/P12 are multiplexed in FDM, and part e60 of FIG. 5 is a mapping scheme in which DMRS ports P1/P4/P7/P8, P2/P5/P9/P10, and P3/P6/P11/P12 are multiplexed in FDM. Part e70 is a mapping scheme in which DMRS ports P1/P2/P3/P4, P5/P6/P7/P8, and P9/P10/P11/P12 are multiplexed in FDM. In the mapping schemes of parts e30 to e70 of FIG. 5, it is possible to distinguish between up to 4 ports mapped to the two adjacent REs in the frequency domain with the FD-OCC and TD-OCC. The mapping schemes of parts e30 and e40 of FIG. 5 have a DMRS density as follows:

- 8 REs are used <=2 layer transmission;
- 12 REs are used >2 and <=4 layer transmission; and
- 24 REs are used >4 layer transmission.

The mapping schemes of parts e50 and e60 of FIG. 5 have a DMRS density as follows:

- 8 REs are used 1 layer transmission;
- 12 REs are used 2 layer transmission; and
- 24 REs are used >2 layer transmission.

The mapping scheme of part e70 of FIG. 5 has a DMRS density as follows:

- 8 REs are used <=4 layer transmission;
- 12 REs are used >4 and <=8 layer transmission; and
- 24 REs are used >8 layer transmission.

The DMRS density varies according to the antenna port mapping scheme for Type2, which means that the one-symbol pattern and two-symbol pattern for DMRS may use different mapping patterns according to the optimized mapping scheme.

The parameters of Equation (1) may be set to different values depending on the antenna port mapping scheme for the one-symbol pattern and two-symbol pattern for DMRS Type2 as follows. The one-symbol pattern and two-symbol pattern configurations for DMRS according to the antenna port mapping schemes disclosed in FIG. 5 may be categorized into 10 categories as follows:

Case1: One symbol part e10 and Two symbol part e30;
Case2: One symbol part e10 and Two symbol part e40;
Case3: One symbol part e10 and Two symbol part e50;
Case4: One symbol part e10 and Two symbol part e60;
Case5: One symbol part e10 and Two symbol part e70;
Case6: One symbol part e20 and Two symbol part e30;
Case7: One symbol part e20 and Two symbol part e40;
Case8: One symbol part e20 and Two symbol part e50;
Case9: One symbol part e20 and Two symbol part e60; and
Case10: One symbol part e20 and Two symbol part e70.

For the two-symbol patterns, it may be possible to consider additional cases according to the order of application of the FD-OCC and TD-OCC to the antenna ports in two adjacent REs as follows: Here, total 20 available mapping schemes can be considered.

Alt-1: to apply FD-OCC first and then TD-OCC to two-symbol pattern; and

Alt-2: to apply TD-OCC first and then FD-OCC to two-symbol pattern.

Although FIGS. 4 and 5 illustrate the DMRS port mapping performed in the order from the top to the bottom subcarrier, it may also be possible to perform the DMRS port mapping in the order from bottom to the top subcarrier. The DMRS port mapping method is elaborated in the sixth embodiment described below.

Table 4 shows setting values of parameters of Equation (1) for type1 and type2 DMRS port mapping schemes.

TABLE 4

| $\tilde{p}$ | DM-RS type 1 | DM-RS type 2 | $w_f(k')$ k' = 0 | $w_f(k')$ k' = 1 | $w_t(l')$ l' = 0 | $w_t(l')$ l' = 1 | DM-RS type supported |
|---|---|---|---|---|---|---|---|
| 1 | 0 | 0 | +1 | +1 | +1 | +1 | type 1, type 2 |
| 2 | 0 | 0 | +1 | −1 | +1 | +1 | type 1, type 2 |
| 3 | 1 | 2 | +1 | +1 | +1 | +1 | type 1, type 2 |
| 4 | 1 | 2 | +1 | −1 | +1 | +1 | type 1, type 2 |
| 5 | 0 | 0 | +1 | +1 | +1 | −1 | type 1, type 2 |
| 6 | 0 | 0 | +1 | −1 | +1 | −1 | type 1, type 2 |
| 7 | 1 | 2 | +1 | +1 | +1 | −1 | type 1, type 2 |
| 8 | 1 | 2 | +1 | −1 | +1 | −1 | type 1, type 2 |
| 9 | — | 4 | +1 | +1 | +1 | +1 | type 2 |
| 10 | — | 4 | +1 | −1 | +1 | +1 | type 2 |
| 11 | — | 4 | +1 | +1 | +1 | −1 | type 2 |
| 12 | — | 4 | +1 | −1 | +1 | −1 | type 2 |

In Table 4, $\tilde{p}$ denotes an antenna port index to which the DMRS port P is mapped in a different manner according to the DMRS mapping schemes available for Type1 and Type2. The parameters presented in Table 4 can be used with Equation (1) and may be mathematically modified in whole or in part with the expectation of the same effect. It may be advantageous to use the pattern of part d10 of FIG. 4 when forming Type1 pattern with one symbol in consideration of DMRS overhead and channel estimation performance. Also, it may be advantageous to use the pattern of part d50 of FIG. 4 when forming Type1 pattern with two symbols. The parameters listed in Table 4 may be configured differently for the one-symbol pattern and two-pattern as described above. Tables 5 and 6 show the parameters of Table 4 that are configured for the patterns of part d10 and d50 of FIG. 4, respectively.

TABLE 5

| p | Δ | $w_f(k')$ k'=0 | $w_f(k')$ k'=1 | $w_t(l')$ l'=0 |
|---|---|---|---|---|
| P1 | 0 | +1 | +1 | +1 |
| P2 | 1 | +1 | +1 | +1 |
| P3 | 0 | +1 | −1 | +1 |
| P4 | 1 | +1 | −1 | +1 |

TABLE 6

| p | Δ | $w_f(k')$ k'=0 | $w_f(k')$ k'=1 | $w_t(l')$ l'=0 | $w_t(l')$ l'=1 |
|---|---|---|---|---|---|
| P1 | 0 | +1 | +1 | +1 | +1 |
| P2 | 0 | +1 | −1 | +1 | +1 |
| P3 | 1 | +1 | +1 | +1 | +1 |
| P4 | 1 | +1 | −1 | +1 | +1 |
| P5 | 0 | +1 | +1 | +1 | −1 |
| P6 | 1 | +1 | +1 | +1 | −1 |
| P7 | 0 | +1 | −1 | +1 | −1 |
| P8 | 1 | +1 | −1 | +1 | −1 |

It may be advantageous to use the pattern of part e20 of FIG. 5 when forming the Type2 pattern with one symbol in consideration of the DMRS overhead and channel estimation performance. Also, it may be advantageous to use the pattern of part e40 of FIG. 5 when forming the Type2 pattern with two symbols. The parameters listed in Table 4 may be configured differently for the one-symbol pattern and two-pattern as described above. Tables 7 and 8 show the parameters of Table 4 that are configured for the patterns of part e20 and e40 of FIG. 5, respectively.

TABLE 7

| p | Δ | $w_f(k')$ k'=0 | $w_f(k')$ k'=1 | $w_t(l')$ l'=0 |
|---|---|---|---|---|
| P1 | 0 | +1 | +1 | +1 |
| P2 | 2 | +1 | +1 | +1 |
| P3 | 4 | +1 | +1 | +1 |
| P4 | 0 | +1 | −1 | +1 |
| P5 | 2 | +1 | −1 | +1 |
| P6 | 4 | +1 | −1 | +1 |

TABLE 8

| p | Δ | $w_f(k')$ k'=0 | $w_f(k')$ k'=1 | $w_t(l')$ l'=0 | $w_t(l')$ l'=1 |
|---|---|---|---|---|---|
| P1 | 0 | +1 | +1 | +1 | +1 |
| P2 | 0 | +1 | −1 | +1 | +1 |
| P3 | 2 | +1 | +1 | +1 | +1 |
| P4 | 2 | +1 | −1 | +1 | +1 |
| P5 | 4 | +1 | +1 | +1 | +1 |
| P6 | 4 | +1 | −1 | +1 | +1 |
| P7 | 0 | +1 | +1 | +1 | −1 |
| P8 | 2 | +1 | +1 | +1 | −1 |
| P9 | 4 | +1 | +1 | +1 | −1 |
| P10 | 0 | +1 | −1 | +1 | −1 |
| P11 | 2 | +1 | −1 | +1 | −1 |
| P12 | 4 | +1 | −1 | +1 | −1 |

Overall operations of the gNB and UE associated with DMRS pattern Type1 and Type2 are described hereinafter.

Figure 6A:
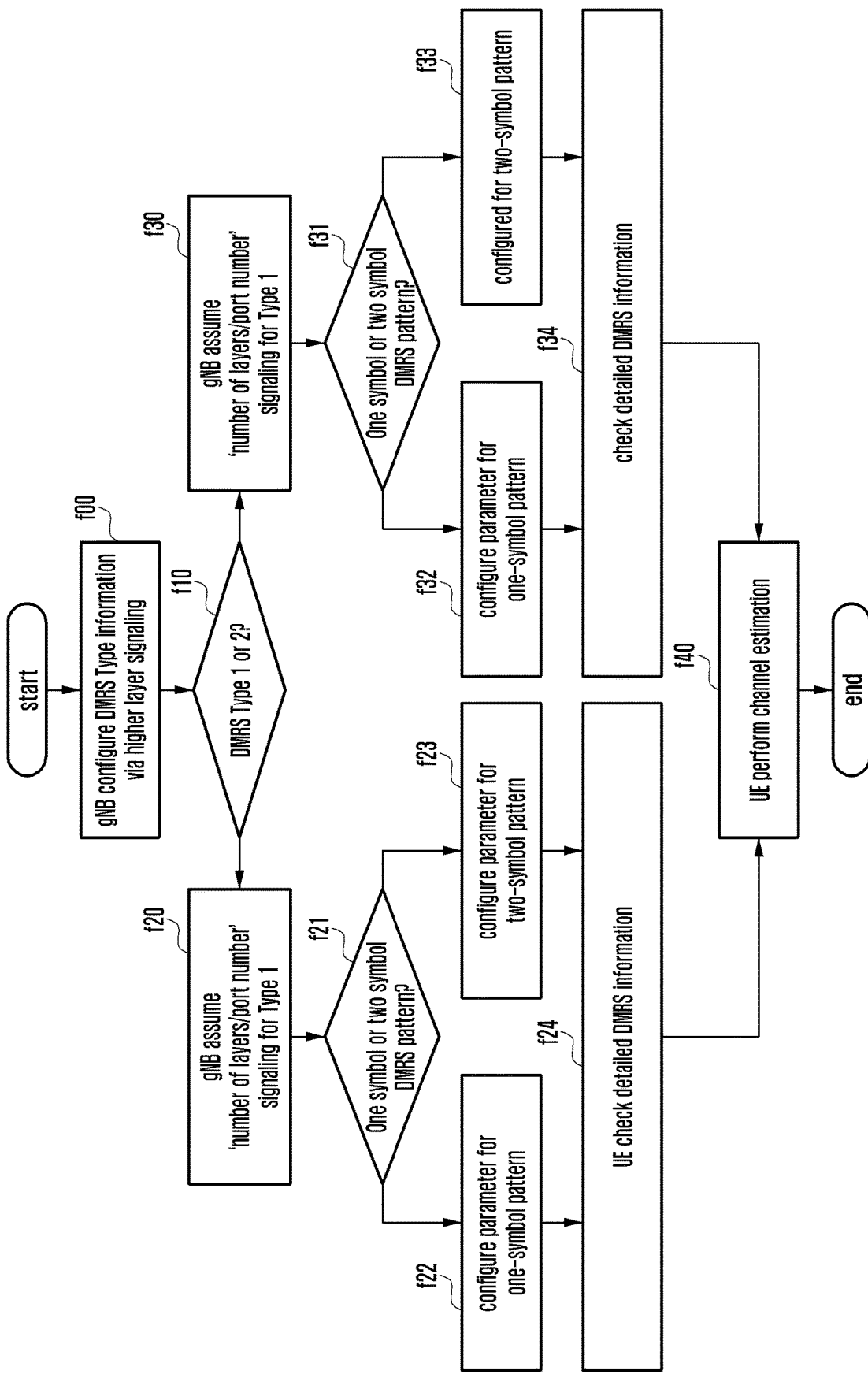
FIG. 6A is a flowchart of a method of a gateway node B (gNB) and a user equipment (UE), according to an embodiment.

FIG. 6A is a flowchart of a method of the gNB and UE, according to an embodiment.

At step f00, the gNB configures the DMRS pattern Type1 and Type2 information via higher layer signaling. For example, the gNB may transmit DMRS pattern information to the UE via an RRC message.

If it is determined at step f10 that the Type1 DMRS pattern is configured, the gNB may signal the number of layer & port number information for Type1 at step f20, as described above. If it is determined at step f21 that the DMRS is configured in the one-symbol pattern, the gNB configures DMRS parameters for the one-symbol DMRS pattern at step f22. If it is determined that the DMRS is configured in the two-symbol pattern, the gNB configures DMRS parameters for the two-symbol DMRS pattern at step f23.

The UE may check the DMRS configuration information at step f24 and perform channel estimation at step f40. If it is determined at step f10 that the Type2 DMRS pattern is configured, the gNB performs the same operation as that being performed when the Type1 DMRS pattern is configured. The gNB may signal the number of layer & port number information for Type2 at step f30.

If it is determined at step f31 that the DMRS is configured in the one-symbol pattern, the gNB configures DMRS parameters for the one-symbol DMRS pattern at step 32. If it is determined that the DMRS is configured in the two-symbol pattern, the gNB configures the DMRS parameters for the two-symbol DMRS pattern at step f33. The UE may check the DMRS configuration information at step f34 and perform channel estimation at step f40.

The DMRS density may vary depending on the DMRS port mapping, and the method for mapping the one-symbol and two-symbol DMRS patterns to the antenna ports may be changed depending on the DMRS type. The parameter configuration for Type1 may be determined differently at steps f22 and f23. The parameter configuration for Type2 may be determined differently at steps f32 and f33.

Second Embodiment

The second embodiment is directed to a method for solving a power imbalance problem using the DMRS patterns disclosed in the first embodiment. Typically, using TD-OCC may cause a power imbalance problem. When the DMRS type 1 and type2 described in the first embodiment are configured with two symbols and CDM is applied in both the time and frequency domains simultaneously, the CDM with an OCC length of 4 is applied in the time and frequency domains as shown in FIG. 6B.

When precoding is applied to the OCC, the transmission signal may be expressed as Equation (2b).

$$x_n = \begin{cases} [w_{n,1} w_{n,2} w_{n,3} w_{n,4}] \cdot a = w_{n,1} + w_{n,2} + w_{n,3} + w_{n,4} \\ [w_{n,1} w_{n,2} w_{n,3} w_{n,4}] \cdot b = w_{n,1} - w_{n,2} + w_{n,3} - w_{n,4} \\ [w_{n,1} w_{n,2} w_{n,3} w_{n,4}] \cdot c = w_{n,1} + w_{n,2} - w_{n,3} - w_{n,4} \\ [w_{n,1} w_{n,2} w_{n,3} w_{n,4}] \cdot d = w_{n,1} - w_{n,2} - w_{n,3} + w_{n,4} \end{cases} \quad (2b)$$

Figure 7A:
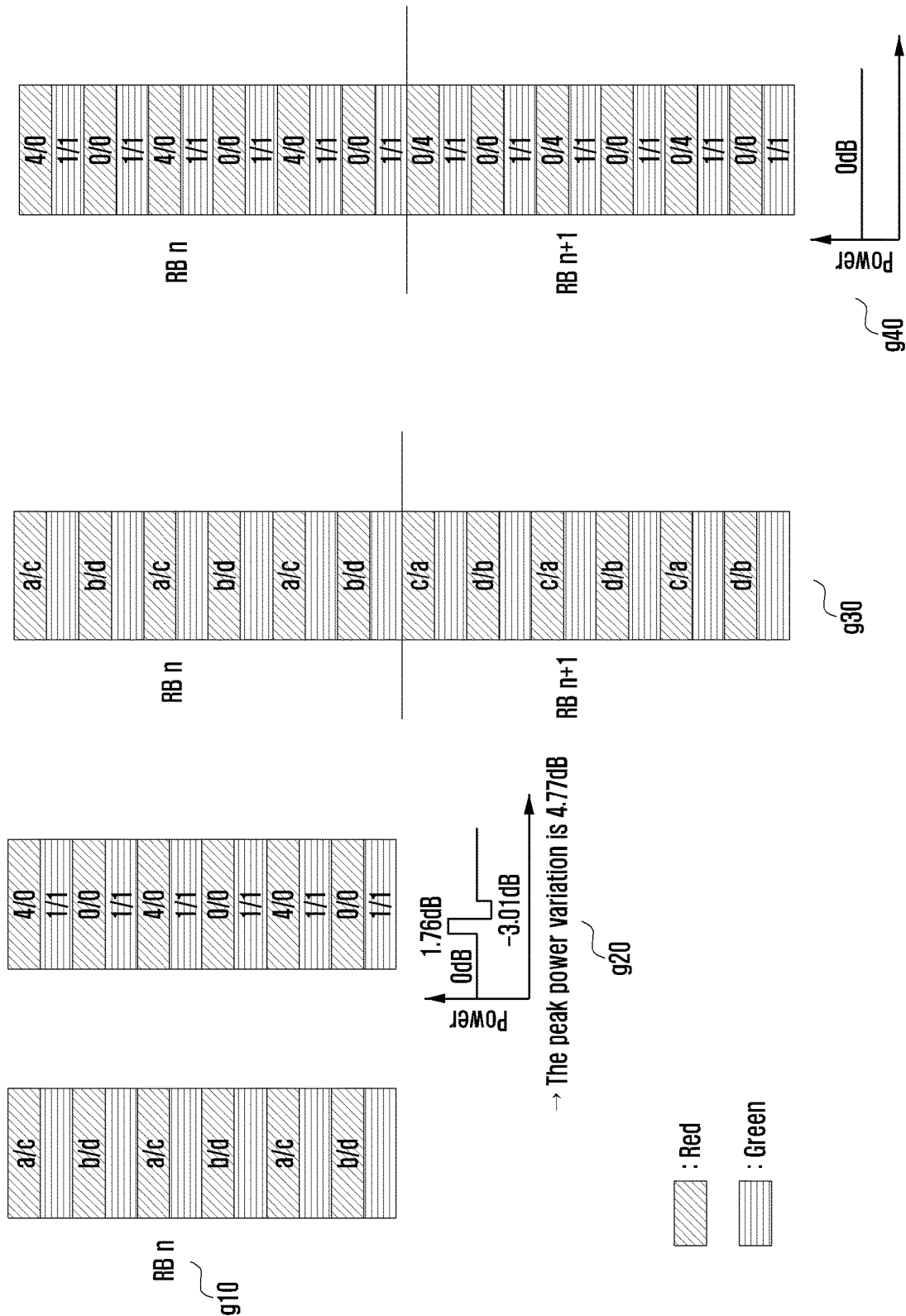

A description is made of the power imbalance problem arising when $W_{n,1} = W_{n,2} = W_{n,3} = W_{n,4}$ in Equation (2b) with reference to FIGS. 7A and 7B. FIGS. 7A and 7B are diagram of the power imbalance problem, according to an embodiment.

Part g10 of FIG. 7A illustrates when the CDM with the OCC length of 4 is applied in the time and frequency domains in association with the DMRS type1 as described above. Here, it is possible to observe that a peak power variation of 4.77 dB occurs for the case of $W_{n,1}=W_{n,2}=W_{n,3}=W_{n,4}$ in part g20 of FIG. 7A. Part g50 of FIG. 7A is when the CDM with the OCC length of 4 is applied in the time and frequency domains in association with the DMRS type2 as described above. Here, it is possible to observe that a peak power variation of 3.01 dB occurs for when $W_{n,1}=W_{n,2}=W_{n,3}=W_{n,4}$ in part g60 of FIG. 7A. In order to solve this problem, a method for changing the CDM application pattern in the time and frequency domains is provided. It may also be possible to apply a method of swapping (toggling) the application of CDM in the time and frequency domains as described below, or apply, at the gNB, phase shifting along with the precoding to obtain the same effect.

Alt1: Method of swapping (toggling) application of CDM in tome or frequency domain; and Alt2: Method of applying phase-shifting along with precoding (gNB implementation).

A description of the method of Alt1 is made with reference to FIG. 7A. Part g30 of FIG. 7A illustrates a method of swapping (toggling) CDM application within 2 RBs for DMRS type1. Here, it is possible to observe that the power imbalance problem is overcome through peak power randomization for when $W_{n,1}=W_{n,2}=W_{n,3}=W_{n,4}$ in part g40 of FIG. 7A. Part g70 of FIG. 7A illustrates a method of swapping (toggling) the DCM application for DMRS type2 within 2 RBs in the frequency domain. Here, it is possible that the power imbalance problem is overcome through peak power randomization for when $W_{n,1}=W_{n,2}=W_{n,3}=W_{n,4}$ in part g80 of FIG. FIG. 7B. In the method of Alt2 for solving the problem through gNB implementation, if the gNB performs phase shifting on the precoder corresponding to $W_{n,3}$ and $W_{n,4}$ every 2 PRBs to change the code of $W_{n,3}$ and $W_{n,4}$, if the phase-shifted precoding is applied to the OCC of FIG. 6B, the transmission signal may be expressed as Equation (3). Here, the peak power may be randomized by Equation (2b) applied to different PRBs and Equation (3).

$$y_n = \begin{cases} [w_{n,1} w_{n,2} w_{n,3} w_{n,4}] \cdot a = w_{n,1} + w_{n,2} - w_{n,3} - w_{n,4} \\ [w_{n,1} w_{n,2} w_{n,3} w_{n,4}] \cdot b = w_{n,1} - w_{n,2} - w_{n,3} + w_{n,4} \\ [w_{n,1} w_{n,2} w_{n,3} w_{n,4}] \cdot c = w_{n,1} + w_{n,2} + w_{n,3} + w_{n,4} \\ [w_{n,1} w_{n,2} w_{n,3} w_{n,4}] \cdot d = w_{n,1} - w_{n,2} + w_{n,3} - w_{n,4} \end{cases} \quad (3)$$

Although this embodiment is directed to DMRS, the same method can be applied to other types of RSs such as CSI-RS to which OCC or CDM is applied.

Figure 7C:
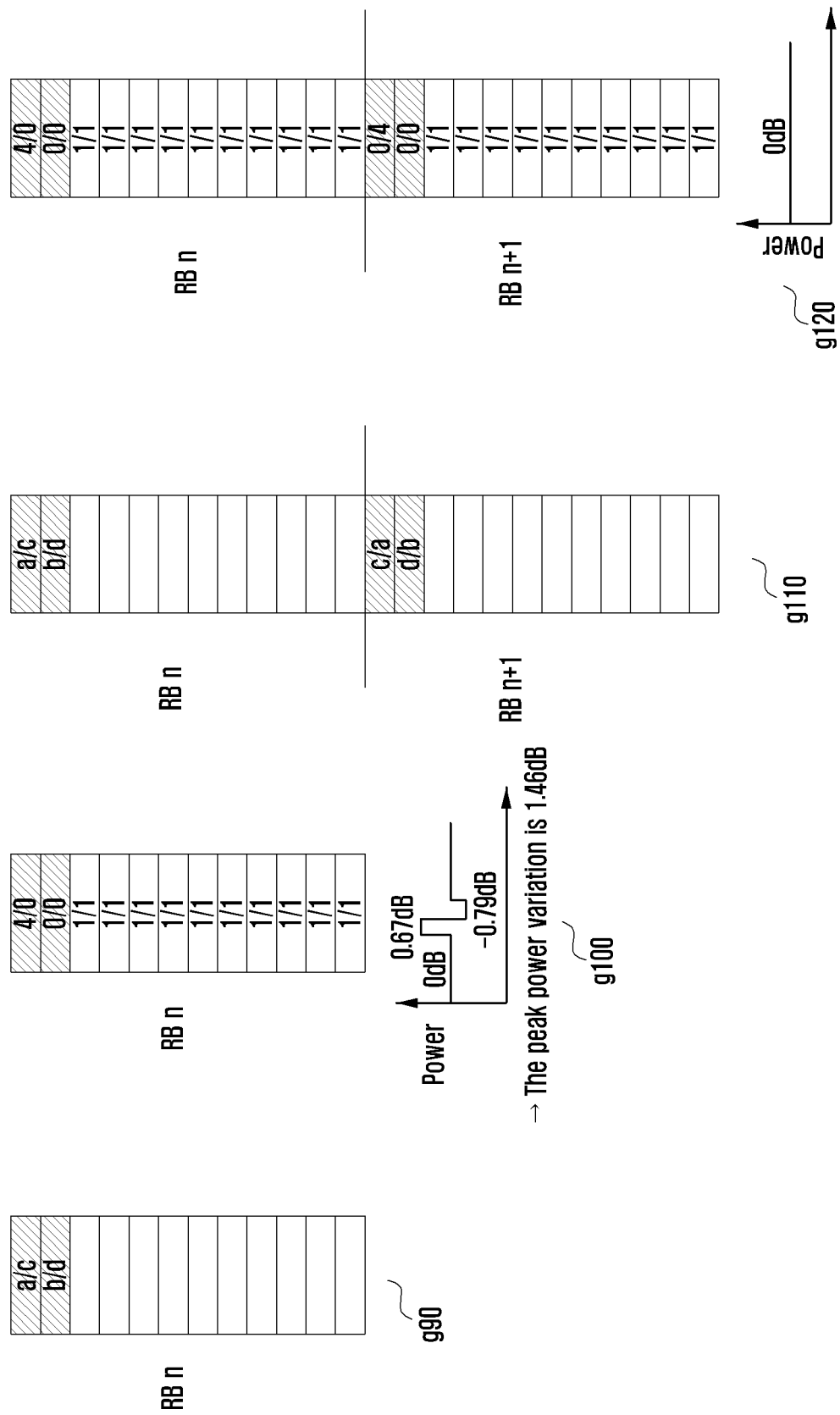

A description is made of the power imbalance problem arising in CSI-RS with reference to FIG. 7C. Although FIG. 7C illustrates an example of when the CDM with the OCC length of 4 is applied in such a way that the CSI-RS is located on two adjacent subcarriers at the top end in two adjacent OFDM symbols in one PRB, the locations of the RE for the CSI-RS are not limited to those shown in FIG. 7C.

For example even when the CDM is applied to two or more time-frequency resources (REs) to which one antenna port is mapped (e.g., CDM2 to 2 REs, CDM4 to 4 REs, and CDM8 to 8 REs), the methods described herein can be applied in extended different manner. The CSI-RS density may be set to one of different values such as [1, ½, ⅓] RE/RB/port, and the examples provided herein may be applied to all of the CSI-RS densities. If the CSI-RS is located at the locations as shown in part g90 of FIG. 7C, it is possible to observe that the peak power variation of 1.46 dB arises when $W_{n,1}=W_{n,2}=W_{n,3}=W_{n,4}$ in Equation (2b) in part g100 of FIG. 7C. Part g110 of FIG. 7C illustrates a method of swapping (toggling) the CDM application within 2 RBs in the frequency domain as in Alt1. Here, it is possible to observe that the power imbalance problem is overcome through peak power randomization for the case of $W_{n,1}=W_{n,2}=W_{n,3}=W_{n,4}$ in part g120 of FIG. 7C. Although the above description is directed to when the CSI-RS density is 1 such that the peak power randomization is achieved within two PRBs, the method can also be used for when the CSI-RS density is less than 1 by swapping (toggling) the CDM application within the increased number of PRBs. For example, if a CSI-RS is mapped every 2 PRBs, the peak power randomization may be achieved by swapping (toggling) the CDM application within 4 PRBs in the frequency domain. It may be possible to perform the peak power randomization through gNB implementation by applying the method of Alt2 as described with reference to Equation (3).

Third Embodiment

The third embodiment is directed to a method for signaling the number of layer & port number information based on the DMRS patterns disclosed in the first embodiment. It should be noted that the number of layer & port number information signaling method can be changed depending on the DMRS pattern. A method for signaling number of layer & port number which is changed according to Type1 and Type2 is provided.

As described above, since the number of orthogonal DMRS ports in the DMRS pattern for use in the NR system is much greater than that in the DMRS pattern for use in the LTE system, it may be difficult to distinguish among the increased number of DMRS ports for supporting MU-MIMO only with CDM. Accordingly, there is a need to apply CDM, FDM, and TDM together to distinguish among the ports for MU-MIMO. When the LTE system supports 4 orthogonal DMRS ports for MU-MIMO, the DMRS ports may be distinguished by CDM codes with the OCC length of 4. Accordingly, in order to perform the MU-MIMO for 2-layer transmission to two users, it may be possible to assign 4 orthogonal DMRS ports using codepoints 0 and 1 for 2 codewords (CWs) in Table 2-2. Since 4 orthogonal DMRS ports can be distinguished by the CDM codes with the OCC length of 4, it is possible to allocate the port number in the form of port 7-8 and port 11, 13 as follows:

codepoint 0: 2 layer, port 7-8, nSCID=0 (OCC=4); and codepoint 1: layer, port 11,13, nSCID=0 (OCC=4).

In the NR system supporting up to 12 orthogonal DMRS ports for MU-MIMO, however, it is impossible to distinguish among all ports with the CDM, and thus signaling has to be made in consideration of various port number assignments for supporting the MU-MIMO. If the signaling is made in consideration of a specific port number assignment, this may cause scheduling restriction for MU-MIMO. For example, in the NR system, 8 orthogonal DMRS ports can be distinguished by applying CDM, FDM, and TDM together for DMRS Type1, and there are total 28 methods for allocating two orthogonal DMRS ports. However, if the signaling is made in consideration of all of the methods, this increases the number of layer & port number information signaling overhead significantly, and there is a need of a method for reducing the number of cases for allocating port numbers efficiently as disclosed below.

port number assignment method:
- For MU-MIMO, assign DMRS ports belonging to the same CDM group;
- If the number of ports to assign is less than the number of ports belonging to one CDM group, it is not allowed to assign the ports belonging to another CDM group;
- Only if the number of ports to assign is greater than the number of ports belonging to one CDM group, it is allowed to assign the ports belonging to another CDM group additionally; and
- If necessary, it may be possible to assign additional DMRS ports with FDM preferentially.

In the disclosed method, a CDM group is a group of DMRS ports CDM-ed in the time-frequency domain in DMRS type1 or DMRS type2, as described in the first embodiment. The DMRS type1 consists of two CDM groups (one composed of the red-colored ports (having diagonal hatching) and the other composed of the green-colored (having horizontal hatching) ports in FIG. 4), and the DMRS type2 consists of three CDM groups (composed of red-colored, green-colored, and blue-colored ports (having criss-crossed hatching), respectively, in FIG. 5).

In the disclosed method, if the additional DMRS port assignment is made with FDM, this is when it is expected that channel estimation performance is improved by applying FDM rather than CDM according to the channel condition. This may be applied for both the SU-MIMO and MU-MIMO. When allocating orthogonal DMRS ports for MU-MIMO through the disclosed method, it is expected to decrease channel estimation complexity and improve channel estimation accuracy for MU-MIMO, as well as reducing the number of cases of orthogonal DMRS port number assignment. This is because allocating the ports belonging to the other CDM group is basically increasing the number of interferences to be considered and requires considering all of the cases, and thus increases MU-MIMO channel estimation complexity. In this respect, a description is made of the method for signaling the number of layer & port number information fort applying the above method to the DMRS type1 and type2, described in the first embodiment.

Table 9 is an example of a design of a DMRS table for supporting up to 4 MU-MIMO layers per UE in the Type1 DMRS pattern supporting 8 orthogonal ports for MU-MIMO. In Table 9, it is assumed that the pattern of part d10 of FIG. 4 is used for the one-symbol case and the pattern of part d50 of FIG. 4 is used for the two-symbol case. In this case, s total of 6 bits is required.

TABLE 9

| index | Number of layer | p | Number of Symbol |
|---|---|---|---|
| 1 | 1 | 1 | 1 |
| 2 | 1 | 2 | 1 |
| 3 | 1 | 3 | 1 |
| 4 | 1 | 4 | 1 |
| 5 | 2 | 1, 2 | 1 |
| 6 | 2 | 1, 3 | 1 |
| 7 | 2 | 2, 4 | 1 |
| 8 | 3 | 1, 2, 3 | 1 |
| 9 | 3 | 1, 2, 4 | 1 |
| 10 | 3 | 1, 3, 4 | 1 |
| 11 | 3 | 2, 3, 4 | 1 |
| 12 | 4 | 1, 2, 3, 4 | 1 |
| 13 | 1 | 1 | 2 |
| 14 | 1 | 2 | 2 |
| 15 | 1 | 3 | 2 |
| 16 | 1 | 4 | 2 |

TABLE 9-continued

| index | Number of layer | p | Number of Symbol |
|---|---|---|---|
| 17 | 1 | 5 | 2 |
| 18 | 1 | 6 | 2 |
| 19 | 1 | 7 | 2 |
| 20 | 1 | 8 | 2 |
| 21 | 2 | 1, 2 | 2 |
| 22 | 2 | 1, 5 | 2 |
| 23 | 2 | 1, 7 | 2 |
| 24 | 2 | 2, 5 | 2 |
| 25 | 2 | 2, 7 | 2 |
| 26 | 2 | 5, 7 | 2 |
| 27 | 2 | 3, 4 | 2 |
| 28 | 2 | 3, 6 | 2 |
| 29 | 2 | 3, 8 | 2 |
| 30 | 2 | 4, 6 | 2 |
| 31 | 2 | 4, 8 | 2 |
| 32 | 2 | 6, 8 | 2 |
| 33 | 3 | 1, 2, 3 | 2 |
| 34 | 3 | 1, 2, 5 | 2 |
| 35 | 3 | 1, 2, 7 | 2 |
| 36 | 3 | 1, 5, 7 | 2 |
| 37 | 3 | 2, 5, 7 | 2 |
| 38 | 3 | 3, 4, 6 | 2 |
| 39 | 3 | 3, 4, 8 | 2 |
| 40 | 3 | 3, 6, 8 | 2 |
| 41 | 3 | 4, 6, 8 | 2 |
| 42 | 4 | 1, 2, 3, 4 | 2 |
| 43 | 4 | 1, 2, 5, 7 | 2 |
| 44 | 4 | 3, 4, 6, 8 | 2 |
| 45 | 5 | 1, 2, 3, 4, 5 | 2 |
| 46 | 6 | 1, 2, 3, 4, 5, 6 | 2 |
| 47 | 7 | 1, 2, 3, 4, 5, 6, 7 | 2 |
| 48 | 8 | 1, 2, 3, 4, 5, 6, 7, 8 | 2 |
| — | — | — | — |
| 64 | reserved | reserved | reserved |

Table 10 is an example of a design of a DMRS table for the case of supporting up to 4 MU-MIMO layers per UE in the Type2 DMRS pattern supporting 12 orthogonal ports for MU-MIMO. In Table 10, it is assumed that the pattern of part e20 of FIG. 5 is used for the one-symbol case and the pattern of part e40 of FIG. 5 is used for the two-symbol case. In this case, a total of 7 bits is required.

TABLE 10

| index | Number of Layer | p | Number of Symbol |
|---|---|---|---|
| 1 | 1 | 1 | 1 |
| 2 | 1 | 2 | 1 |
| 3 | 1 | 3 | 1 |
| 4 | 1 | 4 | 1 |
| 5 | 1 | 5 | 1 |
| 6 | 1 | 6 | 1 |
| 7 | 2 | 1, 2 | 1 |
| 8 | 2 | 1, 4 | 1 |
| 9 | 2 | 2, 5 | 1 |
| 10 | 2 | 3, 6 | 1 |
| 11 | 3 | 1, 2, 3 | 1 |
| 12 | 3 | 1, 2, 4 | 1 |
| 13 | 3 | 1, 4, 5 | 1 |
| 14 | 3 | 1, 3, 4 | 1 |
| 15 | 3 | 1, 4, 6 | 1 |
| 16 | 3 | 1, 2, 5 | 1 |
| 17 | 3 | 2, 4, 5 | 1 |
| 18 | 3 | 2, 3, 5 | 1 |
| 19 | 3 | 2, 5, 6 | 1 |
| 20 | 3 | 1, 3, 6 | 1 |
| 21 | 3 | 3, 4, 6 | 1 |
| 22 | 3 | 2, 3, 6 | 1 |
| 23 | 3 | 3, 5, 6 | 1 |
| 24 | 4 | 1, 2, 3, 4 | 1 |
| 25 | 4 | 1, 2, 4, 5 | 1 |
| 26 | 4 | 1, 3, 4, 6 | 1 |

TABLE 10-continued

| index | Number of Layer | p | Number of Symbol |
|---|---|---|---|
| 27 | 4 | 2, 3, 5, 6 | 1 |
| 28 | 5 | 1, 2, 3, 4, 5 | 1 |
| 29 | 5 | 1, 2, 3, 4, 6 | 1 |
| 30 | 5 | 1, 2, 3, 5, 6 | 1 |
| 31 | 5 | 1, 2, 4, 5, 6 | 1 |
| 32 | 5 | 1, 3, 4, 5, 6 | 1 |
| 33 | 5 | 2, 3, 4, 5, 6 | 1 |
| 34 | 6 | 1, 2, 3, 4, 5, 6 | 1 |
| 35 | 1 | 1 | 2 |
| 36 | 1 | 2 | 2 |
| 37 | 1 | 3 | 2 |
| 38 | 1 | 4 | 2 |
| 39 | 1 | 5 | 2 |
| 40 | 1 | 6 | 2 |
| 41 | 1 | 7 | 2 |
| 42 | 1 | 8 | 2 |
| 43 | 1 | 9 | 2 |
| 44 | 1 | 10 | 2 |
| 45 | 1 | 11 | 2 |
| 46 | 1 | 12 | 2 |
| 47 | 2 | 1, 2 | 2 |
| 48 | 2 | 1, 7 | 2 |
| 49 | 2 | 1, 10 | 2 |
| 50 | 2 | 2, 7 | 2 |
| 51 | 2 | 2, 10 | 2 |
| 52 | 2 | 7, 10 | 2 |
| 53 | 2 | 3, 4 | 2 |
| 54 | 2 | 3, 8 | 2 |
| 55 | 2 | 3, 11 | 2 |
| 56 | 2 | 4, 8 | 2 |
| 57 | 2 | 4, 11 | 2 |
| 58 | 2 | 8, 11 | 2 |
| 59 | 2 | 5, 6 | 2 |
| 60 | 2 | 5, 9 | 2 |
| 61 | 2 | 5, 12 | 2 |
| 62 | 2 | 6, 9 | 2 |
| 63 | 2 | 6, 12 | 2 |
| 64 | 2 | 9, 12 | 2 |
| 65 | 3 | 1, 2, 3 | 2 |
| 66 | 3 | 1, 2, 7 | 2 |
| 67 | 3 | 1, 2, 10 | 2 |
| 68 | 3 | 1, 7, 10 | 2 |
| 69 | 3 | 2, 7, 10 | 2 |
| 70 | 3 | 3, 4, 8 | 2 |
| 71 | 3 | 3, 4, 11 | 2 |
| 72 | 3 | 3, 8, 11 | 2 |
| 73 | 3 | 4, 8, 11 | 2 |
| 74 | 3 | 5, 6, 9 | 2 |
| 75 | 3 | 5, 6, 12 | 2 |
| 76 | 3 | 5, 9, 12 | 2 |
| 77 | 3 | 6, 9, 12 | 2 |
| 78 | 4 | 1, 2, 3, 4 | 2 |
| 79 | 4 | 1, 2, 7, 10 | 2 |
| 80 | 4 | 3, 4, 8, 11 | 2 |
| 81 | 4 | 5, 6, 9, 12 | 2 |
| 82 | 5 | 1, 2, 3, 4, 5 | 2 |
| 83 | 6 | 1, 2, 3, 4, 5, 6 | 2 |
| 84 | 7 | 1, 2, 3, 4, 5, 6, 7 | 2 |
| 85 | 8 | 1, 2, 3, 4, 5, 6, 7, 8 | 2 |
| ... | | | |
| 128 | reserved | reserved | reserved |

Although P is followed by the port numbers in FIGS. 4 and 5, it is omitted before the port numbers in the port number column p of Tables 9 and 10. It should be noted that the DMRS port number assignment value may be changed in the above-disclosed tables depending on the DMRS pattern mapping scheme as described in the first embodiment. The above tables may be configured differently depending on the port number assignment method and port mapping schemes described with reference to FIGS. 4 and 5. In order to reduce signaling overhead, the following methods can be considered:

Method 1: If a one symbol and two symbol indicator is provided by higher layers, it may be possible to signal the number of layer & port number information for the one-symbol case and the number of layer & port number information for the two-symbol case in Tables 9 and 10 separately;

Method 2: If number of layers >4, this is the case of 2-CW transmission and thus it may be considered to configure the number of layer & port number information for 1-CW transmission (number of layers ≤4) into two rows for signaling; and Method 3: It may also be possible to further consider limiting port number assignment to specific port numbers among the combinations of port assignments configured according to the port number assignment method.

When applying the Methods 1 and 2, Table 9 may be extended to Tables 11 and 12, and Table 9 may be extended to Tables 13 and 14. Table 11 is associated with Type1 4 orthogonal DMRS ports (Max # of MU layers per UE is 4, part d10 of FIG. 4, two symbols). Table 12 is associated with Type1 8 orthogonal DMRS ports (Max # of MU layers per UE is 4, part d50 of FIG. 4, two symbols). Table 13 is associated with Type2 6 orthogonal DMRS ports (Max # of MU layers per UE is 4, part e20 of FIG. 5, one symbol), and Table 14 is associated with Type2 12 orthogonal DMRS ports (Max # of MU layers per UE is 4, part e40 of FIG. 5, two symbols).

TABLE 11

Two Codewords:
Codeword 0 enabled,
Codeword 1 disabled

| index | # of Layer | p |
|---|---|---|
| 1 | 1 | 1 |
| 2 | 1 | 2 |
| 3 | 1 | 3 |
| 4 | 1 | 4 |
| 5 | 2 | 1, 2 |
| 6 | 2 | 1, 3 |
| 7 | 2 | 2, 4 |
| 8 | 3 | 1, 2, 3 |
| 9 | 3 | 1, 2, 4 |
| 10 | 3 | 1, 3, 4 |
| 11 | 3 | 2, 3, 4 |
| 12 | 4 | 1, 2, 3, 4 |
| 13 | reserved | reserved |
| 14 | reserved | reserved |
| 15 | reserved | reserved |
| 16 | reserved | reserved |

TABLE 12

| Two Codewords: Codeword 0 enabled, Codeword 1 disabled | | | Two Codewords: Codeword 0 enabled, Codeword 1 enabled | | |
|---|---|---|---|---|---|
| index | Number of Layer | p | index | Number of Layer | p |
| 1 | 1 | 1 | 1 | 5 | 1, 2, 3, 4, 5 |
| 2 | 1 | 2 | 2 | 6 | 1, 2, 3, 4, 5, 6 |
| 3 | 1 | 3 | 3 | 7 | 1, 2, 3, 4, 5, 6, 7 |
| 4 | 1 | 4 | 4 | 8 | 1, 2, 3, 4, 5, 6, 7, 8 |
| 5 | 1 | 5 | 5 | reserved | reserved |
| 6 | 1 | 6 | 6 | reserved | reserved |
| 7 | 1 | 7 | 7 | reserved | reserved |
| 8 | 1 | 8 | 8 | reserved | reserved |
| 9 | 2 | 1, 2 | 9 | reserved | reserved |
| 10 | 2 | 1, 5 | 10 | reserved | reserved |
| 11 | 2 | 1, 7 | 11 | reserved | reserved |

TABLE 12-continued

| Two Codewords: Codeword 0 enabled, Codeword 1 disabled | | | Two Codewords: Codeword 0 enabled, Codeword 1 enabled | | |
|---|---|---|---|---|---|
| index | Number of Layer | p | index | Number of Layer | p |
| 12 | 2 | 2, 5 | 12 | reserved | reserved |
| 13 | 2 | 2, 7 | 13 | reserved | reserved |
| 14 | 2 | 5, 7 | 14 | reserved | reserved |
| 15 | 2 | 3, 4 | 15 | reserved | reserved |
| 16 | 2 | 3, 6 | 16 | reserved | reserved |
| 17 | 2 | 3, 8 | 17 | reserved | reserved |
| 18 | 2 | 4, 6 | 18 | reserved | reserved |
| 19 | 2 | 4, 8 | 19 | reserved | reserved |
| 20 | 2 | 6, 8 | 20 | reserved | reserved |
| 21 | 3 | 1, 2, 3 | 21 | reserved | reserved |
| 22 | 3 | 1, 2, 5 | 22 | reserved | reserved |
| 23 | 3 | 1, 2, 7 | 23 | reserved | reserved |
| 24 | 3 | 1, 5, 7 | 24 | reserved | reserved |
| 25 | 3 | 2, 5, 7 | 25 | reserved | reserved |
| 26 | 3 | 3, 4, 6 | 26 | reserved | reserved |
| 27 | 3 | 3, 4, 8 | 27 | reserved | reserved |
| 28 | 3 | 3, 6, 8 | 28 | reserved | reserved |
| 29 | 3 | 4, 6, 8 | 29 | reserved | reserved |
| 30 | 4 | 1, 2, 3, 4 | 30 | reserved | reserved |
| 31 | 4 | 1, 2, 5, 7 | 31 | reserved | reserved |
| 32 | 4 | 3, 4, 6, 8 | 32 | reserved | reserved |

TABLE 13

| Two Codewords: Codeword 0 enabled, Codeword 1 disabled | | | Two Codewords: Codeword 0 enabled, Codeword 1 enabled | | |
|---|---|---|---|---|---|
| index | Number of layer | p | index | Number of layer | p |
| 1 | 1 | 1 | 1 | 5 | 1, 2, 3, 4, 5 |
| 2 | 1 | 2 | 2 | 5 | 1, 2, 3, 4, 6 |
| 3 | 1 | 3 | 3 | 5 | 1, 2, 3, 5, 6 |
| 4 | 1 | 4 | 4 | 5 | 1, 2, 4, 5, 6 |
| 5 | 1 | 5 | 5 | 5 | 1, 3, 4, 5, 6 |
| 6 | 1 | 6 | 6 | 5 | 2, 3, 4, 5, 6 |
| 7 | 2 | 1, 2 | 7 | 6 | 1, 2, 3, 4, 5, 6 |
| 8 | 2 | 1, 4 | 8 | reserved | reserved |
| 9 | 2 | 2, 5 | 9 | reserved | reserved |
| 10 | 2 | 3, 6 | 10 | reserved | reserved |
| 11 | 3 | 1, 2, 3 | 11 | reserved | reserved |
| 12 | 3 | 1, 2, 4 | 12 | reserved | reserved |
| 13 | 3 | 1, 4, 5 | 13 | reserved | reserved |
| 14 | 3 | 1, 3, 4 | 14 | reserved | reserved |
| 15 | 3 | 1, 4, 6 | 15 | reserved | reserved |
| 16 | 3 | 1, 2, 5 | 16 | reserved | reserved |
| 17 | 3 | 2, 4, 5 | 17 | reserved | reserved |
| 18 | 3 | 2, 3, 5 | 18 | reserved | reserved |
| 19 | 3 | 2, 5, 6 | 19 | reserved | reserved |
| 20 | 3 | 1, 3, 6 | 20 | reserved | reserved |
| 21 | 3 | 3, 4, 6 | 21 | reserved | reserved |
| 22 | 3 | 2, 3, 6 | 22 | reserved | reserved |
| 23 | 3 | 3, 5, 6 | 23 | reserved | reserved |
| 24 | 4 | 1, 2, 3, 4 | 24 | reserved | reserved |
| 25 | 4 | 1, 2, 4, 5 | 25 | reserved | reserved |
| 26 | 4 | 1, 3, 4, 6 | 26 | reserved | reserved |
| 27 | 4 | 2, 3, 5, 6 | 27 | reserved | reserved |
| 28 | reserved | reserved | 28 | reserved | reserved |
| 29 | reserved | reserved | 29 | reserved | reserved |
| 30 | reserved | reserved | 30 | reserved | reserved |
| 31 | reserved | reserved | 31 | reserved | reserved |
| 32 | reserved | reserved | 32 | reserved | reserved |

TABLE 14

| Two Codewords: Codeword 0 enabled, Codeword 1 disabled | | | Two Codewords: Codeword 0 enabled, Codeword 1 enabled | | |
|---|---|---|---|---|---|
| index | Number of layer | p | index | Number of layer | p |
| 1 | 1 | 1 | 1 | 5 | 1, 2, 3, 4, 5 |
| 2 | 1 | 2 | 2 | 6 | 1, 2, 3, 4, 5, 6 |
| 3 | 1 | 3 | 3 | 7 | 1, 2, 3, 4, 5, 6, 7 |
| 4 | 1 | 4 | 4 | 8 | 1, 2, 3, 4, 5, 6, 7, 8 |
| 5 | 1 | 5 | 5 | reserved | reserved |
| 6 | 1 | 6 | 6 | reserved | reserved |
| 7 | 1 | 7 | 7 | reserved | reserved |
| 8 | 1 | 8 | 8 | reserved | reserved |
| 9 | 1 | 9 | 9 | reserved | reserved |
| 10 | 1 | 10 | 10 | reserved | reserved |
| 11 | 1 | 11 | 11 | reserved | reserved |
| 12 | 1 | 12 | 12 | reserved | reserved |
| 13 | 2 | 1, 2 | 13 | reserved | reserved |
| 14 | 2 | 1, 7 | 14 | reserved | reserved |
| 15 | 2 | 1, 10 | 15 | reserved | reserved |
| 16 | 2 | 2, 7 | 16 | reserved | reserved |
| 17 | 2 | 2, 10 | 17 | reserved | reserved |
| 18 | 2 | 7, 10 | 18 | reserved | reserved |
| 19 | 2 | 3, 4 | 19 | reserved | reserved |
| 20 | 2 | 3, 8 | 20 | reserved | reserved |
| 21 | 2 | 3, 11 | 21 | reserved | reserved |
| 22 | 2 | 4, 8 | 22 | reserved | reserved |
| 23 | 2 | 4, 11 | 23 | reserved | reserved |
| 24 | 2 | 8, 11 | 24 | reserved | reserved |
| 25 | 2 | 5, 6 | 25 | reserved | reserved |
| 26 | 2 | 5, 9 | 26 | reserved | reserved |
| 27 | 2 | 5, 12 | 27 | reserved | reserved |
| 28 | 2 | 6, 9 | 28 | reserved | reserved |
| 29 | 2 | 6, 12 | 29 | reserved | reserved |
| 30 | 2 | 9, 12 | 30 | reserved | reserved |
| 31 | 3 | 1, 2, 3 | 31 | reserved | reserved |
| 32 | 3 | 1, 2, 7 | 32 | reserved | reserved |
| 33 | 3 | 1, 2, 10 | 33 | reserved | reserved |
| 34 | 3 | 1, 7, 10 | 34 | reserved | reserved |
| 35 | 3 | 2, 7, 10 | 35 | reserved | reserved |
| 36 | 3 | 3, 4, 8 | 36 | reserved | reserved |
| 37 | 3 | 3, 4, 11 | 37 | reserved | reserved |
| 38 | 3 | 3, 8, 11 | 38 | reserved | reserved |
| 39 | 3 | 4, 8, 11 | 39 | reserved | reserved |
| 40 | 3 | 5, 6, 9 | 40 | reserved | reserved |
| 41 | 3 | 5, 6, 12 | 41 | reserved | reserved |
| 42 | 3 | 5, 9, 12 | 42 | reserved | reserved |
| 43 | 3 | 6, 9, 12 | 43 | reserved | reserved |
| 44 | 4 | 1, 2, 3, 4 | 44 | reserved | reserved |
| 45 | 4 | 1, 2, 7, 10 | 45 | reserved | reserved |
| 46 | 4 | 3, 4, 8, 11 | 46 | reserved | reserved |
| 47 | 4 | 5, 6, 9, 12 | 47 | reserved | reserved |
| — | — | — | — | — | — |
| 64 | reserved | reserved | 64 | reserved | reserved |

As described above, it is possible to reduce the number of extra bits in the above tables by applying Method 3. In this case, however, a scheduling restriction may occur for MU-MIMO.

Fourth Embodiment

The fourth embodiment is directed to a method for signaling DMRS port grouping information as part of the DMRS signaling information and a UE operation. The NR system supports DMRS grouping, which is defined as follows:
  DMRS ports within one DMRS port group are QCL-ed, and DMRS ports in different groups are non-QCL-ed; and
  Two antenna ports are QCL-ed (quasi co-located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial reception®x parameters.

The Type1 pattern supports 8 orthogonal DMRS ports that can be grouped, and the Type2 pattern supports 12 orthogonal DMRS ports that can be group. It should be noted that the DMRS port grouping method may be changed depending on the port mapping method which is changed according to the DMRS patter type. This may require a UE operation corresponding thereto. A description is made of the UE operation in association with the DMRS port grouping with reference to FIG. 8.

Figure 8:
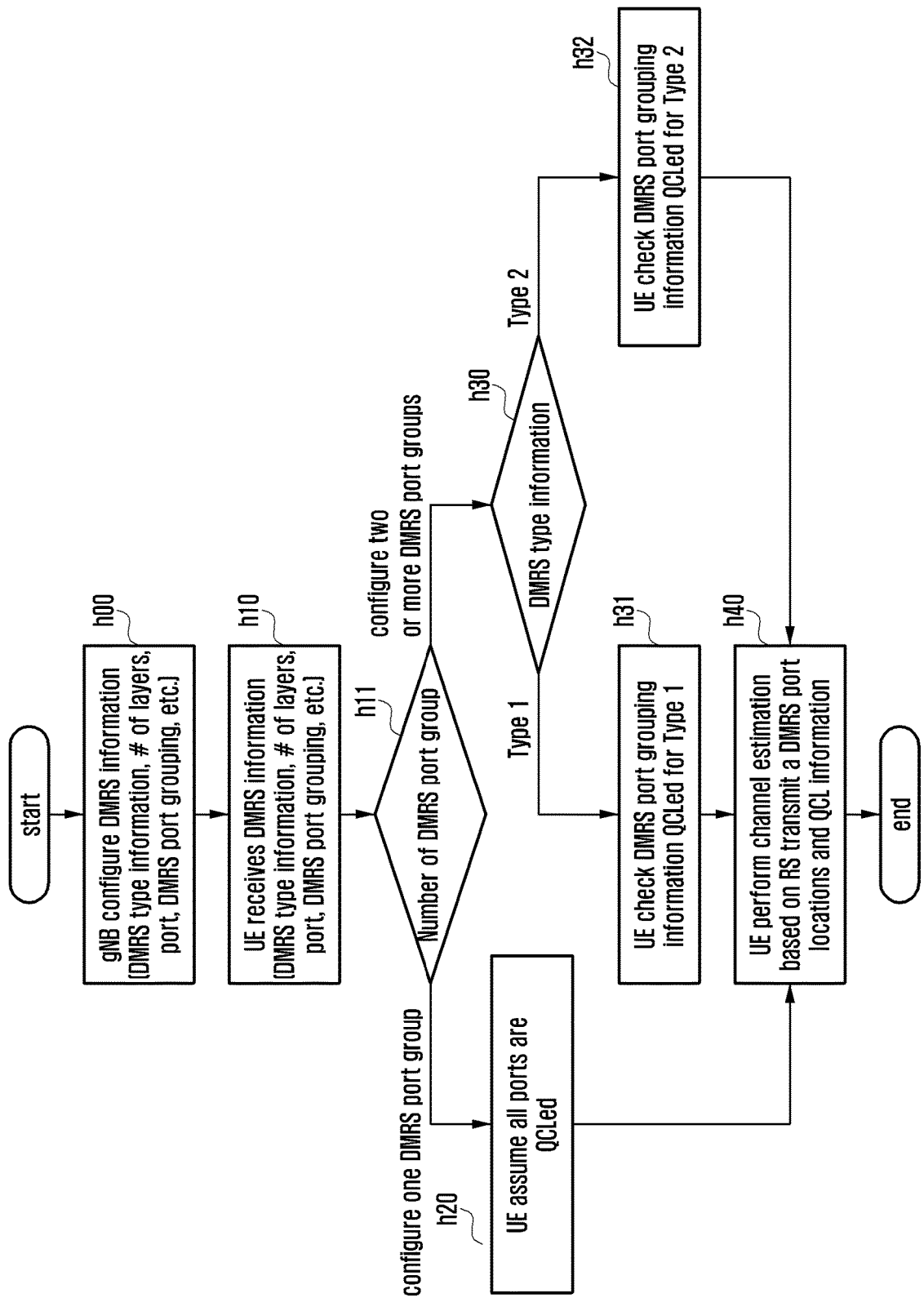
FIG. 8 is a flowchart of a method of a UE operation for DMRS port grouping, according to an embodiment.

FIG. 8 is a flowchart of a method of a UE operation for DMRS port grouping, according to an embodiment. At step h00, the gNB configures DMRS information. DMRS port grouping information may be configured in a semi-static manner via RRC signaling or dynamically via a media access control (MAC) CE or DCI.

A DMRS port grouping configuration method is provided herein. At step h10, the UE checks the DMRS information configured by the gNB. If it is determined at step h11 that the number of the DMRS port groups is one, the UE assumes at step h20 that all ports are QCL-ed and performs channel estimation based on the RS at the DMRS port locations and QCL information at step h40. If it is determined at step h11 that the number of DMRS port groups is two or more, the UE checks the configured DMRS type at step h30. As described above, the DMRS port grouping method may be changed because the port mapping method may be changed according to the DMRS pattern type. Accordingly, if it is determined at step h30 that the DMRS type1 is configured, the UE uses the QCL-ed DMRS port information for Type1 at step h31. If it is determined at step h30 that the DMRS type2 is configured, the UE uses the QCL-ed DMRS port information for Type2 at step h32. Finally, the UE performs channel estimation based on the RS at the DMRS port locations and QCL information at step h40.

The DMRS port grouping may be performed for various purposes. The DMRS port grouping may be performed for NC-JT. As a CoMP technique for multiple TP to transmit different data simultaneous, the NC-JT assumes different QCLs for different TPs to receive the data transmitted by the different TPs and estimate channels accurately. The data transmitted by different TBs may be regarded as being carried by two different codewords in view of the UE. Accordingly, it is necessary to transmit the DMRS port grouping information to the UE for NC-JT. As described above, the DMRS port grouping information may be transmitted in a hybrid form of RRC/MAC-CE/DCI or only via DCI. When using the RRC signaling, the DMRS ports may be grouped based on the QCL-ed DMRS ports information as shown in Table 15.

TABLE 15

```
-- ASN1START
NC-JTInfo         SEQUENCE {
    Type1-DMRSportgroupList      CHOICE {
                    Type1-Group1DMRSportList ::=    BIT STRING (SIZE (8)),
                    Type1-Group2DMRSportList ::=    BIT STRING (SIZE (8)),
                    Type1-Group3DMRSportList ::=    BIT STRING (SIZE (8)),
                    Type1-Group4DMRSportList ::=    BIT STRING (SIZE (8)),
    }
    Type2-DMRSportgroupList      CHOICE {
                    Type2-Group1DMRSportList ::=    BIT STRING (SIZE (12)),
                    Type2-Group2DMRSportList ::=    BIT STRING (SIZE (12)),
                    Type2-Group3DMRSportList ::=    BIT STRING (SIZE (12)),
                    Type2-Group4DMRSportList ::=    BIT STRING (SIZE (12)),
    }
}
-- ASN1STOP
```

Table 15 is an example of the DMRS port grouping information including DMRS Type1 and DMRS Type2 in the form of bitmaps for use in NC-JT. The DMRS port grouping information may also be preconfigured with a predetermined number of DMRS groups that can be selected for use, and the number of DMRS group may be greater or less than that shown above. The DMRS port grouping information may be configured via a MAC CE rather than RRC signaling in a similar manner. The terms used in Table 15 may be replaced by other terms. In Table 15, Type1-DMRSportgroupList includes DMRS port grouping information for DMRS Type1, Type1-Group1DMRSportList includes the information on the DMRS ports belonging to the DMRS port group1, and Type1-Group2DMRSportList includes the information on the DMRS ports belonging to the DMRS port group2. When only one DMRS port group is configured, the port information may be included in only the Type1-Group1DMRSportList but not in the Type1-Group2DMRSportList. When the information is expressed in the form of bitmap, each bit is set to 1 for use of the corresponding port and 0 for non-use of the corresponding port, and the bits constituting the bitmap are mapped to the port numbers in the ascending order, i.e., the first bit to the lowest port number and the last bit to the highest port number.

Assuming Type1-Group1DMRSportList=[1 1 1 1 0 0 0 0] and Type1-Group2DMRSportList=[0 0 0 0 0 0 0 0], among the DMRS ports 0 to 7, DMRS ports 0, 1, 2, and 3 are used and QCL-ed in one DMRS port group. When two DMRS port groups are configured, if Type1-Group1DMRSportList=[1 1 0 0 1 1 0 0] and Type1-Group2DMRSportList=[0 0 1 1 0 0 1 1], all of the DMRS ports 0 to 7 are used such that ports 0, 1, 4, and 5 are grouped into DMRS port group1 and ports 2, 3, 6, and 7 are into DMRS group2.

It may be possible to configure more DMRS port groups in a similar manner, and the same principle can be applied to Type2 DMRS configuration. If there are two or more DMRS port groups, there may be a need of additional configuration for supporting the NC-JT. For example, assuming two DMRS port groups are configured for Type1 DMRS, Type1-Group1DMRSportList=[1 1 0 0 1 1 0 0], Type1-Group2DMRSportList=[0 0 1 1 0 0 1 1], and DMRS ports are configured for TP1 and TP2 respectively, there is a need of additional configuration for when all of the DMRS ports configured for the respective TPs are not used for NC-JT. For example, when it is necessary to select one DMRS port from each DMRS port group for 2-layer NC-JT, it may be considered to select the lowest port number as the simplest method. In this case, DMRS port=0 is selected for TP1 and DMRS port=2 is selected for TP2 in the above example.

For 3-layer NC-JT with 1-layer transmission from TP1 and 2-layer transmission from TP2, it may be possible to select DMRS port 0 for TP1 and DMRS ports 2 and 3 for TP2. The DMRS port grouping information as shown in Table 15 may be configured via RRC signaling or MAC CE. However, as the simplest method, it may be considered to allow configuring up to 2 DMRS port groups through equal partitioning. That is, in the case of Type1 DMRS supporting up to 8 orthogonal antenna ports, it may be possible to group the antenna ports into two fixed DMRS port groups, e.g., one DMRS port group including ports 0 to 3 and the other DMRS port group including ports 4 to 7. However, this method has a drawback of difficulty in configuring the DMRS port groups flexibly by reflecting QCL characteristics. It may also be possible to configure DMRS port groups through gNB implementation. The DMRS port groups are configured with the DMRS ports indicated in the PDCCH transmitted by the gNB. The DMRS port group configuration methods can be summarized as follows:

Method 1: To configure DMRS port grouping information via RRC signaling or MAC CE;
Method 2: To fix DMRS port groups through equal partitioning; and
Method 3: To configure DMRS port groups with DMRS ports indicated in PDCCH by decision of gNB.

In the NC-JT, it may be possible to use multiple PDCCHs and one PDCCH. When using multiple PDCCH for supporting the NC-JT, the UE may receive multiple PDCCHs in one or multiple bandwidth parts of one component carrier. These NC-JT assistance methods may be summarized as follows:

Method 1: NC-JT with assistance of multiple PDCCHs;
  Method 1-1: UE receive multiple PDCCHs in one bandwidth part of one component carrier;
  Method 1-2: UE receive PDCCHs in multiple bandwidth parts of one component carrier; and
Method 2: NC-JT with assistance of one PDCCH.

As a result, the DMRS port group configuration may be performed in various fashions by combining the three DMRS port group configuration methods and two NC-JT assistance methods.

For example, when using the NC-JT assistance Method 1 and the DMRS port group configuration Method 3, the DMRS port groups are configured with the DMRS ports indicated in the PDCCHs transmitted by the respective TPs such that the UE receives signals in the NC-JT mode by demodulating the multiple PDCCHs.

When using the NC-JT assistance Method 2 supporting only one PDCCH, however, it may be necessary to signal additional information via DCI. Table 16 shows an example of DMRS port grouping information added for the NC-JT with the assistance of one PDCCH. Although Table 16 is an example of the information for supporting up to 2 DMRS port groups, the number of DMRS port groups is not so limited. In Table 16, there are two groups for 2-CW transmission, which means signaling for NC-JT, and the ports constituting each group is configured via RRC signaling or MAC CE. That is, this signaling for NC-JT can be used only for when two or more TPs are used for transmission. Here, it should be noted that the expression of signaling for NC-JT may be replaced by other terms, such as NC-JT, rather than two groups.

TABLE 16

| Two Codewords: Codeword 0 enabled, Codeword 1 enabled | |
|---|---|
| Value | Message |
| 0 | 2 layer, two group |
| 1 | 3 layer, two group |
| 2 | 4 layer, two group |
| 3 | 5 layer, P1-P5 |
| 4 | 5 layer, two group |
| 5 | 6 layer, P1-P6 |
| 6 | 6 layer, two group |
| 7 | 7 layer, P1-P7 |
| 8 | 7 layer, two group |
| 9 | 8 layer, P1-P8 |
| 10 | 8 layer, two group |
| 11 | Reserved |
| 12 | Reserved |
| 13 | Reserved |
| 14 | Reserved |
| 15 | Reserved |

In an alternative embodiment, elaborated examples of the information for when NC-NT with the assistance of one PDCCH are provided in the similar way of Table 16 (see Tables 20-3 and 28-1, for example).

The above methods of configuring the DMRS port groups via RRC signaling or MAC CE are advantageous in terms of making it possible to group the ports in various ways. When configuring the DMRS port groups only via DCI, the number of bits required for the information may increase because of the existence of various port grouping methods. Accordingly, it is necessary to consider DCI overhead in designing the DMRS port group only via DCI. In order to overcome this drawback, it may be possible to consider a method for configuring a number of fixed DMRS port groups in a restricted manner and select at least one of the DMRS port groups. It may be considered to group the DMRS ports CDM-ed in the time-frequency domain into DMRS port groups for DMRS type1 or type2 as described in the first embodiment. When using this method, the DMRS type1 may consist of two DMRS port groups (one port group of the red-colored ports and the other port group of the green-colored ports in FIG. 4), and the DMRS type2 may consist of three DMRS port groups (composed of red-colored, green-colored, and blue-colored ports, respectively, in FIG. 5). In the case of the DMRS type2, however, it may be unclear to configure two port groups depending on the DMRS port mapping scheme. For example, when using the pattern depicted in part e30 of FIG. 4, 6 ports may be grouped into to DMRS port groups according to various grouping schemes. It may be possible to reduce the DCI overhead caused by grouping the DMRS ports only via DCI by use of specific grouping methods fixedly. In order to group the ports CDM-ed in the time-frequency domain and signal the DMRS port grouping information via DCI as above, it may be possible to consider two methods as follows:

Alt-1: independent signaling with 1 or 2 bits of DCI;
  DMRS Type1: Possible to configure two DMRS port groups with 1 bit;
  DMRS Type2: Possible to configure 3 DMRS port groups with 2 bits; and Alt-2: signaling with reserved bits of DMRS table.

The method of Alt-2 is advantageous in terms of no extra signaling overhead when the remaining reserved bits are enough in number in the DMRS Tables described above. For example, it may be possible to make a signaling with the reserved bits in Tables 9 and 10, as described above with respect to the third embodiment.

It may also be possible to use the DMRS port grouping for PTRS and DMRS port assignment as well as NC-JT. A DMRS port group may be assigned a PTRS. Here, it may be possible to consider a method of configuring the DMRS port groups for PTRS as shown in Table 17-1 via RRC configuration to associate the PTRS with the DMRS ports independently from the DMRS port groups for NC-JT.

TABLE 17-1

```
-- ASN1START
PTRSInfo                SEQUENCE {
    Type1-DMRSportgroupList    CHOICE {
                    Type1-Group1DMRSportList ::= BIT STRING (SIZE (8)),
                    Type1-Group2DMRSportList ::= BIT STRING (SIZE (8)),
                    Type1-Group3DMRSportList ::= BIT STRING (SIZE (8)),
                    Type1-Group4DMRSportList ::= BIT STRING (SIZE (8)),
    }
    Type2-DMRSportgroupList  CHOICE {
                    Type2-Group1DMRSportList ::= BIT STRING (SIZE (12)),
                    Type2-Group2DMRSportList ::= BIT STRING (SIZE (12)),
                    Type2-Group3DMRSportList ::= BIT STRING (SIZE (12)),
                    Type2-Group4DMRSportList ::= BIT STRING (SIZE (12)),
}
-- ASN1STOP
```

Table 17-1 is an example of the DMRS port grouping information including DMRS Type1 and DMRS Type2 in the form of bitmaps, which is used as PTRS. The DMRS port grouping information may also be preconfigured with a predetermined number of DMRS groups that can be selected for use, and the number of DMRS groups may be greater or less than that in Table 17-1. The DMRS port grouping information may be configured via a MAC CE rather than RRC signaling in a similar manner. The terms used in Table 17-1 may be replaced by other terms, see Table 15, for example.

Fifth Embodiment

The fifth embodiment is directed to a method for signaling MU-pairing information as part of DMRS signaling information and a related UE operation. In the fifth embodiment, it is assumed that DMRS and data are multiplexed in the frequency domain. The data are transmitted on the subcarriers carrying no DMRS in the frequency domain. As described in the fourth embodiment, the DMRS patterns for use in the NR system differs from the DMRS patterns for use in the LTE system in that it is difficult to make a distinction among the ports for MU-MIMO with only CDM because the number of orthogonal DMRS ports for MU-MIMO increases considerably.

Accordingly, the distinction among the ports for MU-MIMO should be made with the application of CDM, FDM, and TDM together. Unlike in LTE, it may be difficult to support the MU-MIMO transparently in NR. If no MU-pairing information is provided for MU-MIMO, it is difficult to achieve rate matching. For example, if not all REs is DMRS REs within a symbol in the DMRS patterns described in the first embodiment, the gNB may use the non-DMRS REs for data transmission to improve transmission efficiency. In the NR system in which the port distinction for MU-MIMO is difficult only with CDM, it is necessary to indicate whether data are transmitted at non-DMRS REs. It may be considered to signal the information on the number of CDM groups from which the UE is capable of obtaining the MU-pairing information without receiving the MU-pairing information explicitly. The DMRS type1 consists of two CDM groups (one composed of the red-colored ports and the other composed of the green-colored ports in FIG. 4), and DMRS type2 consists of three CDM groups (composed of red-colored, green-colored, and blue-colored ports, respectively, in FIG. 5).

The method for signaling the information on the number of CDM groups and the related UE operation are described with reference to FIG. 9.

Figure 9B:
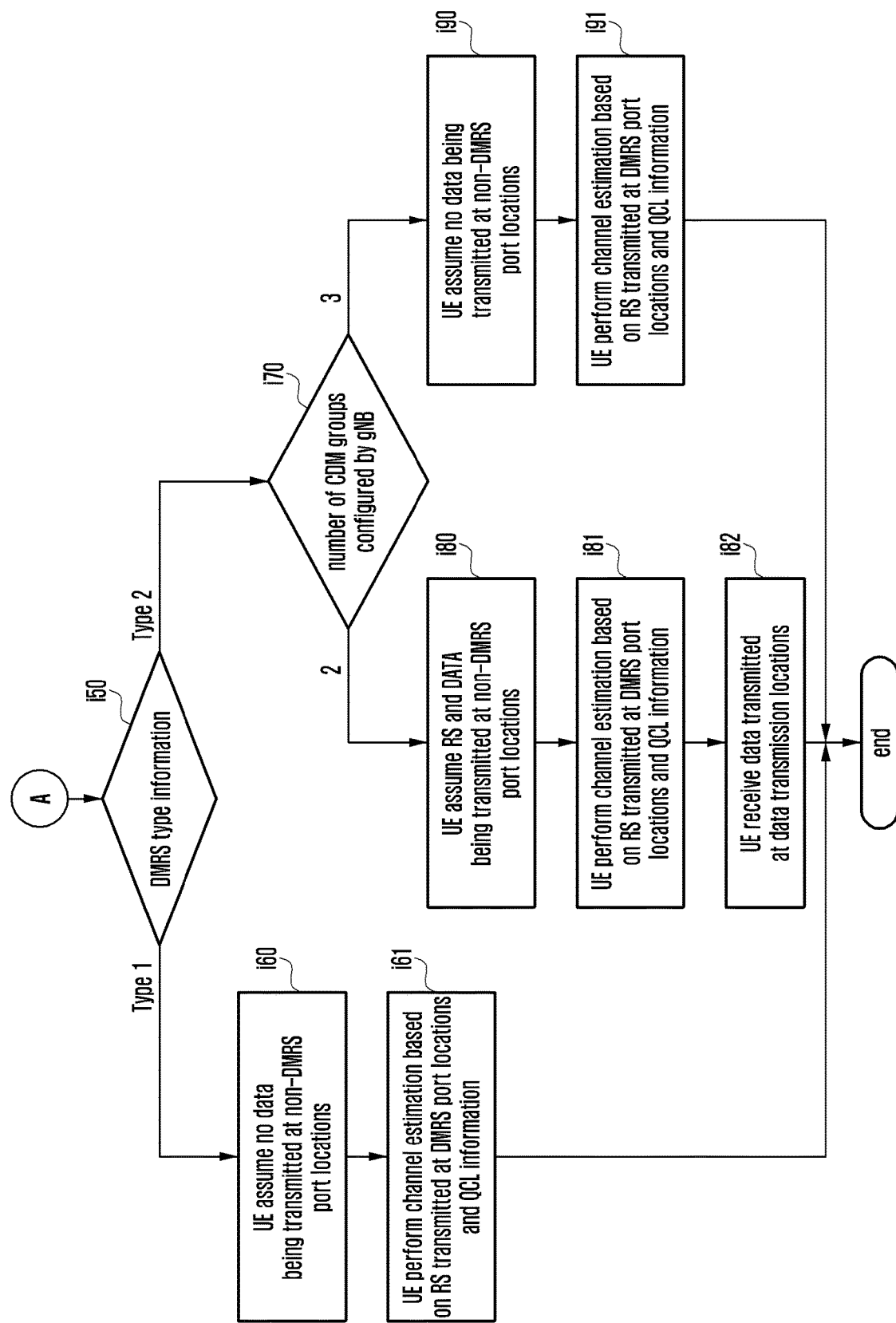

FIGS. 9A and 9B are flowcharts of a method for a UE to receive information on a number of CDM groups and operate based on the received information, according to an embodiment. At step i00, the UE checks the information on the DMRS configured by the gNB. The DMRS information includes the information on the number of DMRS groups. At step i10, the UE compares the number of CDM groups determined based on the DMRS port locations and the number of CDM group configured by the gNB.

If the number of CDM groups determined by the UE and the number of CDM groups configured by the gNB are identical with each other, the UE assumes at step i20 that the DMRS is transmitted only at the DMRS port locations. At step i21, the UE determines whether the DMRS is transmitted at all REs within the corresponding OFDM symbol. If it is determined that the DMRS is transmitted at all REs within the corresponding OFDM symbol, the UE performs, at step i30, channel estimation based on the RS transmitted at the DMRS port locations and QCL information. Otherwise, if it is determined at step i21 that the DMRS is not at all REs within the corresponding OFDM symbol, the UE performs channel estimation, at step i40, based on the RS transmitted at the DMRS port locations and QCL information.

At step i41, the UE receives data at the non-DMRS port locations. If it is determined at step i10 that the number of CDM groups configured by the gNB is greater than the number of CDM groups determined by the UE, the UE checks the DMRS type information at step i50 (FIG. 9B). If it is determined that the DMRS type information indicates DMRS type1, the UE assumes at step i60 that no data is transmitted at non-DMRS port locations.

At step i61, the UE performs channel estimation based on the RS transmitted at the DMRS port locations and QCL information. If it is determined at step i50 that the DMRS type information indicates DMRS type2, the UE determines the number of CDM groups configured by the gNB at step i70. If it is determined that the number of CDM groups is 2, the UE assumes that RS and data are transmitted at locations of the other CDM group which not transmit the DMRS port at step i80.

At step i81, the UE performs channel estimation based on the RS transmitted at the DMRS port locations and QCL information, and receives, at step i82, data at the data transmission locations.

If it is determined at step i70 that the number of CDM groups is 3, the UE assumes at step i90 that no data are transmitted at the non-DMRS port locations and performs channel estimation at step i91 based on the RS transmitted at the DMRS port locations and QCL information.

As described above, the disclosed method makes it possible to achieve rate matching for MU-MIMO when DMRS and data are FDM-ed in a symbol carrying the DMRS. The disclosed method also makes it possible to support the MU-MIMO non-transparently through implicit signaling. It may be possible to consider two methods for use in signaling the CDM groups CDM-ed in the time-frequency domain as follows:

Alt-1: independent signaling with 1 or 2 bits of DCI;
  DMRS Type1: Possible to configure two DMRS port groups with 1 bit;
  DMRS Type2: Possible to configure 3 DMRS port groups with 2 bits;
Alt-2: signaling with reserved bits of DMRS table; and
  A separate signaling index for indicating that data and DMRS and FDM-ed is added; remaining signaling indices indicate that data and DMRS are not FDM-ed.

In the case of Alt-1, it is possible use a 1-bit indicator for DMRS Type1 to indicate whether the number of CDM groups scheduled by the gNB is 1 or 2. As described with reference to FIGS. 9A and 9B, if the total number of CDM groups scheduled by the gNB is 1, the UE performs channel estimation under the assumption that the RS is transmitted at the signaled DMRS port locations. The UE may also receive data at non-DMRS REs. When the number of CDM groups scheduled by the gNB is 2, if the signaled DMRS port locations are transmitted through two CDM groups, the UE performs channel estimation under the assumption that the RS is transmitted at the signaled DMRS port locations.

Also, if the signaled DMRS port locations are transmitted through one CDM group, the UE assumes that the RS for another UE is transmitted in the other CDM group. For the DMRS Type2, a 2-bit indicator is necessary to indicate the number of CDM groups scheduled by the gNB and the information on the CDM groups for data reception, see Table 17-2 below.

In Table 17-2, the codepoint 00 indicates that the number of CDM groups is 1 and, the UE may receive data in the CDM group of ports other than the signaled DMRS ports. In Table 17-2, the codepoint 11 indicates that the number of CDM groups is 3 and, all REs are used for RS transmission. Codepoints 01 and 10 indicate that the number of CDM groups is 2, and the UE is aware of the location of the CDM group for receiving data based on the information on the CDM group of the signaled DMRS port locations. When the UE is signaled, the DMRS port locations as blue-colored in FIG. 5, if UE is capable of receiving data at the CDM group of red-colored locations, it may be possible to signal the code point 01. When the UE is signaled, the DMRS port locations as blue-colored in FIG. 5, if the UE is capable of receiving data at the CDM group of green-colored locations, it may be possible to signal 10. In Table 17-2 it should be noted that other codepoints can be signaled in the same manner. The color information given in Table 17-2 may be used in conjunction with reference to FIG. 5.

TABLE 17-2

| | # CDM groups | DMRS port configuration at blue locations | DMRS port configuration at green locations | DMRS port configuration at red locations |
|---|---|---|---|---|
| 00 | 1 | — | — | — |
| 01 | 2 | Red | Red | Green |
| 10 | 3 | Green | Blue | Blue |
| 11 | 4 | — | — | — |

A method for PDSCH rate matching in a situation where MU-MIMO scheduling is performed in one-symbol or two-symbol DMRS patterns as shown in FIGS. 4 and 5 is provided. For example, when one UE is assigned DMRS ports in a one-symbol DMRS pattern and another UE is assigned DMRS ports in a two-symbol DMRS pattern, it is impossible to perform PDSCH rate matching with the provided method. It should be noted that the 1-bit information in use for DMRS Type1 and the 2-bit information in use for DMRS Type2 can be used for signaling other information.

The method of Alt-2 uses the reserved bits of the DMRS table and is advantageous in terms of no extra signaling overhead when the remaining reserved bits are enough in number. For example, in may be possible to make a signaling with the reserved bits in Tables 9 and 10 in the third embodiment. In the following embodiment, an elaborated example of Alt-2 is additionally provided (see Table 20-2 in the sixth embodiment below).

Sixth Embodiment

Among the following methods for reducing number of layer & port number information signaling overhead, the third embodiment is directed to Methods 1 and 2, while the sixth embodiment is directed to Method 3.

Method 1: If a one symbol and two symbol indicator is provided by higher layers, it may be possible to signal the number of layer & port number information for the one-symbol case and the number of layer & port number information for the two-symbol case in Tables 9 and 10 separately.

Method 2: If number of layers >4, this is the case of 2-CW transmission and thus it may be considered to configure the number of layer & port number information for 1-CW transmission (number of layers ≤4) into two rows for signaling.

Method 3: It may also be possible to further consider limiting port number assignment to specific port numbers among the combinations of port assignments configured according to the port number assignment method (see third embodiment).

In the sixth embodiment, it is assumed that the port mapping schemes illustrated in parts d20 and d60 of FIG. 4 for Type1 DMRS pattern, and parts for the port mapping schemes illustrated in parts e10 and e30 of FIG. 5 for Type2 DMRS pattern. It should be noted that the method provided in this embodiment is applicable to when other port mapping schemes are used for Type1 and Type2 DMRS patterns.

As described in the first embodiment, although FIGS. 4 and 5 illustrate that the DMRS port mapping is performed in the order from the top to the bottom subcarrier, it may also be possible to perform the DMRS port mapping in the order from bottom to the top subcarrier. That is, parts d20 and d60 of FIG. 4 may be expressed as parts j10 and j20 of FIG. 10A, respectively. Also, parts e10 and e30 of FIG. 5 may be expressed as parts j30 and j40 of FIG. 10A, respectively. Parts d20 and d70 of FIG. 4 may be expressed as parts j50 and j60 of FIG. 10B, respectively. Also, parts e10 and e70 of FIG. 5 may be expressed as parts j70 and j80 of FIG. 10B, respectively.

As described above, FIGS. 10A and 10B illustrate when the DMRS port mapping is performed in the opposite direction of that illustrated in FIGS. 4 and 5, respectively, in the frequency domain. It should be noted that the port indices P1, P2, P3, . . . used in FIGS. 4 and 5 are expressed as 0, 1, 2 . . . in FIGS. 10A and 10B. Table 18-1 shows configurations of parameters in Table 4 for part j10 (one symbol) and part j20 (two symbols) of FIG. 10A for Type1 DMRS pattern, as in the method provided in the first embodiment. Table 18-2 shows configurations of parameters in Table 4 for part j50 (one symbol) and part j60 (two symbols) of FIG. 10B for Type1 DMRS pattern.

TABLE 18-1

| | | | $w_t(l')$ | |
|---|---|---|---|---|
| | | $w_f(k')$ | One symbol | Two symbol |
| p | Δ | [k' = 0 k' = 1] | [l' = 0] | [l' = 0 l' = 1] |
| 0 | 0 | [+1 +1] | [+1] | [+1 +1] |
| 1 | 0 | [+1 −1] | [+1] | [+1 +1] |
| 2 | 1 | [+1 +1] | [+1] | [+1 +1] |
| 3 | 1 | [+1 −1] | [+1] | [+1 +1] |
| 4 | 0 | [+1 +1] | — | [+1 −1] |
| 5 | 0 | [+1 −1] | — | [+1 −1] |
| 6 | 1 | [+1 +1] | — | [+1 −1] |
| 7 | 1 | [+1 −1] | — | [+1 −1] |

TABLE 18-2

| | Δ | | $w_f(k')$ | | $w_t(l')$ | |
|---|---|---|---|---|---|---|
| | | | One symbol | Two symbol | One symbol | Two symbol |
| p | One symbol | Two symbol | [k' = 0 k' = 1] | [k' = 0 k' = 1] | [l' = 0] | [l' = 0 l' = 1] |
| 0 | 0 | 0 | [+1 +1] | [+1 +1] | [+1] | [+1 +1] |
| 1 | 0 | 0 | [+1 −1] | [+1 +1] | [+1] | [+1 −1] |
| 2 | 1 | 0 | [+1 +1] | [+1 −1] | [+1] | [+1 +1] |
| 3 | 1 | 0 | [+1 −1] | [+1 −1] | [+1] | [+1 −1] |
| 4 | 0 | 1 | — | [+1 +1] | — | [+1 +1] |
| 5 | 0 | 1 | — | [+1 +1] | — | [+1 −1] |
| 6 | 1 | 1 | — | [+1 −1] | — | [+1 +1] |
| 7 | 1 | 1 | — | [+1 −1] | — | [+1 −1] |

Figure 10A:
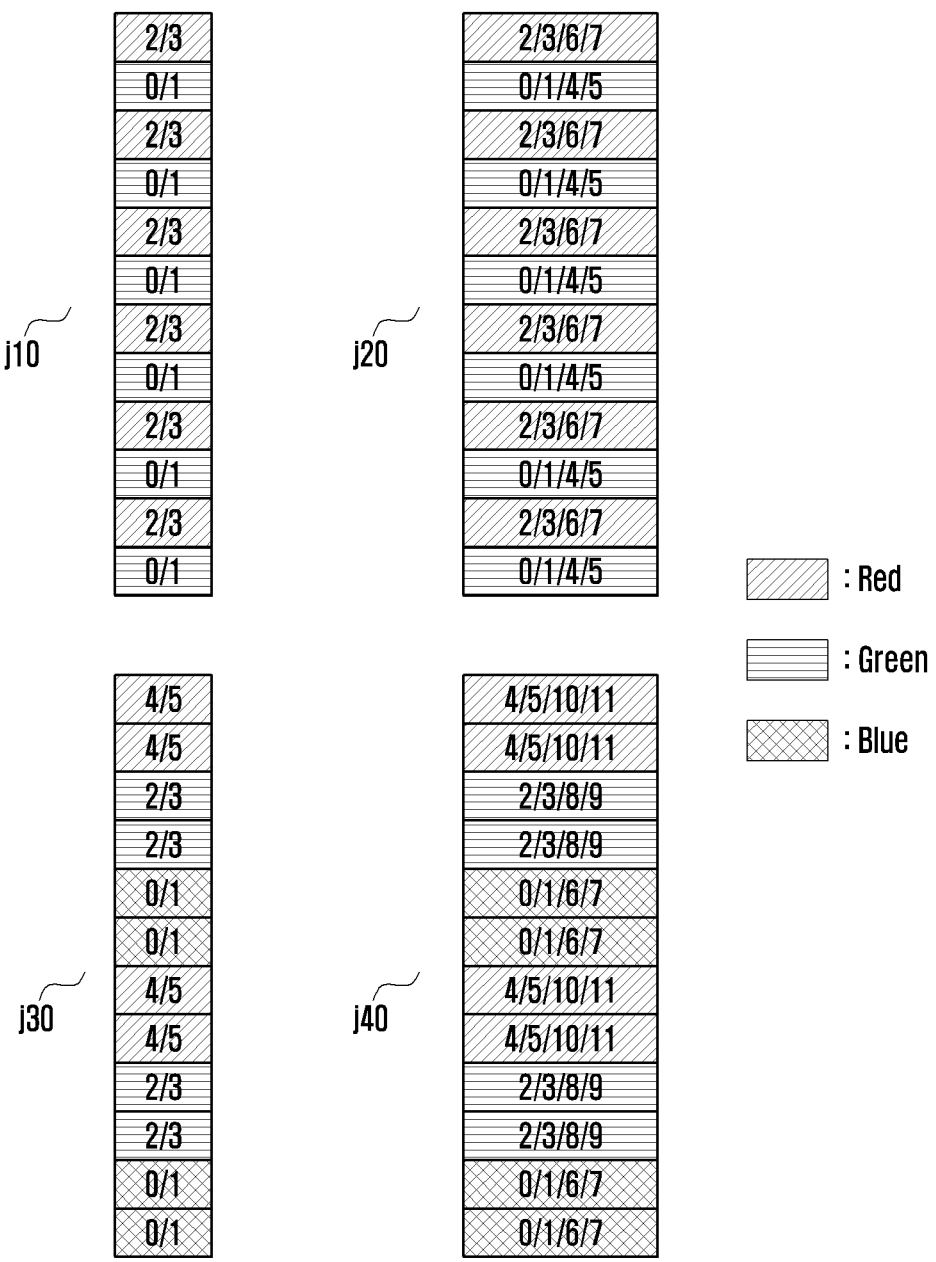

Table 18-3 shows configurations of parameters in Table 4 for part j30 (one symbol) and part j40 (two symbols) of FIG. 10A for Type2 DMRS pattern. Also, Table 18-4 shows configurations of parameters in Table 4 for part j70 (one symbol) and part j80 (two symbols) of FIG. 10B for Type2 DMRS pattern.

TABLE 18-3

| | | | $w_t(l')$ | |
|---|---|---|---|---|
| | | $w_f(k')$ | One symbol | Two symbol |
| p | Δ | [k' = 0 k' = 1] | [l' = 0] | [l' = 0 l' = 1] |
| 0 | 0 | [+1 +1] | [+1] | [+1 +1] |
| 1 | 0 | [+1 −1] | [+1] | [+1 +1] |
| 2 | 2 | [+1 +1] | [+1] | [+1 +1] |
| 3 | 2 | [+1 −1] | [+1] | [+1 +1] |
| 4 | 4 | [+1 +1] | [+1] | [+1 +1] |
| 5 | 4 | [+1 −1] | [+1] | [+1 +1] |
| 6 | 0 | [+1 +1] | — | [+1 −1] |
| 7 | 0 | [+1 −1] | — | [+1 −1] |
| 8 | 2 | [+1 +1] | — | [+1 −1] |
| 9 | 2 | [+1 −1] | — | [+1 −1] |
| 10 | 4 | [+1 +1] | — | [+1 −1] |
| 11 | 4 | [+1 −1] | — | [+1 −1] |

TABLE 18-4

| | Δ | | $w_f(k')$ | | $w_t(l')$ | |
|---|---|---|---|---|---|---|
| | | | One symbol | Two symbol | One symbol | Two symbol |
| p | One symbol | Two symbol | [k' = 0 k' = 1] | [k' = 0 k' = 1] | [l' = 0] | [l' = 0 l' = 1] |
| 0 | 0 | 0 | [+1 +1] | [+1 +1] | [+1] | [+1 +1] |
| 1 | 0 | 0 | [+1 −1] | [+1 +1] | [+1] | [+1 −1] |
| 2 | 2 | 0 | [+1 +1] | [+1 −1] | [+1] | [+1 +1] |
| 3 | 2 | 0 | [+1 −1] | [+1 −1] | [+1] | [+1 −1] |
| 4 | 4 | 2 | [+1 +1] | [+1 +1] | [+1] | [+1 +1] |

TABLE 18-4-continued

| | Δ | | $w_f(k')$ | | $w_t(l')$ | |
|---|---|---|---|---|---|---|
| | One symbol | Two symbol | One symbol | Two symbol | One symbol | Two symbol |
| p | One symbol | Two symbol | [k' = 0 k' = 1] | [k' = 0 k' = 1] | [l' = 0] | [l' = 0 l' = 1] |
| 5 | 4 | 2 | [+1 −1] | [+1 +1] | [+1] | [+1 −1] |
| 6 | 0 | 2 | — | [+1 −1] | — | [+1 +1] |
| 7 | 0 | 2 | — | [+1 −1] | — | [+1 −1] |
| 8 | 2 | 4 | — | [+1 +1] | — | [+1 +1] |
| 9 | 2 | 4 | — | [+1 +1] | — | [+1 −1] |
| 10 | 4 | 4 | — | [+1 −1] | — | [+1 +1] |
| 11 | 4 | 4 | — | [+1 −1] | — | [+1 −1] |

A description is made of the number of layer & port number information signaling overhead reduction method under the assumption that Type1 and Type2 DMRS pattern mappings are configured. It should be noted that the description is made based on the port mappings of Tables 18-1 and 18-3 unless otherwise stated. When the description is made based on the port mappings of Tables 18-2 and 18-4. It should be noted that the detailed signaling indication method may be changed according to the port mapping scheme as described above. However, the disclosed method may also be applied in the same manner regardless of the port mapping scheme. The number of layer & port number information signaling may be performed in two distinctive methods as follows:

Method 1: Support transmission of up to 4 layers per user in MU-MIMO mode; and
   Method 2: Support transmission of up to 2 layers per UE in MU-MIMO mode.

In comparison with Method 2, Method 1 which supports more transmission layers, i.e., up to 4, per user in MU-MIMO mode than Method 2, makes it possible to expect flexible MU-MIMO scheduling and performance enhancement. However, if the number of per-user transmission layers allowed in the MU-MIMO mode increases, the number of combination cases for co-scheduling to be considered for MU-MIMO transmission increases, resulting in increase of signaling overhead. The Type1 DMRS pattern supports up to 8 orthogonal DMRS ports for MU-MIMO, and Type2 DMRS pattern supports up to 12 orthogonal DMRS ports for MU-MIMO. Accordingly, it may be advantageous to apply the Type1 DMRS pattern in Method 1 (see Table 20 below) and the Type2 DMRS pattern in Method 2 (see Table 28 below). The disclosure encompasses all of the cases of applying Method 1 and Method 2 for Type1 and Type 2 DMRS patterns.

A description is made of the method for signaling the number of layer & port number information when considering MU-MIMO transmission of up to 4 layers per user for the Type1 and Type2 DMRS patterns. The disclosed method may be performed according to the following principle.

Design Principle 1
For X=1 layer transmission, any orthogonal DMRS port can be scheduled.
For 1<X≤K layer transmission:
   For DMRS configuration type1 with one symbol, K=2;
      X=2 layers can be CDM-ed or [FDM-ed];
   For DMRS configuration type1 with two symbol, K=4;
      X=2 layers can be CDM-ed or [FDM-ed];
      X=3 layers can be CDM-ed;
      X=4 layers can be CDM-ed;
   For DMRS configuration type2 with one symbol, K=3;
      X=2 layers can be CDM-ed or [FDM-ed];
      X=3 layers can be CDM-ed or [FDM-ed];
   For DMRS configuration type2 with two symbol, K=4;
      X=2 layers can be CDM-ed or [FDM-ed];
      X=3 layers can be CDM-ed or [FDM-ed];
      X=4 layers can be CDM-ed;
   The combinations of CDM-ed or FDM-ed DMRS ports can be limited in order to reduce DCI overhead;
For X>K layer transmission;
   X layers can be mapped to X DMRS ports in a consecutive manner; and
   EX., for X=5, DMRS port 0, 1, 2, 3, 4, 5 are used for transmission.

In design principle 1, [ ] denotes that the corresponding scheme may be applied or not. For example, it may be considered to omit the FDM scheme because of its low utilization or in order to reduce signaling overhead.

The Type1 DMRS pattern may be represented by Table 19 according to the above design principle.

TABLE 19

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 2 | 0, 1 | 1 | CDM |
| 6 | 2 | 2, 3 | 1 | CDM |
| 7 | 2 | 0, 2 | 1 | FDM |
| 8 | 2 | 1, 3 | 1 | FDM |
| 9 | 3 | 0, 1, 2 | 1 | CDM + FDM |
| 10 | 4 | 0, 1, 2, 3 | 1 | CDM + FDM |
| 11 | 1 | 0 | 2 | |
| 12 | 1 | 1 | 2 | |
| 13 | 1 | 2 | 2 | |
| 14 | 1 | 3 | 2 | |
| 15 | 1 | 4 | 2 | |
| 16 | 1 | 5 | 2 | |
| 17 | 1 | 6 | 2 | |
| 18 | 1 | 7 | 2 | |
| 19 | 2 | 0, 1 | 2 | CDM |
| 20 | 2 | 2, 3 | 2 | CDM |
| 21 | 2 | 4, 5 | 2 | CDM |
| 22 | 2 | 6, 7 | 2 | CDM |
| 23 | 2 | 0, 2 | 2 | FDM |
| 24 | 2 | 1, 3 | 2 | FDM |
| 25 | 3 | 0, 1, 4 | 2 | CDM |
| 26 | 3 | 2, 3, 6 | 2 | CDM |
| 27 | 4 | 0, 1, 4, 5 | 2 | CDM |
| 28 | 4 | 2, 3, 6, 7 | 2 | CDM |
| 29 | 5 | 0, 1, 2, 3, 4 | 2 | CDM + FDM |
| 30 | 6 | 0, 1, 2, 3, 4, 5 | 2 | CDM + FDM |
| 31 | 7 | 0, 1, 2, 3, 4, 5, 6 | 2 | CDM + FDM |
| 32 | 8 | 0, 1, 2, 3, 4, 5, 6, 7 | 2 | CDM + FDM |

The CDM and FDM are allowed for 2-layer transmission in the one-symbol pattern as shown in Table 19. The CDM is applied to make a distinction between ports 0 and 1 of the green-colored comb as shown in part j10 of FIG. 10A by applying CDM codes in the frequency domain as shown in Table 17, and FDM is applied to make a distinction between port 0 and port 2 by the green-colored comb and red-colored comb in the frequency domain as shown in part j10 of FIG. 10A.

When distinguishing between the ports by applying FDM, although the number of combination cases is 4, other combinations can be used in consideration of signaling overhead. The FDM is used to achieve performance gain by making a distinction between the ports in consideration of the performance degradation when using the CDM for distinction among the ports where there is a large channel variation in the frequency domain, and particularly it can be used for SU-MIMO transmission.

Figure 11:
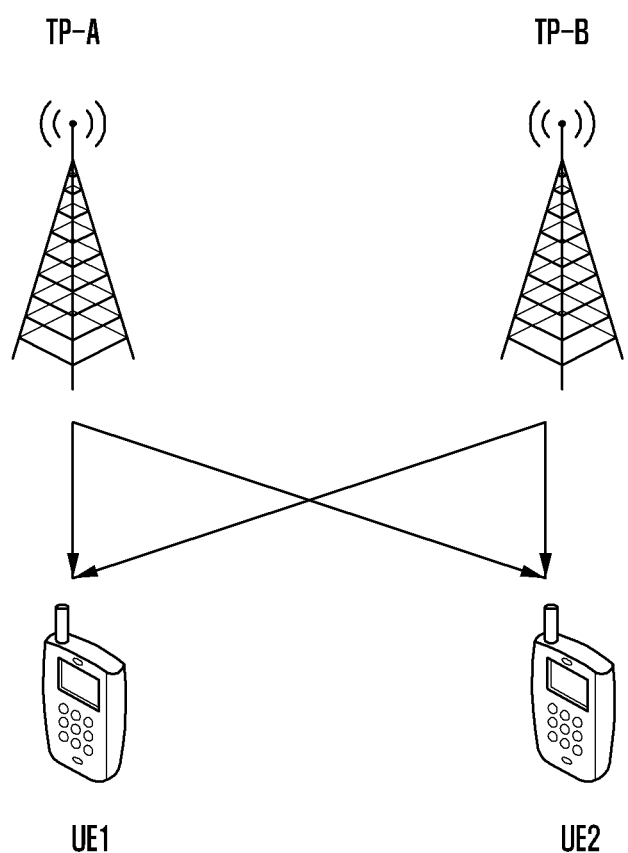
FIG. 11 is a diagram of a multi-user MIMO (MU-MIMO) transmission with multiple transmission points (TPs), according to an embodiment.

Since it is difficult to assume that two TPs involved in 2-layer MU-MIMO transmission as shown in FIG. 11 are QCL-ed, if assuming that CDM-ed groups are QCL-ed, it may be possible to perform MU-MIMO scheduling in the situation as shown in FIG. 11. Accordingly, indices 7 and 8 in Table 19 may be used in such a case. However, it may be possible to omit index 9 from the Table 19, because of its low utilization, when not counting the situation of FIG. 11. If the FDM is not allowed, the index 7 may also be omitted from Table 19. The same principle is applied for the case of performing 2-layer transmission with a 2-symbol pattern; only the CDM is allowed for 3-layer and 4-layer transmissions and, even in this case, only some of all combinations are included in consideration of signaling overhead. When using the 2-layer transmission with a 2-symbol pattern, FDM may not be supported in consideration of the low utilization. One or both of indices 23 and 24 may be omitted from Table 19. It should be noted that the same principle is considered in the embodiment described below. When omitting a part of indices according to a disclosed method, the table may be generated to make it possible to signal the information indicating 1-symbol pattern or 2-symbol pattern as well as the number of layer & port number information, dynamically, using 5 bits via DCI. Table 19-1 is derived from Table 19 generated based on the port mappings of Tables 18-2 and 18-4. As described above, part or all of the indices 7, 8, 23, and 24 corresponding to one codeword may be omitted from Table 19-1. Table 19-1 may be changed in the same way as Table 19 in the embodiment below.

TABLE 19-1

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 2 | 0, 1 | 1 | CDM |
| 6 | 2 | 2, 3 | 1 | CDM |
| 7 | 2 | 0, 2 | 1 | FDM |
| 8 | 2 | 1, 3 | 1 | FDM |
| 9 | 3 | 0, 1, 2 | 1 | CDM + FDM |
| 10 | 4 | 0, 1, 2, 3 | 1 | CDM + FDM |
| 11 | 1 | 0 | 2 | |
| 12 | 1 | 1 | 2 | |
| 13 | 1 | 2 | 2 | |
| 14 | 1 | 3 | 2 | |
| 15 | 1 | 4 | 2 | |
| 16 | 1 | 5 | 2 | |
| 17 | 1 | 6 | 2 | |
| 18 | 1 | 7 | 2 | |
| 19 | 2 | 0, 1 | 2 | CDM |
| 20 | 2 | 2, 3 | 2 | CDM |
| 21 | 2 | 4, 5 | 2 | CDM |
| 22 | 2 | 6, 7 | 2 | CDM |
| 23 | 2 | 0, 4 | 2 | FDM |
| 24 | 2 | 1, 5 | 2 | FDM |
| 25 | 3 | 0, 1, 2 | 2 | CDM |
| 26 | 3 | 4, 5, 6 | 2 | CDM |
| 27 | 4 | 0, 1, 2, 3 | 2 | CDM |
| 28 | 4 | 4, 5, 6, 7 | 2 | CDM |
| 29 | 5 | 0, 1, 2, 3, 4 | 2 | CDM + FDM |
| 30 | 6 | 0, 1, 2, 3, 4, 5 | 2 | CDM + FDM |
| 31 | 7 | 0, 1, 2, 3, 4, 5, 6 | 2 | CDM + FDM |
| 32 | 8 | 0, 1, 2, 3, 4, 5, 6, 7 | 2 | CDM + FDM |

If Method 2 for reducing the number of layer & port number information signaling overhead is applied to Table 19, Table 20 may be derived. Part or all of indices 7, 8, 23, and 24 may be omitted from Table 20 in consideration of low utilization thereof.

TABLE 20

| Two Codewords: Codeword 0 enabled, Codeword 1 disabled | | | | Two Codewords: Codeword 0 enabled, Codeword 1 enabled | | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | reserved | reserved | reserved |
| 6 | 2 | 2, 3 | 1 | 6 | reserved | reserved | reserved |
| 7 | 2 | 0, 2 | 1 | 7 | reserved | reserved | reserved |
| 8 | 2 | 1, 3 | 1 | 8 | reserved | reserved | reserved |
| 9 | 3 | 0, 1, 2 | 1 | 9 | reserved | reserved | reserved |
| 10 | 4 | 0, 1, 2, 3 | 1 | 10 | reserved | reserved | reserved |
| 11 | 1 | 0 | 2 | 11 | reserved | reserved | reserved |
| 12 | 1 | 1 | 2 | 12 | reserved | reserved | reserved |
| 13 | 1 | 2 | 2 | 13 | reserved | reserved | reserved |
| 14 | 1 | 3 | 2 | 14 | reserved | reserved | reserved |
| 15 | 1 | 4 | 2 | 15 | reserved | reserved | reserved |
| 16 | 1 | 5 | 2 | 16 | reserved | reserved | reserved |
| 17 | 1 | 6 | 2 | 17 | reserved | reserved | reserved |
| 18 | 1 | 7 | 2 | 18 | reserved | reserved | reserved |

TABLE 20-continued

| | Two Codewords: Codeword 0 enabled, Codeword 1 disabled | | | | Two Codewords: Codeword 0 enabled, Codeword 1 enabled | | |
|---|---|---|---|---|---|---|---|
| index | # layers | p | # symbols | index | # layers | p | # symbols |
| 19 | 2 | 0, 1 | 2 | 19 | reserved | reserved | reserved |
| 20 | 2 | 2, 3 | 2 | 20 | reserved | reserved | reserved |
| 21 | 2 | 4, 5 | 2 | 21 | reserved | reserved | reserved |
| 22 | 2 | 6, 7 | 2 | 22 | reserved | reserved | reserved |
| 23 | 2 | 0, 2 | 2 | 23 | reserved | reserved | reserved |
| 24 | 2 | 1, 3 | 2 | 24 | reserved | reserved | reserved |
| 25 | 3 | 0, 1, 4 | 2 | 25 | reserved | reserved | reserved |
| 26 | 3 | 2, 3, 6 | 2 | 26 | reserved | reserved | reserved |
| 27 | 4 | 0, 1, 4, 5 | 2 | 27 | reserved | reserved | reserved |
| 28 | 4 | 2, 3, 6, 7 | 2 | 28 | reserved | reserved | reserved |
| 29 | reserved | reserved | reserved | 29 | reserved | reserved | reserved |
| 30 | reserved | reserved | reserved | 30 | reserved | reserved | reserved |
| 31 | reserved | reserved | reserved | 31 | reserved | reserved | reserved |
| 32 | reserved | reserved | reserved | 32 | reserved | reserved | reserved |

By omitting the indices 8, 23, and 24 corresponding to one codeword from Table 20, Table 20-1 is derived.

TABLE 20-1

| | One Codewords: Codeword 0 enabled, Codeword 1 disabled | | | | Two Codewords: Codeword 0 enabled, Codeword 1 enabled | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | reserved | reserved | reserved |
| 6 | 2 | 2, 3 | 1 | 6 | reserved | reserved | reserved |
| 7 | 2 | 0, 2 | 1 | 7 | reserved | reserved | reserved |
| 8 | 3 | 0, 1, 2 | 1 | 8 | reserved | reserved | reserved |
| 9 | 4 | 0, 1, 2, 3 | 1 | 9 | reserved | reserved | reserved |
| 10 | 1 | 0 | 2 | 10 | reserved | reserved | reserved |
| 11 | 1 | 1 | 2 | 11 | reserved | reserved | reserved |
| 12 | 1 | 2 | 2 | 12 | reserved | reserved | reserved |
| 13 | 1 | 3 | 2 | 13 | reserved | reserved | reserved |
| 14 | 1 | 4 | 2 | 14 | reserved | reserved | reserved |
| 15 | 1 | 5 | 2 | 15 | reserved | reserved | reserved |
| 16 | 1 | 6 | 2 | 16 | reserved | reserved | reserved |
| 17 | 1 | 7 | 2 | 17 | reserved | reserved | reserved |
| 18 | 2 | 0, 1 | 2 | 18 | reserved | reserved | reserved |
| 19 | 2 | 2, 3 | 2 | 19 | reserved | reserved | reserved |
| 20 | 2 | 4, 5 | 2 | 20 | reserved | reserved | reserved |
| 21 | 2 | 6, 7 | 2 | 21 | reserved | reserved | reserved |
| 22 | 3 | 0, 1, 4 | 2 | 22 | reserved | reserved | reserved |
| 23 | 3 | 2, 3, 6 | 2 | 23 | reserved | reserved | reserved |
| 24 | 4 | 0, 1, 4, 5 | 2 | 24 | reserved | reserved | reserved |
| 25 | 4 | 2, 3, 6, 7 | 2 | 25 | reserved | reserved | reserved |
| 26 | reserved | reserved | reserved | 26 | reserved | reserved | reserved |
| 27 | reserved | reserved | reserved | 27 | reserved | reserved | reserved |
| 28 | reserved | reserved | reserved | 28 | reserved | reserved | reserved |
| 29 | reserved | reserved | reserved | 29 | reserved | reserved | reserved |
| 30 | reserved | reserved | reserved | 30 | reserved | reserved | reserved |
| 31 | reserved | reserved | reserved | 31 | reserved | reserved | reserved |
| 32 | reserved | reserved | reserved | 32 | reserved | reserved | reserved |

Table 20 is an example of the Alt2 method disclosed in the fifth embodiment. Alt2 is the method for providing rate matching information with the reserved bits for when data and DMRS FDM-ed in the frequency domain, i.e. using the reserved bits of Table 20 for signaling that data and DMRS are FDM-ed. Remaining signaling indices indicate that data and DMRS are not FDM-ed. Table 20-2 shows an example thereof. In Table 20-2, indices 26 to 31 are used to indicate that data and DMRS are FDM-ed with the reserved bits of Table 20, and if one of these indices is signaled, the UE assumes that data are transmitted at the RE locations other than the assigned port locations. If one of the indices with the exception of 26 to 31 is received, the UE assumes that no data is transmitted at the RE locations other than the assigned port locations. It should be noted that the Alt2 method described with reference to Table 20-2 can be applied to all embodiments of the present disclosure. The location of the index for the case where data and DMRS are FDM-ed may be changed according to the signaling design method, and it should be noted that the Alt2 of the fifth embodiment can be applied to a table other than Table 20, e.g., Table 20-2.

TABLE 20-2

| index | # layers | p | # symbols | index | # layers | p | # symbols |
|---|---|---|---|---|---|---|---|
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | reserved | reserved | reserved |
| 6 | 2 | 2, 3 | 1 | 6 | reserved | reserved | reserved |
| 7 | 2 | 0, 2 | 1 | 7 | reserved | reserved | reserved |
| 8 | 3 | 0, 1, 2 | 1 | 8 | reserved | reserved | reserved |
| 9 | 4 | 0, 1, 2, 3 | 1 | 9 | reserved | reserved | reserved |
| 10 | 1 | 0 | 2 | 10 | reserved | reserved | reserved |
| 11 | 1 | 1 | 2 | 11 | reserved | reserved | reserved |
| 12 | 1 | 2 | 2 | 12 | reserved | reserved | reserved |
| 13 | 1 | 3 | 2 | 13 | reserved | reserved | reserved |
| 14 | 1 | 4 | 2 | 14 | reserved | reserved | reserved |
| 15 | 1 | 5 | 2 | 15 | reserved | reserved | reserved |
| 16 | 1 | 6 | 2 | 16 | reserved | reserved | reserved |
| 17 | 1 | 7 | 2 | 17 | reserved | reserved | reserved |
| 18 | 2 | 0, 1 | 2 | 18 | reserved | reserved | reserved |
| 19 | 2 | 2, 3 | 2 | 19 | reserved | reserved | reserved |
| 20 | 2 | 4, 5 | 2 | 20 | reserved | reserved | reserved |
| 21 | 2 | 6, 7 | 2 | 21 | reserved | reserved | reserved |
| 22 | 3 | 0, 1, 4 | 2 | 22 | reserved | reserved | reserved |
| 23 | 3 | 2, 3, 6 | 2 | 23 | reserved | reserved | reserved |
| 24 | 4 | 0, 1, 4, 5 | 2 | 24 | reserved | reserved | reserved |
| 25 | 4 | 2, 3, 6, 7 | 2 | 25 | reserved | reserved | reserved |
| 26 | 1 | 0 (FDM with data) | 1 | 26 | reserved | reserved | reserved |
| 27 | 2 | 0, 1 (FDM with data) | 1 | 27 | reserved | reserved | reserved |
| 28 | 1 | 0 (FDM with data) | 2 | 28 | reserved | reserved | reserved |
| 29 | 2 | 0, 1 (FDM with data) | 2 | 29 | reserved | reserved | reserved |
| 30 | 3 | 0, 1, 4 (FDM with data) | 2 | 30 | reserved | reserved | reserved |
| 31 | 4 | 0, 1, 4, 5 (FDM with data) | 2 | 31 | reserved | reserved | reserved |
| 32 | reserved | reserved | reserved | 32 | reserved | reserved | reserved |

When signaling the DMRS port group information as disclosed in Table 16 of the fourth embodiment using the reserved bits of the 2 codewords, Table 20-3 is derived from Table 20.

TABLE 20-3

| One Codewords: Codeword 0 enabled, Codeword 1 disabled | | | | Two Codewords: Codeword 0 enabled, Codeword 1 enabled | | | |
|---|---|---|---|---|---|---|---|
| Index | # of layers | p | # of symbol | Index | # of layers | p | # of symbol |
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | 2 | Port grouping in higher layer (NC-JT) | 1 |
| 6 | 2 | 2, 3 | 1 | 6 | 3 | Port grouping in higher layer (NC-JT) | 1 |
| 7 | 2 | 0, 2 | 1 | 7 | 4 | Port grouping in higher layer (NC-JT) | 1 |
| 8 | 3 | 0, 1, 2 | 1 | 8 | 2 | Port grouping in higher layer (NC-JT) | 2 |
| 9 | 4 | 0, 1, 2, 3 | 1 | 9 | 3 | Port grouping in higher layer (NC-JT) | 2 |
| 10 | 1 | 0 | 2 | 10 | 4 | Port grouping in higher layer (NC-JT) | 2 |
| 11 | 1 | 1 | 2 | 11 | 5 | Port grouping in higher layer (NC-JT) | 2 |
| 12 | 1 | 2 | 2 | 12 | 6 | Port grouping in higher layer (NC-JT) | 2 |
| 13 | 1 | 3 | 2 | 13 | 7 | Port grouping in higher layer (NC-JT) | 2 |

TABLE 20-3-continued

| | One Codewords: Codeword 0 enabled, Codeword 1 disabled | | | | Two Codewords: Codeword 0 enabled, Codeword 1 enabled | | |
|---|---|---|---|---|---|---|---|
| Index | # of layers | p | # of symbol | Index | # of layers | p | # of symbol |
| 14 | 1 | 4 | 2 | 14 | 8 | Port grouping in higher layer (NC-JT) | 2 |
| 15 | 1 | 5 | 2 | 15 | reserved | reserved | reserved |
| 16 | 1 | 6 | 2 | 16 | reserved | reserved | reserved |
| 17 | 1 | 7 | 2 | 17 | reserved | reserved | reserved |
| 18 | 2 | 0, 1 | 2 | 18 | reserved | reserved | reserved |
| 19 | 2 | 2, 3 | 2 | 19 | reserved | reserved | reserved |
| 20 | 2 | 4, 5 | 2 | 20 | reserved | reserved | reserved |
| 21 | 2 | 6, 7 | 2 | 21 | reserved | reserved | reserved |
| 22 | 3 | 0, 1, 4 | 2 | 22 | reserved | reserved | reserved |
| 23 | 3 | 2, 3, 6 | 2 | 23 | reserved | reserved | reserved |
| 24 | 4 | 0, 1, 4, 5 | 2 | 24 | reserved | reserved | reserved |
| 25 | 4 | 2, 3, 6, 7 | 2 | 25 | reserved | reserved | reserved |
| 26 | reserved | reserved | reserved | 26 | reserved | reserved | reserved |
| 27 | reserved | reserved | reserved | 27 | reserved | reserved | reserved |
| 28 | reserved | reserved | reserved | 28 | reserved | reserved | reserved |
| 29 | reserved | reserved | reserved | 29 | reserved | reserved | reserved |
| 30 | reserved | reserved | reserved | 30 | reserved | reserved | reserved |
| 31 | reserved | reserved | reserved | 31 | reserved | reserved | reserved |
| 32 | reserved | reserved | reserved | 32 | reserved | reserved | reserved |

When Table 20 is generated based on the port mapping of Tables 18-2 and 18-4, Table 20-4 is derived therefrom. As described above with reference to Table 20, part or all of indices 7, 8, 23, and 24 corresponding to one codeword may be omitted in Table 20-4 in consideration of low utilization.

TABLE 20-4

| | Two Codewords: Codeword 0 enabled, Codeword 1 disabled | | | | Two Codewords: Codeword 0 enabled, Codeword 1 enabled | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | reserved | reserved | reserved |
| 6 | 2 | 2, 3 | 1 | 6 | reserved | reserved | reserved |
| 7 | 2 | 0, 2 | 1 | 7 | reserved | reserved | reserved |
| 8 | 2 | 1, 3 | 1 | 8 | reserved | reserved | reserved |
| 9 | 3 | 0, 1, 2 | 1 | 9 | reserved | reserved | reserved |
| 10 | 4 | 0, 1, 2, 3 | 1 | 10 | reserved | reserved | reserved |
| 11 | 1 | 0 | 2 | 11 | reserved | reserved | reserved |
| 12 | 1 | 1 | 2 | 12 | reserved | reserved | reserved |
| 13 | 1 | 2 | 2 | 13 | reserved | reserved | reserved |
| 14 | 1 | 3 | 2 | 14 | reserved | reserved | reserved |
| 15 | 1 | 4 | 2 | 15 | reserved | reserved | reserved |
| 16 | 1 | 5 | 2 | 16 | reserved | reserved | reserved |
| 17 | 1 | 6 | 2 | 17 | reserved | reserved | reserved |
| 18 | 1 | 7 | 2 | 18 | reserved | reserved | reserved |
| 19 | 2 | 0, 1 | 2 | 19 | reserved | reserved | reserved |
| 20 | 2 | 2, 3 | 2 | 20 | reserved | reserved | reserved |
| 21 | 2 | 4, 5 | 2 | 21 | reserved | reserved | reserved |
| 22 | 2 | 6, 7 | 2 | 22 | reserved | reserved | reserved |
| 23 | 2 | 0, 4 | 2 | 23 | reserved | reserved | reserved |
| 24 | 2 | 1, 5 | 2 | 24 | reserved | reserved | reserved |
| 25 | 3 | 0, 1, 2 | 2 | 25 | reserved | reserved | reserved |
| 26 | 3 | 4, 5, 6 | 2 | 26 | reserved | reserved | reserved |
| 27 | 4 | 0, 1, 2, 3 | 2 | 27 | reserved | reserved | reserved |
| 28 | 4 | 4, 5, 6, 7 | 2 | 28 | reserved | reserved | reserved |
| 29 | reserved | reserved | reserved | 29 | reserved | reserved | reserved |
| 30 | reserved | reserved | reserved | 30 | reserved | reserved | reserved |
| 31 | reserved | reserved | reserved | 31 | reserved | reserved | reserved |
| 32 | reserved | reserved | reserved | 32 | reserved | reserved | reserved |

When using the Type2 DMRS pattern according to the design principle 1 for reducing the number of layer & port number information signaling overhead, it may be possible to apply Table 21.

TABLE 21

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 2 | 0, 2 | 1 | FDM |
| 11 | 2 | 1, 3 | 1 | FDM |
| 12 | 3 | 0, 1, 2 | 1 | CDM + FDM |
| 13 | 3 | 3, 4, 5 | 1 | CDM + FDM |
| 14 | 3 | 0, 2, 4 | 1 | FDM |
| 15 | 3 | 1, 3, 5 | 1 | FDM |
| 16 | 4 | 0, 1, 2, 3 | 1 | CDM + FDM |
| 17 | 5 | 0, 1, 2, 3, 4 | 1 | CDM + FDM |
| 18 | 6 | 0, 1, 2, 3, 4, 5 | 1 | CDM + FDM |
| 19 | 1 | 0 | 2 | |
| 20 | 1 | 1 | 2 | |
| 21 | 1 | 2 | 2 | |
| 22 | 1 | 3 | 2 | |
| 23 | 1 | 4 | 2 | |
| 24 | 1 | 5 | 2 | |
| 25 | 1 | 6 | 2 | |
| 26 | 1 | 7 | 2 | |
| 27 | 1 | 8 | 2 | |
| 28 | 1 | 9 | 2 | |
| 29 | 1 | 10 | 2 | |
| 30 | 1 | 11 | 2 | |
| 31 | 2 | 0, 1 | 2 | CDM |
| 32 | 2 | 2, 3 | 2 | CDM |
| 33 | 2 | 4, 5 | 2 | CDM |
| 34 | 2 | 6, 7 | 2 | CDM |
| 35 | 2 | 8, 9 | 2 | CDM |
| 36 | 2 | 10, 11 | 2 | CDM |
| 37 | 2 | 0, 2 | 2 | FDM |
| 38 | 2 | 1, 3 | 2 | FDM |
| 39 | 3 | 0, 1, 6 | 2 | CDM |
| 40 | 3 | 2, 3, 8 | 2 | CDM |
| 41 | 3 | 4, 5, 10 | 2 | CDM |
| 42 | 3 | 7, 9, 11 | 2 | FDM |
| 43 | 4 | 0, 1, 6, 7 | 2 | CDM |
| 44 | 4 | 2, 3, 8, 9 | 2 | CDM |
| 45 | 4 | 4, 5, 10, 11 | 2 | CDM |
| 46 | 5 | 0, 1, 2, 3, 4 | 2 | CDM + FDM |
| 47 | 6 | 0, 1, 2, 3, 4, 5 | 2 | CDM + FDM |
| 48 | 7 | 0, 1, 2, 3, 4, 5, 6 | 2 | CDM + FDM |
| 49 | 8 | 0, 1, 2, 3, 4, 5, 6, 7 | 2 | CDM + FDM |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |
| 57 | reserved | reserved | reserved | |
| 58 | reserved | reserved | reserved | |
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

In Table 21, indices 46 to 49 may be changed as shown in Table 21-1, thereby making it possible to transmit RS only at the blue-colored and green-colored locations in part j40 of FIG. 10A. It may be possible to transmit data at the red-colored locations.

TABLE 21-1

| 46 | 5 | 0, 1, 2, 3, 6 | 2 |
| 47 | 6 | 0, 1, 2, 3, 6, 7 | 2 |
| 48 | 7 | 0, 1, 2, 3, 6, 7, 8 | 2 |
| 49 | 8 | 0, 1, 2, 3, 6, 7, 8, 9 | 2 |

When using the port mappings of Tables 18-2 and 18-4, it may be possible to derive Table 21-1 from Table 21. Table 21-1 may be changed in the same way as Table 19 in the embodiment described below.

TABLE 21-2

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 2 | 0, 2 | 1 | FDM |
| 11 | 2 | 1, 3 | 1 | FDM |
| 12 | 3 | 0, 1, 2 | 1 | CDM + FDM |
| 13 | 3 | 3, 4, 5 | 1 | CDM + FDM |
| 14 | 3 | 0, 2, 4 | 1 | FDM |
| 15 | 3 | 1, 3, 5 | 1 | FDM |
| 16 | 4 | 0, 1, 2, 3 | 1 | CDM + FDM |
| 17 | 5 | 0, 1, 2, 3, 4 | 1 | CDM + FDM |
| 18 | 6 | 0, 1, 2, 3, 4, 5 | 1 | CDM + FDM |
| 19 | 1 | 0 | 2 | |
| 20 | 1 | 1 | 2 | |
| 21 | 1 | 2 | 2 | |
| 22 | 1 | 3 | 2 | |
| 23 | 1 | 4 | 2 | |
| 24 | 1 | 5 | 2 | |
| 25 | 1 | 6 | 2 | |
| 26 | 1 | 7 | 2 | |
| 27 | 1 | 8 | 2 | |
| 28 | 1 | 9 | 2 | |
| 29 | 1 | 10 | 2 | |
| 30 | 1 | 11 | 2 | |
| 31 | 2 | 0, 1 | 2 | CDM |
| 32 | 2 | 2, 3 | 2 | CDM |
| 33 | 2 | 4, 5 | 2 | CDM |
| 34 | 2 | 6, 7 | 2 | CDM |
| 35 | 2 | 8, 9 | 2 | CDM |
| 36 | 2 | 10, 11 | 2 | CDM |
| 37 | 2 | 0, 4 | 2 | FDM |
| 38 | 2 | 1, 5 | 2 | FDM |
| 39 | 3 | 0, 1, 2 | 2 | CDM |
| 40 | 3 | 4, 5, 6 | 2 | CDM |
| 41 | 3 | 8, 9, 10 | 2 | CDM |
| 42 | 3 | 3, 7, 11 | 2 | FDM |
| 43 | 4 | 0, 1, 2, 3 | 2 | CDM |
| 44 | 4 | 4, 5, 6, 7 | 2 | CDM |
| 45 | 4 | 8, 9, 10, 11 | 2 | CDM |
| 46 | 5 | 0, 1, 2, 3, 4 | 2 | CDM + FDM |
| 47 | 6 | 0, 1, 2, 3, 4, 5 | 2 | CDM + FDM |
| 48 | 7 | 0, 1, 2, 3, 4, 5, 6 | 2 | CDM + FDM |
| 49 | 8 | 0, 1, 2, 3, 4, 5, 6, 7 | 2 | CDM + FDM |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |
| 57 | reserved | reserved | reserved | |
| 58 | reserved | reserved | reserved | |

TABLE 21-2-continued

| index | # layers | p | # symbols | Note |
|---|---|---|---|---|
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

Table 21 represents a signaling method when the FDM scheme is used with 2-layer and 3-layer transmissions with the 1-symbol patterns and 2-layer and 3-layer transmissions with the 2-symbol patterns according to design principle 1, and part or all thereof may be omitted in consideration of signaling overhead. For example, when using 2-layer and 3-layer transmissions with the 1-symbol patterns and 2-layer and 3-layer transmissions with the 2-symbol patterns, if the FDM scheme is not allowed, the signaling method may be represented by Table 22.

TABLE 22

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 3 | 0, 1, 2 | 1 | CDM + FDM |
| 11 | 3 | 3, 4, 5 | 1 | CDM + FDM |
| 12 | 4 | 0, 1, 2, 3 | 1 | CDM + FDM |
| 13 | 5 | 0, 1, 2, 3, 4 | 1 | CDM + FDM |
| 14 | 6 | 0, 1, 2, 3, 4, 5 | 1 | CDM + FDM |
| 15 | 1 | 0 | 2 | |
| 16 | 1 | 1 | 2 | |
| 17 | 1 | 2 | 2 | |
| 18 | 1 | 3 | 2 | |
| 19 | 1 | 4 | 2 | |
| 20 | 1 | 5 | 2 | |
| 21 | 1 | 6 | 2 | |
| 22 | 1 | 7 | 2 | |
| 23 | 1 | 8 | 2 | |
| 24 | 1 | 9 | 2 | |
| 25 | 1 | 10 | 2 | |
| 26 | 1 | 11 | 2 | |
| 27 | 2 | 0, 1 | 2 | CDM |
| 28 | 2 | 2, 3 | 2 | CDM |
| 29 | 2 | 4, 5 | 2 | CDM |
| 30 | 2 | 6, 7 | 2 | CDM |
| 31 | 2 | 8, 9 | 2 | CDM |
| 32 | 2 | 10, 11 | 2 | CDM |
| 33 | 3 | 0, 1, 6 | 2 | CDM |
| 34 | 3 | 2, 3, 8 | 2 | CDM |
| 35 | 3 | 4, 5, 10 | 2 | CDM |
| 36 | 3 | 7, 9, 11 | 2 | FDM |
| 37 | 4 | 0, 1, 6, 7 | 2 | CDM |
| 38 | 4 | 2, 3, 8, 9 | 2 | CDM |
| 39 | 4 | 4, 5, 10, 11 | 2 | CDM |
| 40 | 5 | 0, 1, 2, 3, 4 | 2 | CDM + FDM |
| 41 | 6 | 0, 1, 2, 3, 4, 5 | 2 | CDM + FDM |
| 42 | 7 | 0, 1, 2, 3, 4, 5, 6 | 2 | CDM + FDM |
| 43 | 8 | 0, 1, 2, 3, 4, 5, 6, 7 | 2 | CDM + FDM |
| 44 | reserved | reserved | reserved | |
| 45 | reserved | reserved | reserved | |
| 46 | reserved | reserved | reserved | |
| 47 | reserved | reserved | reserved | |
| 48 | reserved | reserved | reserved | |
| 49 | reserved | reserved | reserved | |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |
| 57 | reserved | reserved | reserved | |
| 58 | reserved | reserved | reserved | |
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

In Table 22, indices 40 to 44 may be changed as shown in Table 22-1, thereby making it possible to transmit RS only at the blue-colored and green-colored locations in part j40 of FIG. 10A. It may be possible to transmit data at the red-colored locations.

TABLE 22-1

| 40 | 5 | 0, 1, 2, 3, 6 | 2 |
| 41 | 6 | 0, 1, 2, 3, 6, 7 | 2 |
| 42 | 7 | 0, 1, 2, 3, 6, 7, 8 | 2 |
| 43 | 8 | 0, 1, 2, 3, 6, 7, 8, 9 | 2 |

When the FDM scheme is not allowed for 3-layer transmission with 2-symbol patterns in Table 22, it may be possible to reduce code points by 1. Furthermore, by removing indices 11, 34, 35, and 39 from Table 22 and applying Method 2 for reducing the number of layer & port number information signaling, it may be possible to express with 5 bits as shown in Table 23. The index 30 corresponding to one codeword in Table 23 is not used for MU-MIMO in comparison with the index 33 of Table 22, as it is configured with CDM+FDM.

TABLE 23

| Two Codewords: Codeword 0 enabled, Codeword 1 disabled | | | | Two Codewords: Codeword 0 enabled, Codeword 1 enabled | | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 1 |
| 2 | 1 | 1 | 1 | 2 | 6 | 0, 1, 2, 3, 4, 5 | 1 |
| 3 | 1 | 2 | 1 | 3 | 5 | 0, 1, 2, 3, 4 | 2 |
| 4 | 1 | 3 | 1 | 4 | 6 | 0, 1, 2, 3, 4, 5 | 2 |
| 5 | 1 | 4 | 1 | 5 | 7 | 0, 1, 2, 3, 4, 5, 6 | 2 |
| 6 | 1 | 5 | 1 | 6 | 8 | 0, 1, 2, 3, 4, 5, 6, 7 | 2 |
| 7 | 2 | 0, 1 | 1 | 7 | reserved | reserved | reserved |
| 8 | 2 | 2, 3 | 1 | 8 | reserved | reserved | reserved |

TABLE 23-continued

| | Two Codewords: Codeword 0 enabled, Codeword 1 disabled | | | | Two Codewords: Codeword 0 enabled, Codeword 1 enabled | | |
|---|---|---|---|---|---|---|---|
| index | # layers | p | # symbols | index | # layers | p | # symbols |
| 9 | 2 | 4, 5 | 1 | 9 | reserved | reserved | reserved |
| 10 | 3 | 0, 1, 2 | 1 | 10 | reserved | reserved | reserved |
| 11 | 4 | 0, 1, 2, 3 | 1 | 11 | reserved | reserved | reserved |
| 12 | 1 | 0 | 2 | 12 | reserved | reserved | reserved |
| 13 | 1 | 1 | 2 | 13 | reserved | reserved | reserved |
| 14 | 1 | 2 | 2 | 14 | reserved | reserved | reserved |
| 15 | 1 | 3 | 2 | 15 | reserved | reserved | reserved |
| 16 | 1 | 4 | 2 | 16 | reserved | reserved | reserved |
| 17 | 1 | 5 | 2 | 17 | reserved | reserved | reserved |
| 18 | 1 | 6 | 2 | 18 | reserved | reserved | reserved |
| 19 | 1 | 7 | 2 | 19 | reserved | reserved | reserved |
| 20 | 1 | 8 | 2 | 20 | reserved | reserved | reserved |
| 21 | 1 | 9 | 2 | 21 | reserved | reserved | reserved |
| 22 | 1 | 10 | 2 | 22 | reserved | reserved | reserved |
| 23 | 1 | 11 | 2 | 23 | reserved | reserved | reserved |
| 24 | 2 | 0, 1 | 2 | 24 | reserved | reserved | reserved |
| 25 | 2 | 2, 3 | 2 | 25 | reserved | reserved | reserved |
| 26 | 2 | 4, 5 | 2 | 26 | reserved | reserved | reserved |
| 27 | 2 | 6, 7 | 2 | 27 | reserved | reserved | reserved |
| 28 | 2 | 8, 9 | 2 | 28 | reserved | reserved | reserved |
| 29 | 2 | 10, 11 | 2 | 29 | reserved | reserved | reserved |
| 30 | 3 | 0, 1, 2 | 2 | 30 | reserved | reserved | reserved |
| 31 | 4 | 0, 1, 6, 7 | 2 | 31 | reserved | reserved | reserved |
| 32 | 4 | 2, 3, 8, 9 | 2 | 32 | reserved | reserved | reserved |

The indices 3 to 6 corresponding to two codewords in Table 23 may be changed as shown in Table 23-1, thereby making it possible to transmit RS only at the blue-colored and green-colored locations in part j40 of FIG. 10A. It may be possible to transmit data at the red-colored locations.

TABLE 23-1

| 3 | 5 | 0, 1, 2, 3, 6 | 2 |
|---|---|---|---|
| 4 | 6 | 0, 1, 2, 3, 6, 7 | 2 |
| 5 | 7 | 0, 1, 2, 3, 6, 7, 8 | 2 |
| 6 | 8 | 0, 1, 2, 3, 6, 7, 8, 9 | 2 |

Next, a description is made of the method for signaling the number of layer & port number information when considering MU-MIMO transmission of up to 2 layers per user for the Type1 and Type2 DMRS patterns. The method may be performed according to the following principle.

Design Principle 2
For X=1 layer transmission, any orthogonal DMRS port can be scheduled.
For X=2 layer transmission:
　For DMRS configuration type1 with one symbol;
　　X=2 layers can be CDM-ed or [FDM-ed];
　For DMRS configuration type1 with two symbol;
　　X=2 layers can be CDM-ed or [FDM-ed];
　For DMRS configuration type2 with one symbol;
　　X=2 layers can be CDM-ed or [FDM-ed];
　For DMRS configuration type2 with two symbol;
　　X=2 layers can be CDM-ed or [FDM-ed];
　The combinations of CDM-ed or FDM-ed DMRS ports can be limited in order to reduce DCI overhead;
For X>2 layer transmission;
　X layers can be mapped to X DMRS ports in a consecutive manner; and
　EX., for X=5, DMRS port 0, 1, 2, 3, 4, 5 are used for transmission.

In the design principle 2, [ ] denotes that the corresponding scheme may be applied or not. For example, it may be considered to omit the FDM scheme because of its low utilization or in order to reduce signaling overhead. The Type1 DMRS pattern may be represented by Table 24 according to the above design principle.

TABLE 24

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 2 | 0, 1 | 1 | CDM |
| 6 | 2 | 2, 3 | 1 | CDM |
| 7 | 2 | 0, 2 | 1 | FDM |
| 8 | 2 | 1, 3 | 1 | FDM |
| 9 | 3 | 0, 1, 2 | 1 | CDM + FDM |
| 10 | 4 | 0, 1, 2, 3 | 1 | CDM + FDM |
| 11 | 1 | 0 | 2 | |
| 12 | 1 | 1 | 2 | |
| 13 | 1 | 2 | 2 | |
| 14 | 1 | 3 | 2 | |
| 15 | 1 | 4 | 2 | |
| 16 | 1 | 5 | 2 | |
| 17 | 1 | 6 | 2 | |
| 18 | 1 | 7 | 2 | |
| 19 | 2 | 0, 1 | 2 | CDM |
| 20 | 2 | 2, 3 | 2 | CDM |
| 21 | 2 | 4, 5 | 2 | CDM |
| 22 | 2 | 6, 7 | 2 | CDM |
| 23 | 2 | 0, 2 | 2 | FDM |
| 24 | 2 | 1, 3 | 2 | FDM |
| 25 | 3 | 0, 1, 2 | 2 | CDM + FDM |
| 26 | 4 | 0, 1, 2, 3 | 2 | CDM + FDM |
| 27 | 5 | 0, 1, 2, 3, 4 | 2 | CDM + FDM |
| 28 | 6 | 0, 1, 2, 3, 4, 5 | 2 | CDM + FDM |
| 29 | 7 | 0, 1, 2, 3, 4, 5, 6 | 2 | CDM + FDM |
| 30 | 8 | 0, 1, 2, 3, 4, 5, 6, 7 | 2 | CDM + FDM |
| 31 | reserved | reserved | reserved | |
| 32 | reserved | reserved | reserved | |

For the same reason described with reference to Table 19, part or all of the indices 7, 8, 23, and 24 may be omitted in Table 24 in consideration of low utilization. When Table 24 is generated based on the port mappings of Tables 18-2 and 18-4, Table 24-1 is derived therefrom. Part or all of the indices 7, 8, 23, and 24 may be omitted in Table 24-1 in consideration of low utilization. Table 24-1 may be changed in the same way as Table 24 in the embodiment described below.

TABLE 24-1

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 2 | 0, 1 | 1 | CDM |
| 6 | 2 | 2, 3 | 1 | CDM |
| 7 | 2 | 0, 2 | 1 | FDM |
| 8 | 2 | 1, 3 | 1 | FDM |
| 9 | 3 | 0, 1, 2 | 1 | CDM + FDM |
| 10 | 4 | 0, 1, 2, 3 | 1 | CDM + FDM |
| 11 | 1 | 0 | 2 | |
| 12 | 1 | 1 | 2 | |
| 13 | 1 | 2 | 2 | |
| 14 | 1 | 3 | 2 | |
| 15 | 1 | 4 | 2 | |

TABLE 24-1-continued

| index | # layers | p | # symbols | Note |
|---|---|---|---|---|
| 16 | 1 | 5 | 2 | |
| 17 | 1 | 6 | 2 | |
| 18 | 1 | 7 | 2 | |
| 19 | 2 | 0, 1 | 2 | CDM |
| 20 | 2 | 2, 3 | 2 | CDM |
| 21 | 2 | 4, 5 | 2 | CDM |
| 22 | 2 | 6, 7 | 2 | CDM |
| 23 | 2 | 0, 4 | 2 | FDM |
| 24 | 2 | 1, 5 | 2 | FDM |
| 25 | 3 | 0, 1, 4 | 2 | CDM + FDM |
| 26 | 4 | 0, 1, 4, 5 | 2 | CDM + FDM |
| 27 | 5 | 0, 1, 2, 3, 4 | 2 | CDM + FDM |
| 28 | 6 | 0, 1, 2, 3, 4, 5 | 2 | CDM + FDM |
| 29 | 7 | 0, 1, 2, 3, 4, 5, 6 | 2 | CDM + FDM |
| 30 | 8 | 0, 1, 2, 3, 4, 5, 6, 7 | 2 | CDM + FDM |
| 31 | reserved | reserved | reserved | |
| 32 | reserved | reserved | reserved | |

When applying Method 2 for reducing the number of layer & port number information signaling overhead, it may be possible to derive Table 25 from Table 24. Part or all of the indices 7, 8, 23, and 24 corresponding to one codeword may be omitted in Table 25.

TABLE 25

| Two Codewords: Codeword 0 enabled, Codeword 1 disabled | | | | Two Codewords: Codeword 0 enabled, Codeword 1 enabled | | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 2 |
| 2 | 1 | 1 | 1 | 2 | 6 | 0, 1, 2, 3, 4, 5 | 2 |
| 3 | 1 | 2 | 1 | 3 | 7 | 0, 1, 2, 3, 4, 5, 6 | 2 |
| 4 | 1 | 3 | 1 | 4 | 8 | 0, 1, 2, 3, 4, 5, 6, 7 | 2 |
| 5 | 2 | 0, 1 | 1 | 5 | reserved | reserved | reserved |
| 6 | 2 | 2, 3 | 1 | 6 | reserved | reserved | reserved |
| 7 | 2 | 0, 2 | 1 | 7 | reserved | reserved | reserved |
| 8 | 2 | 1, 3 | 1 | 8 | reserved | reserved | reserved |
| 9 | 3 | 0, 1, 2 | 1 | 9 | reserved | reserved | reserved |
| 10 | 4 | 0, 1, 2, 3 | 1 | 10 | reserved | reserved | reserved |
| 11 | 1 | 0 | 2 | 11 | reserved | reserved | reserved |
| 12 | 1 | 1 | 2 | 12 | reserved | reserved | reserved |
| 13 | 1 | 2 | 2 | 13 | reserved | reserved | reserved |
| 14 | 1 | 3 | 2 | 14 | reserved | reserved | reserved |
| 15 | 1 | 4 | 2 | 15 | reserved | reserved | reserved |
| 16 | 1 | 5 | 2 | 16 | reserved | reserved | reserved |
| 17 | 1 | 6 | 2 | 17 | reserved | reserved | reserved |
| 18 | 1 | 7 | 2 | 18 | reserved | reserved | reserved |
| 19 | 2 | 0, 1 | 2 | 19 | reserved | reserved | reserved |
| 20 | 2 | 2, 3 | 2 | 20 | reserved | reserved | reserved |
| 21 | 2 | 4, 5 | 2 | 21 | reserved | reserved | reserved |
| 22 | 2 | 6, 7 | 2 | 22 | reserved | reserved | reserved |
| 23 | 2 | 0, 2 | 2 | 23 | reserved | reserved | reserved |
| 24 | 2 | 1, 3 | 2 | 24 | reserved | reserved | reserved |
| 25 | 3 | 0, 1, 2 | 2 | 25 | reserved | reserved | reserved |
| 26 | 4 | 0, 1, 2, 3 | 2 | 26 | reserved | reserved | reserved |
| 27 | reserved | reserved | reserved | 27 | reserved | reserved | reserved |
| 28 | reserved | reserved | reserved | 28 | reserved | reserved | reserved |
| 29 | reserved | reserved | reserved | 29 | reserved | reserved | reserved |
| 30 | reserved | reserved | reserved | 30 | reserved | reserved | reserved |
| 31 | reserved | reserved | reserved | 31 | reserved | reserved | reserved |
| 32 | reserved | reserved | reserved | 32 | reserved | reserved | reserved |

The Type2 DMRS pattern designed according to the design principle 2 may be represented by Table 26.

TABLE 26

| index | # layersp | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 2 | 0, 2 | 1 | FDM |
| 11 | 2 | 1, 3 | 1 | FDM |
| 12 | 3 | 0, 1, 2 | 1 | CDM + FDM |
| 13 | 4 | 0, 1, 2, 3 | 1 | CDM + FDM |
| 14 | 5 | 0, 1, 2, 3, 4 | 1 | CDM + FDM |
| 15 | 6 | 0, 1, 2, 3, 4, 5 | 1 | CDM + FDM |
| 16 | 1 | 0 | 2 | |
| 17 | 1 | 1 | 2 | |
| 18 | 1 | 2 | 2 | |
| 19 | 1 | 3 | 2 | |
| 20 | 1 | 4 | 2 | |
| 21 | 1 | 5 | 2 | |
| 22 | 1 | 6 | 2 | |
| 23 | 1 | 7 | 2 | |
| 24 | 1 | 8 | 2 | |
| 25 | 1 | 9 | 2 | |
| 26 | 1 | 10 | 2 | |
| 27 | 1 | 11 | 2 | |
| 28 | 2 | 0, 1 | 2 | CDM |
| 29 | 2 | 2, 3 | 2 | CDM |
| 30 | 2 | 4, 5 | 2 | CDM |
| 31 | 2 | 6, 7 | 2 | CDM |
| 32 | 2 | 8, 9 | 2 | CDM |
| 33 | 2 | 10, 11 | 2 | CDM |
| 34 | 2 | 0, 2 | 2 | FDM |
| 35 | 2 | 1, 3 | 2 | FDM |
| 36 | 3 | 0, 1, 2 | 2 | CDM + FDM |
| 37 | 4 | 0, 1, 2, 3 | 2 | CDM + FDM |
| 38 | 5 | 0, 1, 2, 3, 4 | 2 | CDM + FDM |
| 39 | 6 | 0, 1, 2, 3, 4, 5 | 2 | |
| 40 | 7 | 0, 1, 2, 3, 4, 5, 6 | 2 | |
| 41 | 8 | 0, 1, 2, 3, 4, 5, 6, 7 | 2 | |
| 42 | reserved | reserved | reserved | |
| 43 | reserved | reserved | reserved | |
| 44 | reserved | reserved | reserved | |
| 45 | reserved | reserved | reserved | |
| 46 | reserved | reserved | reserved | |
| 47 | reserved | reserved | reserved | |
| 48 | reserved | reserved | reserved | |
| 49 | reserved | reserved | reserved | |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |
| 57 | reserved | reserved | reserved | |
| 58 | reserved | reserved | reserved | |
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

In Table 26, the indices 38 to 41 may be changed as shown in Table 26-1. This aims to make it possible to transmit RS only at the blue-colored and green-colored locations in part j40 of FIG. 10A. It may be possible to transmit data at the red-colored locations.

TABLE 26-1

| 38 | 5 | 0, 1, 2, 3, 6 | 2 |
| 39 | 6 | 0, 1, 2, 3, 6, 7 | 2 |
| 40 | 7 | 0, 1, 2, 3, 6, 7, 8 | 2 |
| 41 | 8 | 0, 1, 2, 3, 6, 7, 8, 9 | 2 |

Table 26-1 is derived from Table 26 generated based on the port mappings of Tables 18-2 and 18-4. Table 26-2 may be changed in the same way as Table 26 in the embodiment described below.

TABLE 26-2

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 3 | 0, 1, 2 | 1 | CDM + FDM |
| 11 | 4 | 0, 1, 2, 3 | 1 | CDM + FDM |
| 12 | 5 | 0, 1, 2, 3, 4 | 1 | CDM + FDM |
| 13 | 6 | 0, 1, 2, 3, 4, 5 | 1 | CDM + FDM |
| 14 | 1 | 0 | 2 | |
| 15 | 1 | 1 | 2 | |
| 16 | 1 | 2 | 2 | |
| 17 | 1 | 3 | 2 | |
| 18 | 1 | 4 | 2 | |
| 19 | 1 | 5 | 2 | |
| 20 | 1 | 6 | 2 | |
| 21 | 1 | 7 | 2 | |
| 22 | 1 | 8 | 2 | |
| 23 | 1 | 9 | 2 | |
| 24 | 1 | 10 | 2 | |
| 25 | 1 | 11 | 2 | |
| 26 | 2 | 0, 1 | 2 | CDM |
| 27 | 2 | 2, 3 | 2 | CDM |
| 28 | 2 | 4, 5 | 2 | CDM |
| 29 | 2 | 6, 7 | 2 | CDM |
| 30 | 2 | 8, 9 | 2 | CDM |
| 31 | 2 | 10, 11 | 2 | CDM |
| 32 | 3 | 0, 1, 4 | 2 | CDM + FDM |
| 33 | 4 | 0, 1, 4, 5 | 2 | CDM + FDM |
| 34 | 5 | 0, 1, 2, 3, 4 | 2 | CDM + FDM |
| 35 | 6 | 0, 1, 2, 3, 4, 5 | 2 | CDM + FDM |
| 36 | 7 | 0, 1, 2, 3, 4, 5, 6 | 2 | CDM + FDM |
| 37 | 8 | 0, 1, 2, 3, 4, 5, 6, 7 | 2 | CDM + FDM |
| 38 | reserved | reserved | reserved | |
| 39 | reserved | reserved | reserved | |
| 40 | reserved | reserved | reserved | |
| 41 | reserved | reserved | reserved | |
| 42 | reserved | reserved | reserved | |
| 43 | reserved | reserved | reserved | |
| 44 | reserved | reserved | reserved | |
| 45 | reserved | reserved | reserved | |
| 46 | reserved | reserved | reserved | |
| 47 | reserved | reserved | reserved | |
| 48 | reserved | reserved | reserved | |
| 49 | reserved | reserved | reserved | |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |

TABLE 26-2-continued

| index | # layers | p | # symbols | Note |
|---|---|---|---|---|
| 57 | reserved | reserved | reserved | |
| 58 | reserved | reserved | reserved | |
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

Table 26 represents a signaling method when the FDM scheme is allowed i when using 2-layer transmission with the 1-symbol patterns and 2-layer transmission with the 2-symbol patterns according to the design principle 2, and part or all thereof may be omitted in consideration of signaling overhead. For example, if all of them are not allowed, the method may be represented by Table 27.

TABLE 27

| index | # layers | p | # symbols | Note |
|---|---|---|---|---|
| 1 | 1 | 0 | 1 | |
| 2 | 1 | 1 | 1 | |
| 3 | 1 | 2 | 1 | |
| 4 | 1 | 3 | 1 | |
| 5 | 1 | 4 | 1 | |
| 6 | 1 | 5 | 1 | |
| 7 | 2 | 0, 1 | 1 | CDM |
| 8 | 2 | 2, 3 | 1 | CDM |
| 9 | 2 | 4, 5 | 1 | CDM |
| 10 | 3 | 0, 1, 2 | 1 | CDM + FDM |
| 11 | 4 | 0, 1, 2, 3 | 1 | CDM + FDM |
| 12 | 5 | 0, 1, 2, 3, 4 | 1 | CDM + FDM |
| 13 | 6 | 0, 1, 2, 3, 4, 5 | 1 | CDM + FDM |
| 14 | 1 | 0 | 2 | |
| 15 | 1 | 1 | 2 | |
| 16 | 1 | 2 | 2 | |
| 17 | 1 | 3 | 2 | |
| 18 | 1 | 4 | 2 | |
| 19 | 1 | 5 | 2 | |
| 20 | 1 | 6 | 2 | |
| 21 | 1 | 7 | 2 | |
| 22 | 1 | 8 | 2 | |
| 23 | 1 | 9 | 2 | |
| 24 | 1 | 10 | 2 | |
| 25 | 1 | 11 | 2 | |
| 26 | 2 | 0, 1 | 2 | CDM |
| 27 | 2 | 2, 3 | 2 | CDM |
| 28 | 2 | 4, 5 | 2 | CDM |
| 29 | 2 | 6, 7 | 2 | CDM |
| 30 | 2 | 8, 9 | 2 | CDM |
| 31 | 2 | 10, 11 | 2 | CDM |
| 32 | 3 | 0, 1, 2 | 2 | CDM + FDM |
| 33 | 4 | 0, 1, 2, 3 | 2 | CDM + FDM |
| 34 | 5 | 0, 1, 2, 3, 4 | 2 | CDM + FDM |
| 35 | 6 | 0, 1, 2, 3, 4, 5 | 2 | CDM + FDM |
| 36 | 7 | 0, 1, 2, 3, 4, 5, 6 | 2 | CDM + FDM |
| 37 | 8 | 0, 1, 2, 3, 4, 5, 6, 7 | 2 | CDM + FDM |
| 38 | reserved | reserved | reserved | |
| 39 | reserved | reserved | reserved | |
| 40 | reserved | reserved | reserved | |
| 41 | reserved | reserved | reserved | |
| 42 | reserved | reserved | reserved | |
| 43 | reserved | reserved | reserved | |
| 44 | reserved | reserved | reserved | |
| 45 | reserved | reserved | reserved | |
| 46 | reserved | reserved | reserved | |
| 47 | reserved | reserved | reserved | |
| 48 | reserved | reserved | reserved | |
| 49 | reserved | reserved | reserved | |
| 50 | reserved | reserved | reserved | |
| 51 | reserved | reserved | reserved | |
| 52 | reserved | reserved | reserved | |
| 53 | reserved | reserved | reserved | |
| 54 | reserved | reserved | reserved | |
| 55 | reserved | reserved | reserved | |
| 56 | reserved | reserved | reserved | |
| 57 | reserved | reserved | reserved | |
| 58 | reserved | reserved | reserved | |
| 59 | reserved | reserved | reserved | |
| 60 | reserved | reserved | reserved | |
| 61 | reserved | reserved | reserved | |
| 62 | reserved | reserved | reserved | |
| 63 | reserved | reserved | reserved | |
| 64 | reserved | reserved | reserved | |

In Table 27, the indices 34 to 37 may be changed as shown in Table 27-1, thereby, making it possible to transmit RS only at the blue-colored and green-colored locations in part j40 of FIG. 10A. It may be possible to transmit data at the red-colored locations.

TABLE 27-1

| 34 | 5 | 0, 1, 2, 3, 6 | 2 |
|---|---|---|---|
| 35 | 6 | 0, 1, 2, 3, 6, 7 | 2 |
| 36 | 7 | 0, 1, 2, 3, 6, 7, 8 | 2 |
| 37 | 8 | 0, 1, 2, 3, 6, 7, 8, 9 | 2 |

When applying Method 2 for reducing the number of layer & port number information signaling overhead, it may be possible to derive Table 28 from Table 27, thereby making it possible to signal the information indicating 1-symbol pattern or 2-symbol pattern as well as the number of layer & port number information, dynamically, using 5 bits via DCI.

TABLE 28

| Two Codewords: Codeword 0 enabled, Codeword 1 disabled | | | | Two Codewords: Codeword 0 enabled, Codeword 1 enabled | | | |
|---|---|---|---|---|---|---|---|
| index | # layers | p | # symbols | index | # layers | p | # symbols |
| 1 | 1 | 0 | 1 | 1 | 5 | 0, 1, 2, 3, 4 | 1 |
| 2 | 1 | 1 | 1 | 2 | 6 | 0, 1, 2, 3, 4, 5 | 1 |
| 3 | 1 | 2 | 1 | 3 | 5 | 0, 1, 2, 3, 4 | 2 |
| 4 | 1 | 3 | 1 | 4 | 6 | 0, 1, 2, 3, 4, 5 | 2 |
| 5 | 1 | 4 | 1 | 5 | 7 | 0, 1, 2, 3, 4, 5, 6 | 2 |
| 6 | 1 | 5 | 1 | 6 | 8 | 0, 1, 2, 3, 4, 5, 6, 7 | 2 |
| 7 | 2 | 0, 1 | 1 | 7 | reserved | reserved | reserved |
| 8 | 2 | 2, 3 | 1 | 8 | reserved | reserved | reserved |
| 9 | 2 | 4, 5 | 1 | 9 | reserved | reserved | reserved |
| 10 | 3 | 0, 1, 2 | 1 | 10 | reserved | reserved | reserved |
| 11 | 4 | 0, 1, 2, 3 | 1 | 11 | reserved | reserved | reserved |

TABLE 28-continued

| | Two Codewords: Codeword 0 enabled, Codeword 1 disabled | | | | Two Codewords: Codeword 0 enabled, Codeword 1 enabled | | |
|---|---|---|---|---|---|---|---|
| index | # layers | p | # symbols | index | # layers | p | # symbols |
| 12 | 1 | 0 | 2 | 12 | reserved | reserved | reserved |
| 13 | 1 | 1 | 2 | 13 | reserved | reserved | reserved |
| 14 | 1 | 2 | 2 | 14 | reserved | reserved | reserved |
| 15 | 1 | 3 | 2 | 15 | reserved | reserved | reserved |
| 16 | 1 | 4 | 2 | 16 | reserved | reserved | reserved |
| 17 | 1 | 5 | 2 | 17 | reserved | reserved | reserved |
| 18 | 1 | 6 | 2 | 18 | reserved | reserved | reserved |
| 19 | 1 | 7 | 2 | 19 | reserved | reserved | reserved |
| 20 | 1 | 8 | 2 | 20 | reserved | reserved | reserved |
| 21 | 1 | 9 | 2 | 21 | reserved | reserved | reserved |
| 22 | 1 | 10 | 2 | 22 | reserved | reserved | reserved |
| 23 | 1 | 11 | 2 | 23 | reserved | reserved | reserved |
| 24 | 2 | 0, 1 | 2 | 24 | reserved | reserved | reserved |
| 25 | 2 | 2, 3 | 2 | 25 | reserved | reserved | reserved |
| 26 | 2 | 4, 5 | 2 | 26 | reserved | reserved | reserved |
| 27 | 2 | 6, 7 | 2 | 27 | reserved | reserved | reserved |
| 28 | 2 | 8, 9 | 2 | 28 | reserved | reserved | reserved |
| 29 | 2 | 10, 11 | 2 | 29 | reserved | reserved | reserved |
| 30 | 3 | 0, 1, 2 | 2 | 30 | reserved | reserved | reserved |
| 31 | 4 | 0, 1, 2, 3 | 2 | 31 | reserved | reserved | reserved |
| 32 | reserved | reserved | reserved | 32 | reserved | reserved | reserved |

In Table 28, the indices 3 to 6 corresponding to two codewords may be changed as shown in Table 28-1, thereby making it possible to transmit RS only at the blue-colored and green-colored locations in part j40 of FIG. 10A. It may be possible to transmit data at the red-colored locations.

TABLE 28-1

| 3 | 5 | 0, 1, 2, 3, 6 | 2 |
|---|---|---|---|
| 4 | 6 | 0, 1, 2, 3, 6, 7 | 2 |
| 5 | 7 | 0, 1, 2, 3, 6, 7, 8 | 2 |
| 6 | 8 | 0, 1, 2, 3, 6, 7, 8, 9 | 2 |

It should be noted that even a table generated based on the port mappings of Tables 18-2 and 18-4 is expressed in the same way as Table 28. When signaling the DMRS port group information with the reserved bits for two codewords as shown in Table 16 of the fourth embodiment, it may be possible to derive Table 28-2 from Table 28.

TABLE 28-2

| | One Codewords: Codeword 0 enabled, Codeword 1 disabled | | | | Two Codewords: Codeword 0 enabled, Codeword 1 enabled | | |
|---|---|---|---|---|---|---|---|
| Index | # of layers | p | # of symbol | Index | # of layers | p | # of symbol |
| 1 | 1 | 0 | 1 | 1 | 5 | 0, 1, 2, 3, 4 | 1 |
| 2 | 1 | 1 | 1 | 2 | 6 | 0, 1, 2, 3, 4, 5 | 1 |
| 3 | 1 | 2 | 1 | 3 | 5 | 0, 1, 2, 3, 4 | 2 |
| 4 | 1 | 3 | 1 | 4 | 6 | 0, 1, 2, 3, 4, 5 | 2 |
| 5 | 1 | 4 | 1 | 5 | 7 | 0, 1, 2, 3, 4, 5, 6 | 2 |
| 6 | 1 | 5 | 1 | 6 | 8 | 0, 1, 2, 3, 4, 5, 6, 7 | 2 |
| 7 | 2 | 0, 1 | 1 | 7 | 2 | Port grouping in higher layer (NC-JT) | 1 |
| 8 | 2 | 2, 3 | 1 | 8 | 3 | Port grouping in higher layer (NC-JT) | 1 |
| 9 | 2 | 4, 5 | 1 | 9 | 4 | Port grouping in higher layer (NC-JT) | 1 |
| 10 | 3 | 0, 1, 2 | 1 | 10 | 2 | Port grouping in higher layer (NC-JT) | 2 |
| 11 | 4 | 0, 1, 2, 3 | 1 | 11 | 3 | Port grouping in higher layer (NC-JT) | 2 |
| 12 | 1 | 0 | 2 | 12 | 4 | Port grouping in higher layer (NC-JT) | 2 |
| 13 | 1 | 1 | 2 | 13 | 5 | Port grouping in higher layer (NC-JT) | 2 |
| 14 | 1 | 2 | 2 | 14 | 6 | Port grouping in higher layer (NC-JT) | 2 |
| 15 | 1 | 3 | 2 | 15 | 7 | Port grouping in higher layer (NC-JT) | 2 |

TABLE 28-2-continued

| | One Codewords: Codeword 0 enabled, Codeword 1 disabled | | | | Two Codewords: Codeword 0 enabled, Codeword 1 enabled | | |
|---|---|---|---|---|---|---|---|
| Index | # of layers | p | # of symbol | Index | # of layers | p | # of symbol |
| 16 | 1 | 4 | 2 | 16 | 8 | Port grouping in higher layer (NC-JT) | 2 |
| 17 | 1 | 5 | 2 | 17 | reserved | reserved | reserved |
| 18 | 1 | 6 | 2 | 18 | reserved | reserved | reserved |
| 19 | 1 | 7 | 2 | 19 | reserved | reserved | reserved |
| 20 | 1 | 8 | 2 | 20 | reserved | reserved | reserved |
| 21 | 1 | 9 | 2 | 21 | reserved | reserved | reserved |
| 22 | 1 | 10 | 2 | 22 | reserved | reserved | reserved |
| 23 | 1 | 11 | 2 | 23 | reserved | reserved | reserved |
| 24 | 2 | 0, 1 | 2 | 24 | reserved | reserved | reserved |
| 25 | 2 | 2, 3 | 2 | 25 | reserved | reserved | reserved |
| 26 | 2 | 4, 5 | 2 | 26 | reserved | reserved | reserved |
| 27 | 2 | 6, 7 | 2 | 27 | reserved | reserved | reserved |
| 28 | 2 | 8, 9 | 2 | 28 | reserved | reserved | reserved |
| 29 | 2 | 10, 11 | 2 | 29 | reserved | reserved | reserved |
| 30 | 3 | 0, 1, 2 | 2 | 30 | reserved | reserved | reserved |
| 31 | 4 | 0, 1, 2, 3 | 2 | 31 | reserved | reserved | reserved |
| 32 | reserved | reserved | reserved | 32 | reserved | reserved | reserved |

When applying Method 3 to all examples in the sixth embodiment, it is possible to reduce extra signaling overhead because the one symbol and two symbol indicator is provided by higher layers, see the third embodiment for a more detailed description.

Seventh Embodiment

In the previous embodiments, various table design methods have been disclosed for signaling the information on the DMRS ports assigned for the target user and, particularly in the fifth embodiment, descriptions are made of the co-scheduled port information signaling methods. The two methods considered in the fifth embodiments are as follows:
Alt-1: independent signaling with 1 or 2 bits of DCI;
  DMRS Type1: Possible to configure two DMRS port groups with 1 bit;
  DMRS Type2: Possible to configure 3 DMRS port groups with 2 bits;
Alt-2: signaling with reserved bits of DMRS table; and
  A separate signaling index for indicating that data and DMRS and FDM-ed is added; in this case, remaining signaling indices indicate that data and DMRS are not FDM-ed.

The seventh embodiment is directed to a method for designing a table containing the DMRS port information of a user co-scheduled with the target user in consideration of the MU-MIMO operation in association with Alt-2 and signaling the corresponding information with this table. As described above in the fifth embodiment, the reason for signaling the MU-pairing information is to provide the PDSCH rate matching information.

Various DMRS table designs are disclosed for facilitating the following methods:
Method for expressing DMRS port information of a user co-scheduled with a target user in one DMRS table;
  Method 1: Include only co-scheduled DMRS CDM group information; and
  Method 2: Include co-scheduled DMRS port information.

Method 1 includes signaling the co-scheduled DMRS CDM group information along with the scheduled DMRS port information of the target user without accurate DMRS port information. As described above in the fifth embodiment, the DMRS CDM group information is configured with two CDM groups (one composed of the red-colored ports and the other composed of green-colored ports in FIG. 4) for DMRS type1 and three CDM groups (composed of red-colored/green-colored/blue-colored ports, respectively, in FIG. 5) for DMRS type2. A description is made hereinafter of the DMRS CDM grouping method with the Method 1 when using the DMRS port indexing methods of FIGS. 10A, 10B, and 10C. The DMRS port indexing method for the DMRS type1 one symbol DMRS pattern has been already determined with the port indices as shown in part j10 of FIG. 10A, part j50 of FIG. 10B, and part j90 of FIG. 10C. Accordingly, the DMRS CDM group may be configured as follows:
DMRS type1 one symbol DMRS pattern;
  CDM group0={0,1}; and
  CDM group1={2,3}.

Figure 10B:
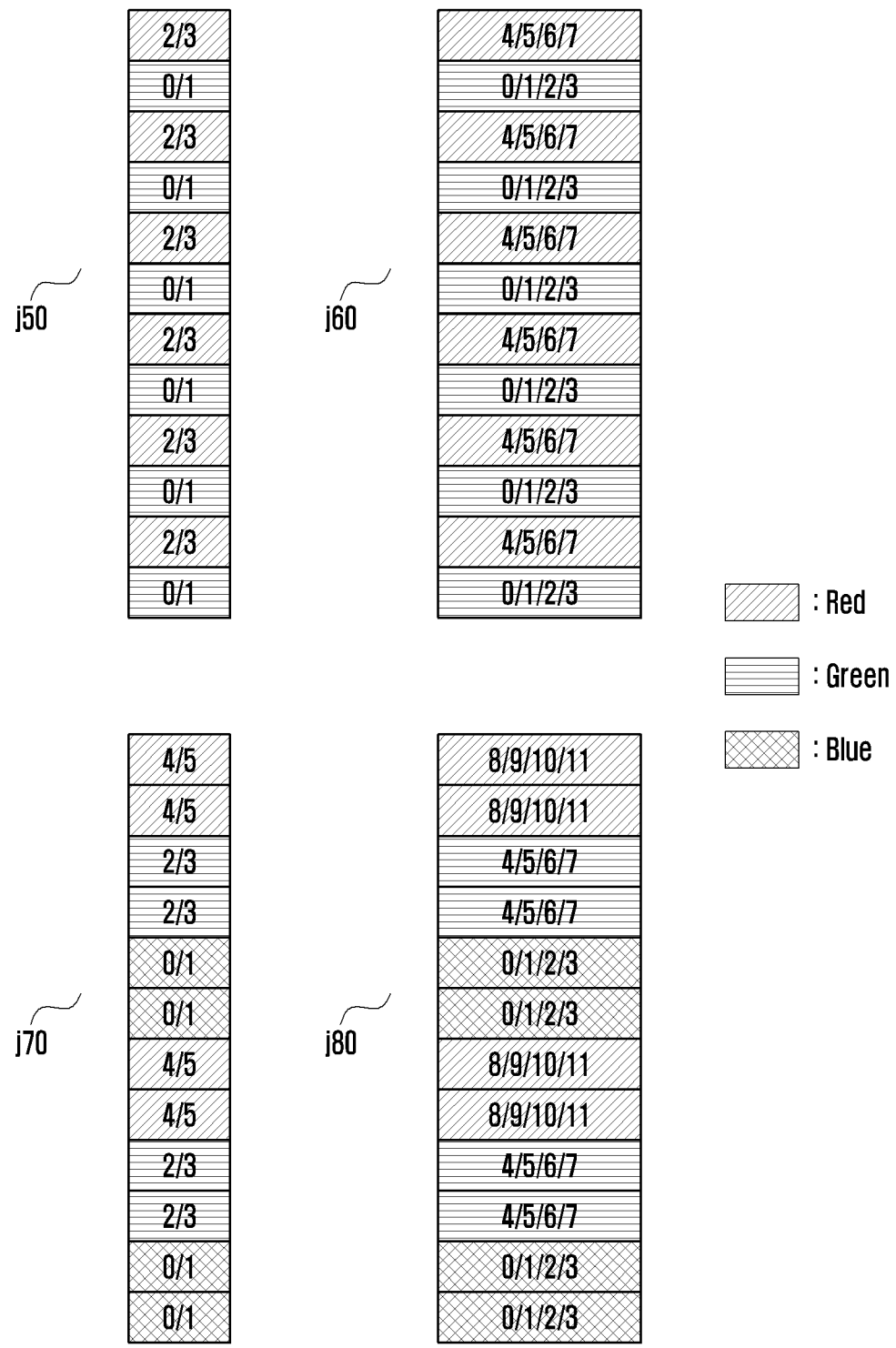

The DMRS port indexing method for DMRS type2 one symbol DMRS pattern has been already determined as shown in part j30 of FIG. 10A, part j70 of FIG. 10B, and part j110 of FIG. 10C. Accordingly, the DMRS CDM group may be configured as follows:
DMRS type2 one symbol DMRS pattern;
  CDM group0={0,1};
  CDM group1={2,3}; and
  CDM group2={4,5}.

However, any DMRS port indexing method has not determined yet for the two symbol DMRS pattern. Accordingly, it may be possible to determine the DMRS port indexing method for DMRS type1 two symbol DMRS pattern as follows according to the DMRS port indexing methods of FIGS. 10A, 10B, and 10C:
DMRS type1 two symbol DMRS pattern (based on part j20 of FIG. 10A);
  CDM group0={0,1,4,5};
  CDM group1={2,3,6,7};
DMRS type1 two symbol DMRS pattern (based on part j60 of FIG. 10B);
  CDM group0={0,1,2,3};
  CDM group1={4,5,6,7};

DMRS type1 two symbol DMRS pattern (based on part j100 of FIG. 10C);
  CDM group0={0,1,4,6}; and
  CDM group1={2,3,5,7}.

It may be possible to determine the DMRS port indexing method for DMRS type2 two symbol DMRS pattern as follows according to the DMRS port indexing methods of FIGS. 10A, 10B, and 10C:

DMRS type2 two symbol DMRS pattern (based on part j40 of FIG. 10A);
  CDM group0={0,1,6,7};
  CDM group1={2,3,8,9};
  CDM group2={4,5,10,11};
DMRS type2 two symbol DMRS pattern (based on part j80 of FIG. 10B);
  CDM group0={0,1,2,3};
  CDM group1={4,5,6,7};
  CDM group2={8,9,10,11};
DMRS type2 two symbol DMRS pattern (based on part j120 of FIG. 10C);
  CDM group0={0,1,6,9};
  CDM group1={2,3,7, 10}; and
  CDM group2={4,5,8,11}.

Method 2 includes signaling the co-scheduled DMRS port information accurately along with the scheduled DMRS port information of the target user. A description is made of the method for indicating the DMRS port information of the user co-scheduled with the target user in one DMRS table Method 1 and Method 2 hereinafter.

The method for designing a DMRS table containing the DMRS port information of the target user and the DMRS port information of a user co-scheduled with the target user is described per DMRS type, i.e., DMRS type1 and DMRS type2, and per DMRS pattern, i.e., one-symbol DMRS pattern and two-symbol DMRS pattern. The difference between the DMRS type1 and DMRS type2 has been described in detail in the previous embodiments (see FIGS. 4, 5, and 10, for example). The DMRS type1 and DMRS type2 are configured by higher layers under the name of DL-DMRS-config-type for downlink in the RRC, which may be set to 1 for DMRS Type1 and 2 for DMRS Type2. For uplink, the DMRS type1 and DMRS type2 are configured under the name of UL-DMRS-config-type in the RRC, which is set to 1 for DMRS Type1 and 2 for DMRS Type2. The difference between the one-symbol DMRS pattern and the two-symbol has been described in detail in the previous embodiments (see FIGS. 4, 5, and 10, for example). The maximum length of a symbol may be configured by higher layers. The maximum symbol length is configured under the name of DL-DMRS-max-len for downlink in the RRC, which is set to 1 or 2. The DL-DMRS-max-len is set to 1 for one symbol DMRS pattern and, if it is set to 2, whether the DMRS pattern is a one-symbol pattern or a two-symbol pattern is actually indicated via DCI.

For uplink, the maximum symbol length is configured under the name of UL-DMRS-max-len in RRC, which is set to 1 or 2. The UL-DMRS-max-len is set to 1 for one-symbol DMRS pattern and, if it is set to 2, whether the DMRS pattern is a one-symbol pattern or a two-symbol DMRS is actually indicated via DCI.

Since the DMRS port indexing method for two-symbol DMRS patterns has not yet been determined, although the DMRS port indexing method for one-symbol DMRS patterns has already been determined, a description is made of the method for designing the DMRS table in accordance with the DMRS port indexing method of the two-symbol DMRS pattern with reference to FIGS. 10A, 10B, and 10C. The DMRS table design principle of the seventh embodiment is applicable to all DMRS port indexing methods. For example, the DMRS table design principle based on the DMRS port indexing methods of FIGS. 10A, 10B, and 10C may be extended to other DMRS port indexing methods. The DMRS table design method described in the seventh embodiment may be summarized as follows. It should be noted that the methods summarized below have been already disclosed in the third embodiment.

port number assignment method
  For MU-MIMO, assign DMRS ports belonging to the same CDM group (→agreed in 3GPP).
  If the number of ports to assign is less than the number of ports belonging to one CDM group, it is not allowed to assign the ports belonging to another CDM group.
  Only if the number of ports to assign is greater than the number of ports belonging to one CDM group, it is allowed to assign the ports belonging to another CDM group additionally.
  If necessary, it may be possible to assign additional DMRS ports with FDM preferentially.
DMRS table signaling overhead reduction method
  When the one symbol and two symbol indicator is provided by higher layers, it may be possible to signal the number of layer & port number information for the one-symbol case and the number of layer & port number information for the two-symbol case in Tables 9 and 10 separately (→it is agreed in 3GPP that if the maximum symbol length is configured by higher layers and indicates 2, whether the DMRS pattern is a one-symbol DMRS pattern or a two-symbol DMRS pattern is indicated via DCI).
  If number of layers >4, this is the case of 2-CW transmission and thus it may be considered to configure the number of layer & port number information for 1-CW transmission (number of layers ≤4) into two rows for signaling.
  It may also be possible to further consider limiting port number assignment to specific port numbers among the combinations of port assignments configured according to the port number assignment method (see third embodiment, for example).

The method of assigning the DMRS ports in the same CDM group in view of the UE, as the first one of the disclosed port number assignment methods, has been used in 3GPP. The method of indicating whether the DMRS pattern is a one-symbol DMRS pattern or two-symbol DMRS pattern by configuring the maximum symbol length by higher layers as the first one of the methods for reducing the DMRS table signaling overhead has been used in 3GPP. Accordingly, the maximum symbol length is set to 1 for configuring a DMRS table for one-symbol DMRS pattern and 2 for configuring a DMRS table for both the one-symbol and two-symbol DMRS patterns. It is possible to switch between the one-symbol DMRS pattern and the two-symbol DMRS pattern. Accordingly, the seventh embodiment proposes a method for indicating the DMRS port information of the user co-scheduled with the target user in one DMRS table based on the disclosed DMRS table design method and the agreement made currently in 3GPP.

A description is made of the DMRS table design method for DMRS type1 one symbol DMRS patterns. The DMRS port indexing method for DMRS type1 one symbol DMRS patterns has already been determined with the port indices as shown in part j10 of FIG. 10A, part j50 of FIG. 10B, and part j90 of FIG. 10C. By applying Method 2 to the disclosed DMRS table design principle, it is possible to derive Table 29-1 as a DMRS table.

TABLE 29-1

| Index | scheduled port(s) | co-scheduled port(s) | Examples of SU/MU scheduling |
|---|---|---|---|
| 0 | 0 | No | SU |
| 1 | 0, 1 | No | SU |
| 2 | 0, 2 | No | SU |
| 3 | 0, 1, 2 | No | SU |
| 4 | 0, 1, 2, 3 | No | SU |
| 5 | 0 | 1 | MU (1 + 1) |
| 6 | 0 | 2 | MU (1 + 1) |
| 7 | 0 | 1, 2 | MU (1 + 1 + 1) |
| 8 | 0 | 1, 2, 3 | MU (1 + 1 + 2 or 1 + 1 + 1 + 1) |
| 9 | 1 | 0 | MU (1 + 1) |
| 10 | 1 | 0, 2 | MU (1 + 1 + 1) |
| 11 | 1 | 0, 2, 3 | MU (1 + 1 + 2 or 1 + 1 + 1 + 1) |
| 12 | 2 | 0 | MU (1 + 1) |
| 13 | 2 | 0, 1 | MU (1 + 2 or 1 + 1 + 1) |
| 14 | 2 | 0, 1, 3 | MU (1 + 2 + 1 or 1 + 1 + 1 + 1) |
| 15 | 3 | 0, 1, 2 | MU (1 + 2 + 1 or 1 + 1 + 1 + 1) |
| 16 | 0, 1 | 2 | MU (2 + 1) |
| 17 | 0, 1 | 2, 3 | MU (2 + 2) |
| 18 | 2, 3 | 0, 1 | MU (2 + 2) |

When expressing Table 29-1 as the co-scheduled CDM group(s) using Method 1, the DMRS table may be configured as Table 29-2.

TABLE 29-2

| Index | scheduled port(s) | co-scheduled CDM group(s) |
|---|---|---|
| 0 | 0 | No |
| 1 | 0, 1 | No |
| 2 | 0, 2 | No |
| 3 | 0, 1, 2 | No |
| 4 | 0, 1, 2, 3 | No |
| 5 | 0 | CDM group 0 |
| 6 | 0 | CDM group 1 |
| 7 | 0 | CDM group 0, 1 |
| 8 | 1 | CDM group 0 |
| 9 | 1 | CDM group 0, 1 |
| 10 | 2 | CDM group 0 |
| 11 | 2 | CDM group 0, 1 |
| 12 | 3 | CDM group 0, 1 |
| 13 | 0, 1 | CDM group 1 |
| 14 | 2, 3 | CDM group 0 |

If DMRS port assignment with FDM for SU/MU scheduling is not allowed for 2-layer transmission in Table 29-1, this may be expressed as Table 29-3.

TABLE 29-3

| Index | scheduled port(s) | co-scheduled port(s) | Examples of SU/MU scheduling |
|---|---|---|---|
| 0 | 0 | No | SU |
| 1 | 0, 1 | No | SU |
| 2 | 0, 1, 2 | No | SU |
| 3 | 0, 1, 2, 3 | No | SU |
| 4 | 0 | 1 | MU (1 + 1) |
| 5 | 0 | 1, 2 | MU (1 + 1 + 1) |
| 6 | 0 | 1, 2, 3 | MU (1 + 1 + 2 or 1 + 1 + 1 + 1) |
| 7 | 1 | 0 | MU (1 + 1) |
| 8 | 1 | 0, 2 | MU (1 + 1 + 1) |
| 9 | 1 | 0, 2, 3 | MU (1 + 1 + 2 or 1 + 1 + 1 + 1) |
| 10 | 2 | 0, 1 | MU (1 + 2 or 1 + 1 + 1) |
| 11 | 2 | 0, 1, 3 | MU (1 + 2 + 1 or 1 + 1 + 1 + 1) |
| 12 | 3 | 0, 1, 2 | MU (1 + 2 + 1 or 1 + 1 + 1 + 1) |
| 13 | 0, 1 | 2 | MU (2 + 1) |
| 14 | 0, 1 | 2, 3 | MU (2 + 2) |
| 15 | 2, 3 | 0, 1 | MU (2 + 2) |

When expressing Table 29-3 as the co-scheduled CDM group(s) using Method 1, the DMRS table may be configured as Table 29-4.

TABLE 29-4

| Index | scheduled port(s) | co-scheduled CDM group(s) |
|---|---|---|
| 0 | 0 | No |
| 1 | 0, 1 | No |
| 2 | 0, 1, 2 | No |
| 3 | 0, 1, 2, 3 | No |
| 4 | 0 | CDM group 0 |
| 5 | 0 | CDM group 0, 1 |
| 6 | 1 | CDM group 0 |
| 7 | 1 | CDM group 0, 1 |
| 8 | 2 | CDM group 0 |
| 9 | 2 | CDM group 0, 1 |
| 10 | 3 | CDM group 0, 1 |
| 11 | 0, 1 | CDM group 1 |
| 12 | 2, 3 | CDM group 0 |

If only DMRS port assignment with FDM for SU/MU scheduling is allowed for 2-layer transmission in Table 29-1, this may be expressed as Table 29-5.

TABLE 29-5

| Index | scheduled port(s) | co-scheduled port(s) | Examples of SU/MU scheduling |
|---|---|---|---|
| 0 | 0 | No | SU |
| 1 | 0, 2 | No | SU |
| 2 | 0, 1, 2 | No | SU |
| 3 | 0, 1, 2, 3 | No | SU |
| 4 | 0 | 2 | MU (1 + 1) |
| 5 | 0 | 1, 2 | MU (1 + 1 + 1) |
| 6 | 0 | 1, 2, 3 | MU (1 + 1 + 2 or 1 + 1 + 1 + 1) |
| 7 | 1 | 0, 2 | MU (1 + 1 + 1) |
| 8 | 1 | 0, 2, 3 | MU (1 + 1 + 2 or 1 + 1 + 1 + 1) |
| 9 | 2 | 0 | MU (1 + 1) |
| 10 | 2 | 0, 1 | MU (1 + 2 or 1 + 1 + 1) |
| 11 | 2 | 0, 1, 3 | MU (1 + 2 + 1 or 1 + 1 + 1 + 1) |
| 12 | 3 | 0, 1, 2 | MU (1 + 2 + 1 or 1 + 1 + 1 + 1) |
| 13 | 0, 1 | 2 | MU (2 + 1) |
| 14 | 0, 1 | 2, 3 | MU (2 + 2) |
| 15 | 2, 3 | 0, 1 | MU (2 + 2) |

When expressing Table 29-5 as the co-scheduled CDM group(s) using Method 1, the DMRS table may be configured as Table 29-6.

TABLE 29-6

| Index | scheduled port(s) | co-scheduled CDM group(s) |
|---|---|---|
| 0 | 0 | No |
| 1 | 0, 2 | No |
| 2 | 0, 1, 2 | No |
| 3 | 0, 1, 2, 3 | No |
| 4 | 0 | CDM group 1 |
| 5 | 0 | CDM group 0, 1 |
| 6 | 1 | CDM group 0, 1 |
| 7 | 2 | CDM group 0 |
| 8 | 2 | CDM group 0, 1 |
| 9 | 3 | CDM group 0, 1 |

TABLE 29-6-continued

| Index | scheduled port(s) | co-scheduled CDM group(s) |
|---|---|---|
| 10 | 0, 1 | CDM group 1 |
| 11 | 2, 3 | CDM group 0 |

Next, a description is made of the DMRS table design method for DMRS type 1 two symbol DMRS patterns. A description is made of the DMRS table design method in accordance with the DMRS port indexing method of part j20 of FIG. 10A. When applying Method 2 to the DMRS table design principle, the DMRS table may be configured as Table 30-1.

TABLE 30-1

| Index | scheduled port(s) | co-scheduled port(s) | Examples of SU/MU scheduling | comments |
|---|---|---|---|---|
| 0 | 0 | No | SU | |
| 1 | 0, 1 | No | SU | |
| 2 | 0, 1, 4 | No | SU | can be replaced to 0, 1, 2 |
| 3 | 0, 1, 4, 5 | No | SU | can be replaced to 0, 1, 2, 3 |
| 4 | 0, 1, 2, 3, 4 | No | SU | 2CW, can be moved to another row |
| 5 | 0, 1, 2, 3, 4, 5 | No | SU | 2CW, can be moved to another row |
| 6 | 0, 1, 2, 3, 4, 5, 6 | No | SU | 2CW, can be moved to another row |
| 7 | 0, 1, 2, 3, 4, 5, 6, 7 | No | SU | 2CW, can be moved to another row |
| 8 | 0 | 1 | MU (1 + 1) | |
| 9 | 0 | 4, 5 | MU (1 + 2 or 1 + 1 + 1) | |
| 10 | 0 | 1, 4, 5 | MU (1 + 3 or 1 + 1 + 2 or 1 + 1 + 1 + 1) | |
| 11 | 0 | 2, 3, 6, 7 | MU (1 + 4 or 1 + 1 + 3 or 1 + 2 + 2 or 1 + 1 + 1 + 2 or 1 + 1 + 1 + 1 + 1) | |
| 12 | 0 | 1, 2, 3, 6, 7 | MU (1 + 1 + 4 or 1 + 1 + 2 + 2 or 1 + 1 + 1 + 1 + 1) | |
| 13 | 0 | 4, 5, 2, 3, 6, 7 | MU (1 + 2 + 4 or 1 + 2 + 2 + 2 or 1 + 1 + 1 + 1 + 1 + 1 + 1) | |
| 14 | 0 | 1, 4, 5, 2, 3, 6, 7 | MU (1 + 1 + 2 + 4 or 1 + 1 + 2 + 2 + 2 or 1 + 1 + 1 + 1 + 1 + 1 + 1 + 1) | |
| 15 | 1 | 0 | MU (1 + 1) | |
| 16 | 1 | 0, 4, 5 | MU (1 + 1 + 2 or 1 + 1 + 1 + 1) | |
| 17 | 1 | 0, 2, 3, 6, 7 | MU (1 + 1 + 4 or 1 + 2 + 2 or 1 + 1 + 1 + 1 + 1) | |
| 18 | 1 | 0, 4, 5, 2, 3, 6, 7 | MU (1 + 1 + 2 + 4 or 1 + 1 + 2 + 2 + 2 or 1 + 1 + 1 + 1 + 1 + 1 + 1 + 1) | |
| 19 | 2 | 0, 3, 6, 7 | MU (1 + 1 + 3 or 1 + 1 + 1 + 2 or 1 + 1 + 1 + 1 + 1) | |
| 20 | 2 | 0, 1, 3, 6, 7 | MU (1 + 1 + 1 + 1 + 1) | |
| 21 | 2 | 0, 3, 4, 5, 6, 7 | MU (1 + 1 + 1 + 1 + 1 + 1) | |
| 22 | 2 | 0, 1, 3, 4, 5, 6, 7 | MU (1 + 1 + 1 + 1 + 1 + 1 + 1) | |
| 23 | 3 | 0, 2, 6, 7 | MU (1 + 1 + 1 + 1 + 1) | |
| 24 | 3 | 0, 1, 2, 6, 7 | MU (1 + 1 + 1 + 1 + 1) | |
| 25 | 3 | 0, 2, 4, 5, 6, 7 | MU (1 + 1 + 1 + 1 + 1 + 1) | |
| 26 | 3 | 0, 1, 2, 4, 5, 6, 7 | MU (1 + 1 + 1 + 1 + 1 + 1 + 1) | |
| 27 | 4 | 0, 5 | MU (1 + 1 + 1) | |
| 28 | 4 | 0, 1, 5 | MU (1 + 1 + 1 + 1) | |
| 29 | 4 | 0, 2, 3, 5, 6, 7 | MU (1 + 1 + 1 + 1 + 1 + 1) | |
| 30 | 4 | 0, 1, 2, 3, 5, 6, 7 | MU (1 + 1 + 1 + 1 + 1 + 1 + 1) | |
| 31 | 5 | 0, 4 | MU (1 + 1 + 1) | |
| 32 | 5 | 0, 1, 4 | MU (1 + 1 + 1 + 1) | |
| 33 | 5 | 0, 2, 3, 4, 6, 7 | MU (1 + 1 + 1 + 1 + 1 + 1) | |
| 34 | 5 | 0, 1, 2, 3, 4, 6, 7 | MU (1 + 1 + 1 + 1 + 1 + 1 + 1) | |
| 35 | 6 | 0, 2, 3, 7 | MU (1 + 1 + 1 + 1 + 1) | |
| 36 | 6 | 0, 1, 2, 3, 7 | MU (1 + 1 + 1 + 1 + 1 + 1) | |
| 37 | 6 | 0, 2, 3, 4, 5, 7 | MU (1 + 1 + 1 + 1 + 1 + 1) | |
| 38 | 6 | 0, 1, 2, 3, 4, 5, 7 | MU (1 + 1 + 1 + 1 + 1 + 1 + 1) | |
| 39 | 7 | 0, 2, 3, 6 | MU (1 + 1 + 1 + 1 + 1) | |
| 40 | 7 | 0, 1, 2, 3, 6 | MU (1 + 1 + 1 + 1 + 1 + 1) | |
| 41 | 7 | 0, 2, 3, 4, 5, 6 | MU (1 + 1 + 1 + 1 + 1 + 1) | |
| 42 | 7 | 0, 1, 2, 3, 4, 5, 6 | MU (1 + 1 + 1 + 1 + 1 + 1 + 1) | |
| 43 | 0, 1 | 4, 5 | MU (2 + 2) | |
| 44 | 4, 5 | 0 | MU (2 + 1) | |
| 45 | 4, 5 | 0, 1 | MU (2 + 2) | |
| 46 | 4, 5 | 0, 2, 3, 6, 7 | MU (2 + 1 + 1 + 1 + 1) | |
| 47 | 4, 5 | 0, 1, 2, 3, 6, 7 | MU (2 + 1 + 1 + 1 + 1 + 1) | |

TABLE 30-1-continued

| Index | scheduled port(s) | co-scheduled port(s) | Examples of SU/MU scheduling | comments |
|---|---|---|---|---|
| 48 | 2, 3 | 0, 6, 7 | MU (2 + 1 + 1 + 1) | |
| 49 | 2, 3 | 0, 1, 6, 7 | MU (2 + 1 + 1 + 1 + 1) | |
| 50 | 2, 3 | 0, 4, 5, 6, 7 | MU (2 + 1 + 1 + 1 + 1 + 1) | |
| 51 | 2, 3 | 0, 1, 4, 5, 6, 7 | MU (2 + 1 + 1 + 1 + 1 + 1 + 1) | |
| 52 | 6, 7 | 0, 2, 3 | MU (2 + 1 + 1 + 1) | |
| 53 | 6, 7 | 0, 1, 2, 3 | MU (2 + 1 + 1 + 1 + 1) | |
| 54 | 6, 7 | 0, 2, 3, 4, 5 | MU (2 + 1 + 1 + 1 + 1 + 1) | |
| 55 | 6, 7 | 0, 1, 2, 3, 4, 5 | MU (2 + 1 + 1 + 1 + 1 + 1 + 1) | |
| 56 | 1, 4, 5 | 0 | MU (3 + 1) | |
| 57 | 1, 4, 5 | 3, 6, 7 | MU (3 + 3 or 3 + 1 + 1 + 1 + 1 + 1) | |
| 58 | 3, 6, 7 | 0, 2 | MU (3 + 1 + 1) | |
| 59 | 3, 6, 7 | 1, 4, 5 | MU (3 + 3 or 3 + 1 + 1 + 1 + 1 + 1) | |
| 60 | 0, 1, 4, 5 | 2, 3, 6, 7 | MU (4 + 4) | |
| 61 | 2, 3, 6, 7 | 0 | MU (4 + 1) | |
| 62 | 2, 3, 6, 7 | 0, 1 | MU (4 + 2 or 4 + 1 + 1) | |
| 63 | 2, 3, 6, 7 | 0, 4, 5 | MU (4 + 1 + 1 + 1) | |
| 64 | 2, 3, 6, 7 | 0, 1, 4, 5 | MU (4 + 4) | |

When expressing Table 30-1 as the co-scheduled CDM group(s) using Method 1, the DMRS table maybe presented as Table 30-2.

TABLE 30-2

| Index | scheduled port(s) | co-scheduled CDM group(s) | comments |
|---|---|---|---|
| 0 | 0 | No | |
| 1 | 0, 1 | No | |
| 2 | 0, 1, 4 | No | can be replaced to 0, 1, 2 |
| 3 | 0, 1, 4, 5 | No | can be replaced to 0, 1, 2, 3 |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 1 | |
| 10 | 0 | CDM group 0, 1 | |
| 11 | 1 | CDM group 0 | |
| 12 | 1 | CDM group 0, 1 | |
| 13 | 2 | CDM group 0, 1 | |
| 14 | 3 | CDM group 0, 1 | |
| 15 | 4 | CDM group 0 | |
| 16 | 4 | CDM group 0, 1 | |
| 17 | 5 | CDM group 0 | |
| 18 | 5 | CDM group 0, 1 | |
| 19 | 6 | CDM group 0, 1 | |
| 20 | 7 | CDM group 0, 1 | |
| 21 | 0, 1 | CDM group 0 | |
| 22 | 0, 1 | CDM group 0, 1 | |
| 23 | 2, 3 | CDM group 0, 1 | |
| 24 | 4, 5 | CDM group 0 | |
| 25 | 4, 5 | CDM group 0, 1 | |
| 26 | 6, 7 | CDM group 0, 1 | |
| 27 | 0, 1, 4 | CDM group 0 | can be removed or with different port number such as 1, 4, 5 |
| 28 | 0, 1, 4 | CDM group 1 | can be removed or with different port number such as 1, 4, 5 |
| 29 | 2, 3, 6 | CDM group 0 | can be removed or with different port number such as 3, 6, 7 |
| 30 | 2, 3, 6 | CDM group 1 | can be removed or with different port number such as 3, 6, 7 |
| 31 | 0, 1, 4, 5 | CDM group 1 | |
| 32 | 2, 3, 6, 7 | CDM group 0 | |

It may be possible to add index 12 to Table 30-2 instead of removing the index 9 from Table 31-2 in order to achieve the same MU-pairing effect.

TABLE 30-3

| Index | scheduled port(s) | co-scheduled CDM group(s) | comments |
|---|---|---|---|
| 0 | 0 | No | |
| 1 | 0, 1 | No | |
| 2 | 0, 1, 4 | No | can be replaced to 0, 1, 2 |
| 3 | 0, 1, 4, 5 | No | can be replaced to 0, 1, 2, 3 |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 0, 1 | |
| 10 | 1 | CDM group 0 | |
| 11 | 1 | CDM group 0, 1 | |
| 12 | 2 | CDM group 0 | |
| 13 | 2 | CDM group 0, 1 | |
| 14 | 3 | CDM group 0, 1 | |
| 15 | 4 | CDM group 0 | |
| 16 | 4 | CDM group 0, 1 | |
| 17 | 5 | CDM group 0 | |

TABLE 30-3-continued

| Index | scheduled port(s) | co-scheduled CDM group(s) | comments |
|---|---|---|---|
| 18 | 5 | CDM group 0, 1 | |
| 19 | 6 | CDM group 0, 1 | |
| 20 | 7 | CDM group 0, 1 | |
| 21 | 0, 1 | CDM group 0 | |
| 22 | 0, 1 | CDM group 0, 1 | |
| 23 | 2, 3 | CDM group 0, 1 | |
| 24 | 4, 5 | CDM group 0 | |
| 25 | 4, 5 | CDM group 0, 1 | |
| 26 | 6, 7 | CDM group 0, 1 | |
| 27 | 0, 1, 4 | CDM group 0 | can be removed or with different port number such as 1, 4, 5 |
| 28 | 0, 1, 4 | CDM group 1 | can be removed or with different port number such as 1, 4, 5 |
| 29 | 2, 3, 6 | CDM group 0 | can be removed or with different port number such as 3, 6, 7 |
| 30 | 2, 3, 6 | CDM group 1 | can be removed or with different port number such as 3, 6, 7 |
| 31 | 0, 1, 4, 5 | CDM group 1 | |
| 32 | 2, 3, 6, 7 | CDM group 0 | |

How to assign DMRS port numbers to the scheduled port(s) corresponding to indices 4 to 6 in Tables 30-1 to 30-3 is not limited to the methods represented by the above tables. For example, it may be possible to schedule 5 arbitrary ports that are not allowed to be overlapped among the DMRS ports 0 to 7 for index 4 in Table 30-1. It may also be possible to schedule 6 arbitrary ports that are not allowed to be overlapped among the DMRS ports 0 to 7 for index 5. It may also be possible to schedule 7 arbitrary ports that are not allowed to be overlapped among the DMRS ports 0 to 7 for index 6.

As described above, when the symbol length is 1 or 2, the maximum DMRS symbol length is set to 2. Accordingly, it is possible to combine the one-symbol DMRS pattern Tables 29-1 to 29-6 and the two-symbol DMRS pattern Tables 30-1 to 30-3 into one table for indicating whether the number of symbols is 1 or 2.

When using the DMRS port indexing method of part j60 of FIG. 10B, it may be possible to derive Table 30-4 by applying Method 1 to Table 30-2.

TABLE 30-4

| Index | scheduled port(s) | co-scheduled CDM group(s) | comments |
|---|---|---|---|
| 0 | 0 | No | |
| 1 | 0, 1 | No | |
| 2 | 0, 1, 2 | No | |
| 3 | 0, 1, 2, 3 | No | |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 1 | |
| 10 | 0 | CDM group 0, 1 | |
| 11 | 1 | CDM group 0 | |
| 12 | 1 | CDM group 0, 1 | |
| 13 | 2 | CDM group 0 | |
| 14 | 2 | CDM group 0, 1 | |
| 15 | 3 | CDM group 0 | |
| 16 | 3 | CDM group 0, 1 | |
| 17 | 4 | CDM group 0, 1 | |
| 18 | 5 | CDM group 0, 1 | |
| 19 | 6 | CDM group 0, 1 | |
| 20 | 7 | CDM group 0, 1 | |
| 21 | 0, 1 | CDM group 0 | |
| 22 | 0, 1 | CDM group 0, 1 | |
| 23 | 2, 3 | CDM group 0 | |
| 24 | 2, 3 | CDM group 0, 1 | |
| 25 | 4, 5 | CDM group 0, 1 | |
| 26 | 6, 7 | CDM group 0, 1 | |
| 27 | 0, 1, 2 | CDM group 0 | can be removed or with different port number such as 1, 2, 3 |
| 28 | 0, 1, 2 | CDM group 1 | can be removed or with different port number such as 1, 2, 3 |
| 29 | 4, 5, 6 | CDM group 0 | can be removed or with different port number such as 5, 6, 7 |
| 30 | 4, 5, 6 | CDM group 1 | can be removed or with different port number such as 5, 6, 7 |
| 31 | 0, 1, 2, 3 | CDM group 1 | |
| 32 | 4, 5, 6, 7 | CDM group 0 | |

When using the DMRS port indexing method of part j60 of FIG. 10B, it may be possible to derive Table 30-5 by applying Method 1 to Table 30-3.

TABLE 30-5

| Index | scheduled port(s) | co-scheduled CDM group(s) | comments |
|---|---|---|---|
| 0 | 0 | No | |
| 1 | 0, 1 | No | |
| 2 | 0, 1, 2 | No | |
| 3 | 0, 1, 2, 3 | No | |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 0, 1 | |

TABLE 30-5-continued

| Index | scheduled port(s) | co-scheduled CDM group(s) | comments |
|---|---|---|---|
| 10 | 1 | CDM group 0 | |
| 11 | 1 | CDM group 0, 1 | |
| 12 | 2 | CDM group 0 | |
| 13 | 2 | CDM group 0 | |
| 14 | 2 | CDM group 0, 1 | |
| 15 | 3 | CDM group 0 | |
| 16 | 3 | CDM group 0, 1 | |
| 17 | 4 | CDM group 0, 1 | |
| 18 | 5 | CDM group 0, 1 | |
| 19 | 6 | CDM group 0, 1 | |
| 20 | 7 | CDM group 0, 1 | |
| 21 | 0, 1 | CDM group 0 | |
| 22 | 0, 1 | CDM group 0, 1 | |
| 23 | 2, 3 | CDM group 0 | |
| 24 | 2, 3 | CDM group 0, 1 | |
| 25 | 4, 5 | CDM group 0, 1 | |
| 26 | 6, 7 | CDM group 0, 1 | |
| 27 | 0, 1, 2 | CDM group 0 | can be removed or with different port number such as 1, 2, 3 |
| 28 | 0, 1, 2 | CDM group 1 | can be removed or with different port number such as 1, 2, 3 |
| 29 | 4, 5, 6 | CDM group 0 | can be removed or with different port number such as 5, 6, 7 |
| 30 | 4, 5, 6 | CDM group 1 | can be removed or with different port number such as 5, 6, 7 |
| 31 | 0, 1, 2, 3 | CDM group 1 | |
| 32 | 4, 5, 6, 7 | CDM group 0 | |

When using the DMRS port indexing method of part j100 of FIG. 10C, it may be possible to derive Table 30-6 by applying Method 1 to Table 30-2.

TABLE 30-6

| Index | scheduled port(s) | co-scheduled CDM group(s) | comments |
|---|---|---|---|
| 0 | 0 | No | |
| 1 | 0, 1 | No | |
| 2 | 0, 1, 4 | No | |
| 3 | 0, 1, 4, 6 | No | |
| 4 | 0, 1, 2, 4, 6 | No | 2CW, can be moved to another row |
| 5 | 0, 1, 2, 3, 4, 6 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 1 | |
| 10 | 0 | CDM group 0, 1 | |
| 11 | 1 | CDM group 0 | |
| 12 | 1 | CDM group 0, 1 | |
| 13 | 2 | CDM group 0, 1 | |
| 14 | 3 | CDM group 0, 1 | |
| 15 | 4 | CDM group 0 | |
| 16 | 4 | CDM group 0, 1 | |
| 17 | 5 | CDM group 0, 1 | |

TABLE 30-6-continued

| Index | scheduled port(s) | co-scheduled CDM group(s) | comments |
|---|---|---|---|
| 18 | 6 | CDM group 0 | |
| 19 | 6 | CDM group 0, 1 | |
| 20 | 7 | CDM group 0, 1 | |
| 21 | 0, 1 | CDM group 0 | |
| 22 | 0, 1 | CDM group 0, 1 | |
| 23 | 2, 3 | CDM group 0, 1 | |
| 24 | 4, 6 | CDM group 0 | |
| 25 | 4, 6 | CDM group 0, 1 | |
| 26 | 5, 7 | CDM group 0, 1 | |
| 27 | 0, 1, 4 | CDM group 0 | can be removed or with different port number such as 1, 4, 6 |
| 28 | 0, 1, 4 | CDM group 1 | can be removed or with different port number such as 1, 4, 6 |
| 29 | 2, 3, 5 | CDM group 0 | can be removed or with different port number such as 3, 5, 7 |
| 30 | 2, 3, 5 | CDM group 1 | can be removed or with different port number such as 3, 5, 7 |
| 31 | 0, 1, 4, 6 | CDM group 1 | |
| 32 | 2, 3, 5, 7 | CDM group 0 | |

When using the DMRS port indexing method of part j100 of FIG. 10C, it may be possible to derive Table 30-7 by applying Method 1 to Table 30-3.

TABLE 30-7

| Index | scheduled port(s) | co-scheduled CDM group(s) | comments |
|---|---|---|---|
| 0 | 0 | No | |
| 1 | 0, 1 | No | |
| 2 | 0, 1, 4 | No | |
| 3 | 0, 1, 4, 6 | No | |
| 4 | 0, 1, 2, 4, 6 | No | 2CW, can be moved to another row |
| 5 | 0, 1, 2, 3, 4, 6 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 0, 1 | |
| 10 | 1 | CDM group 0 | |
| 11 | 1 | CDM group 0, 1 | |
| 12 | 2 | CDM group 0 | |
| 13 | 2 | CDM group 0, 1 | |
| 14 | 3 | CDM group 0, 1 | |
| 15 | 4 | CDM group 0 | |
| 16 | 4 | CDM group 0, 1 | |
| 17 | 5 | CDM group 0, 1 | |
| 18 | 6 | CDM group 0 | |
| 19 | 6 | CDM group 0, 1 | |
| 20 | 7 | CDM group 0, 1 | |
| 21 | 0, 1 | CDM group 0, 1 | |
| 22 | 0, 1 | CDM group 0, 1 | |
| 23 | 2, 3 | CDM group 0, 1 | |
| 24 | 4, 6 | CDM group 0 | |
| 25 | 4, 6 | CDM group 0, 1 | |

TABLE 30-7-continued

| Index | scheduled port(s) | co-scheduled CDM group(s) | comments |
|---|---|---|---|
| 26 | 5, 7 | CDM group 0, 1 | |
| 27 | 0, 1, 4 | CDM group 0 | can be removed or with different port number such as 1, 4, 6 |
| 28 | 0, 1, 4 | CDM group 1 | can be removed or with different port number such as 1, 4, 6 |
| 29 | 2, 3, 5 | CDM group 0 | can be removed or with different port number such as 3, 5, 7 |
| 30 | 2, 3, 5 | CDM group 1 | can be removed or with different port number such as 3, 5, 7 |
| 31 | 0, 1, 4, 6 | CDM group 1 | |
| 32 | 2, 3, 5, 7 | CDM group 0 | |

As described above, when the symbol length is 1 or 2, the maximum DMRS symbol length is set to 2. Accordingly, it is possible to combine the one-symbol DMRS pattern Tables 29-1 to 29-6 and the two-symbol DMRS pattern Tables 30-4 to 30-7 into one table for indicating whether the number of symbols is 1 or 2.

A description is now made of the DMRS table design method for the DMRS type2 one symbol DMRS patterns. The DMRS port indexing method for DMRS type2 one symbol DMRS pattern has been already determined with the port indices as shown in j30 of FIG. 10A, part j70 of FIG. 10B, and part j110 of FIG. 10C. By applying Method 2 to the disclosed DMRS table design principle, it is possible to derive Table 31-1. In Table 31-1, it may be possible to use two rows for 1-CW and 2-CW and move indices 4 and 5 for 2-CW transmission to the row corresponding to the 2-CW transmission as described in the previous embodiment. For example, it may be possible to refer to Table 28-2. When 3-layer transmission per UE is not allowed in the MU-MIMO mode, the indices 27 and 28 may be omitted.

TABLE 31-1

| Index | scheduled port(s) | co-scheduled port(s) | Examples of SU/MU scheduling | comments |
|---|---|---|---|---|
| 0 | 0 | No | SU | |
| 1 | 0, 1 | No | SU | |
| 2 | 0, 1, 2 | No | SU | |
| 3 | 0, 1, 2, 3 | No | SU | |
| 4 | 0, 1, 2, 3, 4 | No | SU | 2CW, can be moved to another row |
| 5 | 0, 1, 2, 3, 4, 5 | No | SU | 2CW, can be moved to another row |
| 6 | 0 | 1 | MU (1 + 1) | |
| 7 | 0 | 1, 2 | MU (1 + 1 + 1) | |
| 8 | 0 | 1, 2, 3 | MU (1 + 1 + 2 or 1 + 1 + 1 + 1) | |
| 9 | 0 | 2, 3, 4, 5 | MU (1 + 1 + 1 + 1 + 1) | |
| 10 | 0 | 1, 2, 3, 4, 5 | MU (1 + 1 + 1 + 1 + 1 + 1) | |
| 11 | 1 | 0 | MU (1 + 1) | |
| 12 | 1 | 0, 2 | MU (1 + 1 + 1) | |
| 13 | 1 | 0, 2, 3 | MU (1 + 1 + 2 or 1 + 1 + 1 + 1) | |
| 14 | 1 | 0, 2, 3, 4, 5 | MU (1 + 1 + 2 + 2, 1 + 1 + 2 + 1 + 1, 1 + 1 + 1 + 1 + 1 + 1) | |
| 15 | 2 | 0, 1 | MU (1 + 1 + 1) | |
| 16 | 2 | 0, 1, 3 | MU (1 + 2 + 1 or 1 + 1 + 1 + 1) | |
| 17 | 2 | 0, 1, 3, 4, 5 | MU (1 + 2 + 1 + 2 or 1 + 2 + 1 + 1 + 1 or 1 + 1 + 1 + 1 + 1 + 1) | |
| 18 | 3 | 0, 1, 2 | MU (1 + 2 + 1 or 1 + 1 + 1 + 1) | |
| 19 | 3 | 0, 1, 2, 4, 5 | MU (1 + 2 + 1 + 2 or 1 + 1 + 1 + 1 + 1 + 1) | |
| 20 | 4 | 0, 1, 2, 3, 5 | MU (1 + 2 + 2 + 1 or 1 + 1 + 1 + 1 + 1 + 1) | |
| 21 | 5 | 0, 1, 2, 3, 4 | MU (1 + 2 + 2 + 1 or 1 + 1 + 1 + 1 + 1 + 1) | |
| 22 | 0, 1 | 2, 3 | MU (2 + 2, 2 + 1 + 1) | |
| 23 | 0, 1 | 2, 3, 4, 5 | MU (2 + 4, 2 + 2 + 1 + 1, 2 + 1 + 1 + 1 + 1) | |
| 24 | 2, 3 | 0, 1 | MU (2 + 2 or 2 + 1 + 1) | |
| 25 | 2, 3 | 0, 1, 4, 5 | MU (2 + 4 or 2 + 2 + 1 + 1 or 2 + 1 + 1 + 1 + 1) | |
| 26 | 4, 5 | 0, 1, 2, 3 | MU (2 + 4 or 2 + 2 + 1 + 1 or 2 + 1 + 1 + 1 + 1) | |
| 27 | 0, 1, 2 | 3, 4, 5 | MU (3 + 3 or 3 + 1 + 2 or 3 + 1 + 1 + 1) | can be removed |
| 28 | 3, 4, 5 | 0, 1, 2 | MU (3 + 3 or 3 + 2 + 1 or 3 + 1 + 1 + 1) | can be removed |
| 29 | 2, 3, 4, 5 | 0, 1 | MU (4 + 2 or 4 + 1 + 1) | |

When expressing Table 31-1 as the co-scheduled CDM group(s) using Method 1, the DMRS table may be configured as Table 31-2.

TABLE 31-2

| Index | scheduled port(s) | co-scheduled CDM group(s) | comments |
|---|---|---|---|
| 0 | 0 | No | |
| 1 | 0, 1 | No | |
| 2 | 0. 1. 2 | No | |
| 3 | 0. 1. 2. 3 | No | |
| 4 | 0. 1. 2. 3, 4 | No | 2CW, can be moved to another row |
| 5 | 0, 1, 2, 3, 4, 5 | No | 2CW, can be moved to another row |
| 6 | 0 | CDM group 0 | |
| 7 | 0 | CDM group 0, 1 | |
| 8 | 0 | CDM group 1, 2 | |
| 9 | 0 | CDM group 0, 1, 2 | |
| 10 | 1 | CDM group 0 | |
| 11 | 1 | CDM group 0, 1 | |
| 12 | 1 | CDM group 0, 1, 2 | |
| 13 | 2 | CDM group 0 | |
| 14 | 2 | CDM group 0, 1 | |
| 15 | 2 | CDM group 0, 1, 2 | |
| 16 | 3 | CDM group 0, 1 | |
| 17 | 3 | CDM group 0, 1, 2 | |
| 18 | 4 | CDM group 0, 1, 2 | |
| 19 | 5 | CDM group 0, 1, 2 | |
| 20 | 0, 1 | CDM group 1 | |
| 21 | 0, 1 | CDM group 1, 2 | |
| 22 | 2, 3 | CDM group 0 | |
| 23 | 2, 3 | CDM group 0, 2 | |
| 24 | 4, 5 | CDM group 0, 1 | |
| 25 | 0, 1, 2 | CDM group 1, 2 | can be removed |
| 26 | 3, 4, 5 | CDM group 0, 1 | can be removed |
| 27 | 2, 3, 4, 5 | CDM group 0 | |

It may be possible to add index 17 to Table 31-3 instead of removing the index 8 from Table 31-2 in order to achieve the same MU-pairing effect.

TABLE 31-3

| Index | scheduled port(s) | co-scheduled CDM group(s) | comments |
|---|---|---|---|
| 0 | 0 | No | |
| 1 | 0, 1 | No | |
| 2 | 0. 1. 2 | No | |
| 3 | 0. 1. 2. 3 | No | |
| 4 | 0. 1. 2. 3, 4 | No | 2CW, can be moved to another row |
| 5 | 0, 1, 2, 3, 4, 5 | No | 2CW, can be moved to another row |
| 6 | 0 | CDM group 0 | |
| 7 | 0 | CDM group 0, 1 | |
| 8 | 0 | CDM group 0, 1, 2 | |
| 9 | 1 | CDM group 0 | |
| 10 | 1 | CDM group 0, 1 | |
| 11 | 1 | CDM group 0, 1, 2 | |
| 12 | 2 | CDM group 0 | |
| 13 | 2 | CDM group 0, 1 | |
| 14 | 2 | CDM group 0, 1, 2 | |
| 15 | 3 | CDM group 0, 1 | |
| 16 | 3 | CDM group 0, 1, 2 | |
| 17 | 4 | CDM group 0, 1 | |
| 18 | 4 | CDM group 0, 1, 2 | |
| 19 | 5 | CDM group 0, 1, 2 | |
| 20 | 0, 1 | CDM group 1 | |
| 21 | 0, 1 | CDM group 1, 2 | |
| 22 | 2, 3 | CDM group 0 | |
| 23 | 2, 3 | CDM group 0, 2 | |
| 24 | 4, 5 | CDM group 0, 1 | |
| 25 | 0, 1, 2 | CDM group 1, 2 | can be removed |
| 26 | 3, 4, 5 | CDM group 0, 1 | can be removed |
| 27 | 2, 3, 4, 5 | CDM group 0 | |

When considering 1-layer transmission per UE in MU-MIMO ⅔-layer transmission mode, if only the FDM is allowed, it is possible to derive Table 31-4 from Table 31-1.

TABLE 31-4

| Index | scheduled port(s) | co-scheduled port(s) | Examples of SU/MU scheduling | comments |
|---|---|---|---|---|
| 0 | 0 | No | SU | |
| 1 | 0, 1 | No | SU | |
| 2 | 0. 1. 2 | No | SU | |
| 3 | 0. 1. 2. 3 | No | SU | |
| 4 | 0. 1. 2. 3, 4 | No | SU | 2CW, can be moved to another row |
| 5 | 0, 1, 2, 3, 4, 5 | No | SU | 2CW, can be moved to another row |
| 6 | 0 | 2 | MU (1 + 1) | |
| 7 | 0 | 2, 4 | MU (1 + 1 + 1) | |
| 8 | 0 | 1, 2, 3 | MU (1 + 1 + 2 or 1 + 1 + 1 + 1) | |
| 9 | 0 | 2, 3, 4, 5 | MU (1 + 1 + 1 + 1 + 1) | |
| 10 | 0 | 1, 2, 3, 4, 5 | MU (1 + 1 + 1 + 1 + 1 + 1) | |
| 11 | 1 | 0, 2, 3 | MU (1 + 1 + 2 or 1 + 1 + 1 + 1) | |
| 12 | 1 | 0, 2, 3, 4, 5 | MU (1 + 1 + 2 + 2, 1 + 1 + 2 + 1 + 1, 1 + 1 + 1 + 1 + 1 + 1) | |
| 13 | 2 | 0 | MU (1 + 1) | |
| 14 | 2 | 0, 4 | MU (1 + 1 + 1) | |
| 15 | 2 | 0, 1, 3 | MU (1 + 2 + 1 or 1 + 1 + 1 + 1) | |
| 16 | 2 | 0, 1, 3, 4, 5 | MU (1 + 2 + 1 + 2 or 1 + 2 + 1 + 1 + 1 or 1 + 1 + 1 + 1 + 1 + 1) | |
| 17 | 3 | 0, 1, 2 | MU (1 + 2 + 1 or 1 + 1 + 1 + 1) | |
| 18 | 3 | 0, 1, 2, 4, 5 | MU (1 + 2 + 1 + 2 or 1 + 1 + 1 + 1 + 1 + 1) | |

TABLE 31-4-continued

| Index | scheduled port(s) | co-scheduled port(s) | Examples of SU/MU scheduling | comments |
|---|---|---|---|---|
| 19 | 4 | 0, 2 | MU (1 + 1 + 1) | |
| 20 | 4 | 0, 1, 2, 3, 5 | MU (1 + 2 + 2 + 1 or 1 + 1 + 1 + 1 + 1 + 1) | |
| 21 | 5 | 0, 1, 2, 3, 4 | MU (1 + 2 + 2 + 1 or 1 + 1 + 1 + 1 + 1 + 1) | |
| 22 | 0, 1 | 2, 3 | MU (2 + 2, 2 + 1 + 1) | |
| 23 | 0, 1 | 2, 3, 4, 5 | MU (2 + 4, 2 + 2 + 1 + 1, 2 + 1 + 1 + 1 + 1) | |
| 24 | 2, 3 | 0, 1 | MU (2 + 2 or 2 + 1 + 1) | |
| 25 | 2, 3 | 0, 1, 4, 5 | MU (2 + 4 or 2 + 2 + 1 + 1 or 2 + 1 + 1 + 1 + 1) | |
| 26 | 4, 5 | 0, 1, 2, 3 | MU (2 + 4 or 2 + 2 + 1 + 1 or 2 + 1 + 1 + 1 + 1) | |
| 27 | 0, 1, 2 | 3, 4, 5 | MU (3 + 3 or 3 + 1 + 2 or 3 + 1 + 1 + 1) | can be removed |
| 28 | 3, 4, 5 | 0, 1, 2 | MU (3 + 3 or 3 + 2 + 1 or 3 + 1 + 1 + 1) | can be removed |
| 29 | 2, 3, 4, 5 | 0, 1 | MU (4 + 2 or 4 + 1 + 1) | |

When expressing Table 31-4 as co-scheduled CDM group (s) using Method 1, the DMRS table may be configured as Table 31-5.

TABLE 31-5

| Index | scheduled port(s) | co-scheduled CDM group(s) | comments |
|---|---|---|---|
| 0 | 0 | No | |
| 1 | 0, 1 | No | |
| 2 | 0. 1. 2 | No | |
| 3 | 0. 1. 2. 3 | No | |
| 4 | 0. 1. 2. 3, 4 | No | 2CW, can be moved to another row |
| 5 | 0, 1, 2, 3, 4, 5 | No | 2CW, can be moved to another row |
| 6 | 0 | CDM group 1 | |
| 7 | 0 | CDM group 0, 1 | |
| 8 | 0 | CDM group 1, 2 | |
| 9 | 0 | CDM group 0, 1, 2 | |
| 10 | 1 | CDM group 0 | |
| 11 | 1 | CDM group 0, 1 | |
| 12 | 1 | CDM group 0, 1, 2 | |
| 13 | 2 | CDM group 0 | |
| 14 | 2 | CDM group 0, 1 | |
| 15 | 2 | CDM group 0, 1, 2 | |
| 16 | 3 | CDM group 0, 1 | |
| 17 | 3 | CDM group 0, 1, 2 | |
| 18 | 4 | CDM group 0, 1, 2 | |
| 19 | 5 | CDM group 0, 1, 2 | |
| 20 | 0, 1 | CDM group 1 | |
| 21 | 0, 1 | CDM group 1, 2 | |
| 22 | 2, 3 | CDM group 0 | |
| 23 | 2, 3 | CDM group 0, 2 | |
| 24 | 4, 5 | CDM group 0, 1 | |
| 25 | 0, 1, 2 | CDM group 1, 2 | can be removed |
| 26 | 3, 4, 5 | CDM group 0, 1 | can be removed |
| 27 | 2, 3, 4, 5 | CDM group 0 | |

A description is now made of the DMRS table design method for the DMRS type2 two symbol DMRS pattern. The DMRS table design method may be implemented based on the DMRS post indexing method of part j40 of FIG. 10A. A Method 1-based DMRS table design method is disclosed. A Method 2-based DMRS design method is not used in view of DMRS signaling overhead because there are so many MU-pairing cases to be considered for the DMRS type2 two symbol DMRS pattern. By applying Method 1 to the disclosed DMRS table design principle, it is possible to derive Table 32-1. In Table 32-1, it may be possible to generate two rows and for 1-CW and 2-CW and move the indices 4 to 7 for 2-CW transmission to the row corresponding to the 2-CW transmission as described in the previous embodiment. For example, it may be possible to refer to Table 28-1. When 3-layer transmission per UE is not allowed in the MU-MIMO mode, the indices 48 to 55 may be omitted.

TABLE 32-1

| Index | scheduled port(s) | co-scheduled CDM group(s) | comment |
|---|---|---|---|
| 0 | 0 | No | |
| 1 | 0, 1 | No | |
| 2 | 0, 1, 6 | No | |
| 3 | 0, 1, 6, 7 | No | |
| 4 | 0, 1, 2, 3, 6 | No | 2CW, can be moved to another row |
| 5 | 0, 1, 2, 3, 6, 7 | No | 2CW, can be moved to another row |
| 6 | 0, 1, 2, 3, 6, 7, 8 | No | 2CW, can be moved to another row |
| 7 | 0, 1, 2, 3, 6, 7, 8, 9 | No | 2CW, can be moved to another row |
| 8 | 0 | CDM group 0 | |
| 9 | 0 | CDM group 0, 1 | |
| 10 | 0 | CDM group 1 | |
| 11 | 0 | CDM group 1, 2 | |
| 12 | 0 | CDM group 0, 1, 2 | |
| 13 | 1 | CDM group 0 | |
| 14 | 1 | CDM group 0, 1 | |
| 15 | 1 | CDM group 0, 1, 2 | |
| 16 | 2 | CDM group 0, 1 | |
| 17 | 2 | CDM group 0, 1, 2 | |
| 18 | 3 | CDM group 0, 1 | |
| 19 | 3 | CDM group 0, 1, 2 | |
| 20 | 4 | CDM group 0, 1, 2 | |
| 21 | 5 | CDM group 0, 1, 2 | |
| 22 | 6 | CDM group 0 | |
| 23 | 6 | CDM group 0, 1 | |
| 24 | 6 | CDM group 0, 1, 2 | |
| 25 | 7 | CDM group 0 | |
| 26 | 7 | CDM group 0, 1 | |
| 27 | 7 | CDM group 0, 1, 2 | |
| 28 | 8 | CDM group 0, 1 | |
| 29 | 8 | CDM group 0, 1, 2 | |
| 30 | 9 | CDM group 0, 1 | |
| 31 | 9 | CDM group 0, 1, 2 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |

TABLE 32-1-continued

| Index | scheduled port(s) | co-scheduled CDM group(s) | comment |
|---|---|---|---|
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0, 1 | |
| 41 | 4, 5 | CDM group 0, 1, 2 | |
| 42 | 6, 7 | CDM group 0 | |
| 43 | 6, 7 | CDM group 0, 1 | |
| 44 | 6, 7 | CDM group 0, 1, 2 | |
| 45 | 8, 9 | CDM group 0, 1 | |
| 46 | 8, 9 | CDM group 0, 1, 2 | |
| 47 | 10, 11 | CDM group 0, 1, 2 | |
| 48 | 0, 1, 6 | CDM group 0 | can be removed or with different port number such as 1, 6, 7 |
| 49 | 0, 1, 6 | CDM group 0, 1 | can be removed or with different port number such as 1, 6, 7 |
| 50 | 0, 1, 6 | CDM group 0, 1, 2 | can be removed or with different port number such as 1, 6, 7 |
| 51 | 2, 3, 8 | CDM group 0 | can be removed or with different port number such as 3, 8, 9 |
| 52 | 2, 3, 8 | CDM group 0, 1 | can be removed or with different port number such as 3, 8, 9 |
| 53 | 2, 3, 8 | CDM group 0, 1, 2 | can be removed or with different port number such as 3, 8, 9 |
| 54 | 4, 5, 10 | CDM group 0, 1 | can be removed or with different port number such as 5, 10, 11 |
| 55 | 4, 5, 10 | CDM group 0, 1, 2 | can be removed or with different port number such as 5, 10, 11 |
| 56 | 0, 1, 6, 7 | CDM group 1 | |
| 57 | 0, 1, 6, 7 | CDM group 1, 2 | |
| 58 | 2, 3, 8, 9 | CDM group 0, 1 | |
| 59 | 2, 3, 8, 9 | CDM group 0, 1, 2 | |
| 60 | 4, 5, 10, 11 | CDM group 0, 1, 2 | |

It may be possible to add indices 14 and 19 to Table 31-3 instead of removing the indices 10 and 11 from Table 32-1 in order to achieve the same MU-pairing effect.

TABLE 32-2

| Index | scheduled port(s) | co-scheduled CDM group(s) | comment |
|---|---|---|---|
| 0 | 0 | No | |
| 1 | 0, 1 | No | |
| 2 | 0, 1, 6 | No | |
| 3 | 0, 1, 6, 7 | No | |
| 4 | 0, 1, 2, 3, 6 | No | 2CW, can be moved to another row |
| 5 | 0, 1, 2, 3, 6, 7 | No | 2CW, can be moved to another row |
| 6 | 0, 1, 2, 3, 6, 7, 8 | No | 2CW, can be moved to another row |
| 7 | 0, 1, 2, 3, 6, 7, 8, 9 | No | 2CW, can be moved to another row |
| 8 | 0 | CDM group 0 | |
| 9 | 0 | CDM group 0, 1 | |
| 10 | 0 | CDM group 0, 1, 2 | |
| 11 | 1 | CDM group 0 | |
| 12 | 1 | CDM group 0, 1 | |
| 13 | 1 | CDM group 0, 1, 2 | |
| 14 | 2 | CDM group 0 | |
| 15 | 2 | CDM group 0, 1 | |
| 16 | 2 | CDM group 0, 1, 2 | |
| 17 | 3 | CDM group 0, 1 | |
| 18 | 3 | CDM group 0, 1, 2 | |
| 19 | 4 | CDM group 0, 1 | |
| 20 | 4 | CDM group 0, 1, 2 | |
| 21 | 5 | CDM group 0, 1, 2 | |
| 22 | 6 | CDM group 0 | |
| 23 | 6 | CDM group 0, 1 | |
| 24 | 6 | CDM group 0, 1, 2 | |
| 25 | 7 | CDM group 0 | |
| 26 | 7 | CDM group 0, 1 | |
| 27 | 7 | CDM group 0, 1, 2 | |
| 28 | 8 | CDM group 0, 1 | |
| 29 | 8 | CDM group 0, 1, 2 | |
| 30 | 9 | CDM group 0, 1 | |
| 31 | 9 | CDM group 0, 1, 2 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0, 1 | |
| 41 | 4, 5 | CDM group 0, 1, 2 | |
| 42 | 6, 7 | CDM group 0 | |
| 43 | 6, 7 | CDM group 0, 1 | |
| 44 | 6, 7 | CDM group 0, 1, 2 | |
| 45 | 8, 9 | CDM group 0, 1 | |
| 46 | 8, 9 | CDM group 0, 1, 2 | |
| 47 | 10, 11 | CDM group 0, 1, 2 | |
| 48 | 0, 1, 6 | CDM group 0 | can be removed or with different port number such as 1, 6, 7 |
| 49 | 0, 1, 6 | CDM group 0, 1 | can be removed or with different port number such as 1, 6, 7 |
| 50 | 0, 1, 6 | CDM group 0, 1, 2 | can be removed or with different port number such as 1, 6, 7 |
| 51 | 2, 3, 8 | CDM group 0 | can be removed or with different port number such as 3, 8, 9 |
| 52 | 2, 3, 8 | CDM group 0, 1 | can be removed or with different port number such as 3, 8, 9 |

TABLE 32-2-continued

| Index | scheduled port(s) | co-scheduled CDM group(s) | comment |
|---|---|---|---|
| 53 | 2, 3, 8 | CDM group 0, 1, 2 | can be removed or with different port number such as 3, 8, 9 |
| 54 | 4, 5, 10 | CDM group 0, 1 | can be removed or with different port number such as 5, 10, 11 |
| 55 | 4, 5, 10 | CDM group 0, 1, 2 | can be removed or with different port number such as 5, 10, 11 |
| 56 | 0, 1, 6, 7 | CDM group 1 | |
| 57 | 0, 1, 6, 7 | CDM group 1, 2 | |
| 58 | 2, 3, 8, 9 | CDM group 0, 1 | |
| 59 | 2, 3, 8, 9 | CDM group 0, 1, 2 | |
| 60 | 4, 5, 10, 11 | CDM group 0, 1, 2 | |

Although specific DMRS port numbers are assigned to the scheduled port(s) corresponding to the indices 4 to 6 in Tables 32-1 and 32-2, the DMRS port number assignment is not limited to that made in the tables. For example, it may be possible to schedule 5 arbitrary ports that are not allowed to be overlapped in the DMRS ports {0,1,2,3,6,7,8,9} for index 4 in Table 32-1. It may also be possible to schedule 6 arbitrary ports that are not allowed to be overlapped among the DMRS ports {0,1,2,3,6,7,8,9} for index 5. It may also be possible to schedule 7 arbitrary ports that are not allowed to be overlapped among the DMRS ports {0,1,2,3,6,7,8,9} for index 6.

When the symbol length is 1 or 2, the maximum DMRS symbol length is set to 2. Accordingly, it is possible to combine the one-symbol DMRS pattern Tables 31-1 to 31-5 and the two-symbol DMRS pattern Tables 32-1 and 32-2 into one table for indicating whether the number of symbols is 1 or 2.

When using the DMRS port indexing method of part j80 of FIG. 10B, it may be possible to derive Table 32-3 by applying Method 1 to Table 31-1.

TABLE 32-3

| Index | scheduled port(s) | co-scheduled CDM group(s) | comment |
|---|---|---|---|
| 0 | 0 | No | |
| 1 | 0, 1 | No | |
| 2 | 0, 1, 2 | No | |
| 3 | 0, 1, 2, 3 | No | |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 0, 1 | |
| 10 | 0 | CDM group 1 | |
| 11 | 0 | CDM group 1, 2 | |
| 12 | 0 | CDM group 0, 1, 2 | |
| 13 | 1 | CDM group 0 | |
| 14 | 1 | CDM group 0, 1 | |
| 15 | 1 | CDM group 0, 1, 2 | |
| 16 | 2 | CDM group 0 | |
| 17 | 2 | CDM group 0, 1 | |
| 18 | 2 | CDM group 0, 1, 2 | |
| 19 | 3 | CDM group 0 | |
| 20 | 3 | CDM group 0, 1 | |
| 21 | 3 | CDM group 0, 1, 2 | |
| 22 | 4 | CDM group 0, 1 | |
| 23 | 4 | CDM group 0, 1, 2 | |
| 24 | 5 | CDM group 0, 1 | |
| 25 | 5 | CDM group 0, 1, 2 | |
| 26 | 6 | CDM group 0, 1 | |
| 27 | 6 | CDM group 0, 1, 2 | |
| 28 | 7 | CDM group 0, 1 | |
| 29 | 7 | CDM group 0, 1, 2 | |
| 30 | 8 | CDM group 0, 1, 2 | |
| 31 | 9 | CDM group 0, 1, 2 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0 | |
| 41 | 4, 5 | CDM group 0, 1 | |
| 42 | 4, 5 | CDM group 0, 1, 2 | |
| 43 | 6, 7 | CDM group 0, 1 | |
| 44 | 6, 7 | CDM group 0, 1, 2 | |
| 45 | 8, 9 | CDM group 0, 1 | |
| 46 | 8, 9 | CDM group 0, 1, 2 | |
| 47 | 10, 11 | CDM group 0, 1, 2 | |
| 48 | 0, 1, 2 | CDM group 0 | can be removed or with different port number such as 1, 2, 3 |
| 49 | 0, 1, 2 | CDM group 0, 1 | can be removed or with different port number such as 1, 2, 3 |
| 50 | 0, 1, 2 | CDM group 0, 1, 2 | can be removed or with different port number such as 1, 2, 3 |
| 51 | 4, 5, 6 | CDM group 0 | can be removed or with different port number such as 5, 6, 7 |
| 52 | 4, 5, 6 | CDM group 0, 1 | can be removed or with different port number such as 5, 6, 7 |
| 53 | 4, 5, 6 | CDM group 0, 1, 2 | can be removed or with different port number such as 5, 6, 7 |
| 54 | 8, 9, 10 | CDM group 0, 1 | can be removed or with different port number such as 9, 10, 11 |
| 55 | 8, 9, 10 | CDM group 0, 1, 2 | can be removed or with different port number such as 9, 10, 11 |
| 56 | 0, 1, 2, 3 | CDM group 1 | |
| 57 | 0, 1, 2, 3 | CDM group 1, 2 | |
| 58 | 4, 5, 6, 7 | CDM group 0, 1 | |

TABLE 32-3-continued

| Index | scheduled port(s) | co-scheduled CDM group(s) | comment |
|---|---|---|---|
| 59 | 4, 5, 6, 7 | CDM group 0, 1, 2 | |
| 60 | 8, 9, 10, 11 | CDM group 0, 1, 2 | |

When using the DMRS port indexing method of part j80 of FIG. 10B, it may be possible to derive Table 32-4 by applying Method 1 to Table 32-2.

TABLE 32-4

| Index | scheduled port(s) | co-scheduled CDM group(s) | comment |
|---|---|---|---|
| 0 | 0 | No | |
| 1 | 0, 1 | No | |
| 2 | 0, 1, 2 | No | |
| 3 | 0, 1, 2, 3 | No | |
| 4 | 0, 1, 2, 3, 4 | No | 2CW, can be moved to another row |
| 5 | 0, 1, 2, 3, 4, 5 | No | 2CW, can be moved to another row |
| 6 | 0, 1, 2, 3, 4, 5, 6 | No | 2CW, can be moved to another row |
| 7 | 0, 1, 2, 3, 4, 5, 6, 7 | No | 2CW, can be moved to another row |
| 8 | 0 | CDM group 0 | |
| 9 | 0 | CDM group 0, 1 | |
| 10 | 0 | CDM group 0, 1, 2 | |
| 11 | 1 | CDM group 0 | |
| 12 | 1 | CDM group 0, 1 | |
| 13 | 1 | CDM group 0, 1, 2 | |
| 14 | 2 | CDM group 0 | |
| 15 | 2 | CDM group 0, 1 | |
| 16 | 2 | CDM group 0, 1, 2 | |
| 17 | 3 | CDM group 0 | |
| 18 | 3 | CDM group 0, 1 | |
| 19 | 3 | CDM group 0, 1, 2 | |
| 20 | 4 | CDM group 0 | |
| 21 | 4 | CDM group 0, 1 | |
| 22 | 4 | CDM group 0, 1, 2 | |
| 23 | 5 | CDM group 0, 1 | |
| 24 | 5 | CDM group 0, 1, 2 | |
| 25 | 6 | CDM group 0, 1 | |
| 26 | 6 | CDM group 0, 1, 2 | |
| 27 | 7 | CDM group 0, 1 | |
| 28 | 7 | CDM group 0, 1, 2 | |
| 29 | 8 | CDM group 0, 1 | |
| 30 | 8 | CDM group 0, 1, 2 | |
| 31 | 9 | CDM group 0, 1, 2 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0, 1 | |
| 41 | 4, 5 | CDM group 0, 1, 2 | |
| 42 | 4, 5 | CDM group 0 | |
| 43 | 6, 7 | CDM group 0, 1 | |
| 44 | 6, 7 | CDM group 0, 1, 2 | |
| 45 | 8, 9 | CDM group 0, 1 | |
| 46 | 8, 9 | CDM group 0, 1, 2 | |
| 47 | 10, 11 | CDM group 0, 1, 2 | |
| 48 | 0, 1, 2 | CDM group 0 | can be removed or with different port numbersuch as 1, 2, 3 |
| 49 | 0, 1, 2 | CDM group 0, 1 | can be removed or with different port number such as 1, 2, 3 |
| 50 | 0, 1, 2 | CDM group 0, 1, 2 | can be removed or with different port number such as 1, 2, 3 |
| 51 | 4, 5, 6 | CDM group 0 | can be removed or with different port number such as 5, 6, 7 |
| 52 | 4, 5, 6 | CDM group 0, 1 | can be removed or with different port number such as 5, 6, 7 |
| 53 | 4, 5, 6 | CDM group 0, 1, 2 | can be removed or with different port number such as 5, 6, 7 |
| 54 | 8, 9, 10 | CDM group 0, 1 | can be removed or with different port number such as 9, 10, 11 |
| 55 | 8, 9, 10 | CDM group 0, 1, 2 | can be removed or with different port number such as 9, 10, 11 |
| 56 | 0, 1, 2, 3 | CDM group 1 | |
| 57 | 0, 1, 2, 3 | CDM group 1, 2 | |
| 58 | 4, 5, 6, 7 | CDM group 0, 1 | |
| 59 | 4, 5, 6, 7 | CDM group 0, 1, 2 | |
| 60 | 8, 9, 10, 11 | CDM group 0, 1, 2 | |

When using the DMRS port indexing method of part j120 of FIG. 10C, it may be possible to derive Table 32-5 by applying Method 1 to Table 32-1.

TABLE 32-5

| Index | scheduled port(s) | co-scheduled CDM group(s) | comment |
|---|---|---|---|
| 0 | 0 | No | |
| 1 | 0, 1 | No | |
| 2 | 0, 1, 6 | No | |
| 3 | 0, 1, 6, 9 | No | |
| 4 | 0, 1, 2, 6, 9 | No | 2CW, can be moved to another row |
| 5 | 0, 1, 2, 3, 6, 9 | No | 2CW, can be moved to another row |
| 6 | 0, 1, 2, 3, 6, 7, 9 | No | 2CW, can be moved to another row |
| 7 | 0, 1, 2, 3, 6, 7, 9, 10 | No | 2CW, can be moved to another row |
| 8 | 0 | CDM group 0 | |
| 9 | 0 | CDM group 0, 1 | |
| 10 | 0 | CDM group 1 | |
| 11 | 0 | CDM group 1, 2 | |
| 12 | 0 | CDM group 0, 1, 2 | |
| 13 | 1 | CDM group 0 | |
| 14 | 1 | CDM group 0, 1 | |
| 15 | 1 | CDM group 0, 1, 2 | |
| 16 | 2 | CDM group 0, 1 | |

TABLE 32-5-continued

| Index | scheduled port(s) | co-scheduled CDM group(s) | comment |
|---|---|---|---|
| 17 | 2 | CDM group 0, 1, 2 | |
| 18 | 3 | CDM group 0, 1 | |
| 19 | 3 | CDM group 0, 1, 2 | |
| 20 | 4 | CDM group 0, 1, 2 | |
| 21 | 5 | CDM group 0, 1, 2 | |
| 22 | 6 | CDM group 0 | |
| 23 | 6 | CDM group 0, 1 | |
| 24 | 6 | CDM group 0, 1, 2 | |
| 25 | 7 | CDM group 0, 1 | |
| 26 | 7 | CDM group 0, 1, 2 | |
| 27 | 8 | CDM group 0, 1, 2 | |
| 28 | 9 | CDM group 0 | |
| 29 | 9 | CDM group 0, 1 | |
| 30 | 9 | CDM group 0, 1, 2 | |
| 31 | 10 | CDM group 0, 1 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0, 1 | |
| 41 | 4, 5 | CDM group 0, 1, 2 | |
| 42 | 6, 9 | CDM group 0 | |
| 43 | 6, 9 | CDM group 0, 1 | |
| 44 | 6, 9 | CDM group 0, 1, 2 | |
| 45 | 7, 10 | CDM group 0, 1 | |
| 46 | 7, 10 | CDM group 0, 1, 2 | |
| 47 | 10, 11 | CDM group 0, 1, 2 | |
| 48 | 0, 1, 6 | CDM group 0 | can be removed or with different port number such as 1, 2, 3 |
| 49 | 0, 1, 6 | CDM group 0, 1 | can be removed or with different port number such as 1, 2, 3 |
| 50 | 0, 1, 6 | CDM group 0, 1, 2 | can be removed or with different port number such as 1, 2, 3 |
| 51 | 2, 3, 7 | CDM group 0 | can be removed or with different port number such as 5, 6, 7 |
| 52 | 2, 3, 7 | CDM group 0, 1 | can be removed or with different port number such as 5, 6, 7 |
| 53 | 2, 3, 7 | CDM group 0, 1, 2 | can be removed or with different port number such as 5, 6, 7 |
| 54 | 4, 5, 8 | CDM group 0, 1 | can be removed or with different port number such as 9, 10, 11 |
| 55 | 4, 5, 8 | CDM group 0, 1, 2 | can be removed or with different port number such as 9, 10, 11 |
| 56 | 0, 1, 6, 9 | CDM group 1 | |
| 57 | 0, 1, 6, 9 | CDM group 1, 2 | |
| 58 | 2, 3, 7, 10 | CDM group 0, 1 | |
| 59 | 2, 3, 7, 10 | CDM group 0, 1, 2 | |
| 60 | 4, 5, 8, 11 | CDM group 0, 1, 2 | |

When using the DMRS port indexing method of part j120 of FIG. 10C, it may be possible to derive Table 32-6 by applying Method 1 to Table 32-2.

TABLE 32-6

| Index | scheduled port(s) | co-scheduled CDM group(s) | comment |
|---|---|---|---|
| 0 | 0 | No | |
| 1 | 0, 1 | No | |
| 2 | 0, 1, 6 | No | |
| 3 | 0, 1, 6, 9 | No | |
| 4 | 0, 1, 2, 6, 9 | No | 2CW, can be moved to another row |
| 5 | 0, 1, 2, 3, 6, 9 | No | 2CW, can be moved to another row |
| 6 | 0, 1, 2, 3, 6, 7, 9 | No | 2CW, can be moved to another row |
| 7 | 0, 1, 2, 3, 6, 7, 9, 10 | No | 2CW, can be moved to another row |
| 8 | 0 | CDM group 0 | |
| 9 | 0 | CDM group 0, 1 | |
| 10 | 0 | CDM group 0, 1, 2 | |
| 11 | 1 | CDM group 0 | |
| 12 | 1 | CDM group 0, 1 | |
| 13 | 1 | CDM group 0, 1, 2 | |
| 14 | 2 | CDM group 0 | |
| 15 | 2 | CDM group 0, 1 | |
| 16 | 2 | CDM group 0, 1, 2 | |
| 17 | 3 | CDM group 0, 1 | |
| 18 | 3 | CDM group 0, 1, 2 | |
| 19 | 4 | CDM group 0, 1 | |
| 20 | 4 | CDM group 0, 1, 2 | |
| 21 | 5 | CDM group 0, 1, 2 | |
| 22 | 6 | CDM group 0 | |
| 23 | 6 | CDM group 0, 1 | |
| 24 | 6 | CDM group 0, 1, 2 | |
| 25 | 7 | CDM group 0, 1 | |
| 26 | 7 | CDM group 0, 1, 2 | |
| 27 | 8 | CDM group 0, 1, 2 | |
| 28 | 9 | CDM group 0 | |
| 29 | 9 | CDM group 0, 1 | |
| 30 | 9 | CDM group 0, 1, 2 | |
| 31 | 10 | CDM group 0, 1 | |
| 32 | 10 | CDM group 0, 1, 2 | |
| 33 | 11 | CDM group 0, 1, 2 | |
| 34 | 0, 1 | CDM group 0 | |
| 35 | 0, 1 | CDM group 0, 1 | |
| 36 | 0, 1 | CDM group 0, 1, 2 | |
| 37 | 2, 3 | CDM group 0 | |
| 38 | 2, 3 | CDM group 0, 1 | |
| 39 | 2, 3 | CDM group 0, 1, 2 | |
| 40 | 4, 5 | CDM group 0, 1 | |
| 41 | 4, 5 | CDM group 0, 1, 2 | |
| 42 | 6, 9 | CDM group 0 | |
| 43 | 6, 9 | CDM group 0, 1 | |
| 44 | 6, 9 | CDM group 0, 1, 2 | |
| 45 | 7, 10 | CDM group 0, 1 | |
| 46 | 7, 10 | CDM group 0, 1, 2 | |
| 47 | 10, 11 | CDM group 0, 1, 2 | |
| 48 | 0, 1, 6 | CDM group 0 | can be removed or with different port number such as 1, 2, 3 |
| 49 | 0, 1, 6 | CDM group 0, 1 | can be removed or with different port number such as 1, 2, 3 |

TABLE 32-6-continued

| Index | scheduled port(s) | co-scheduled CDM group(s) | comment |
|---|---|---|---|
| 50 | 0, 1, 6 | CDM group 0, 1, 2 | can be removed or with different port number such as 1, 2, 3 |
| 51 | 2, 3, 7 | CDM group 0 | can be removed or with different port number such as 5, 6, 7 |
| 52 | 2, 3, 7 | CDM group 0, 1 | can be removed or with different port number such as 5, 6, 7 |
| 53 | 2, 3, 7 | CDM group 0, 1, 2 | can be removed or with different port number such as 5, 6, 7 |
| 54 | 4, 5, 8 | CDM group 0, 1 | can be removed or with different port number such as 9, 10, 11 |
| 55 | 4, 5, 8 | CDM group 0, 1, 2 | can be removed or with different port number such as 9, 10, 11 |
| 56 | 0, 1, 6, 9 | CDM group 1 | |
| 57 | 0, 1, 6, 9 | CDM group 1, 2 | |
| 58 | 2, 3, 7, 10 | CDM group 0, 1 | |
| 59 | 2, 3, 7, 10 | CDM group 0, 1, 2 | |
| 60 | 4, 5, 8, 11 | CDM group 0, 1, 2 | |

When the symbol length is 1 or 2, the maximum DMRS symbol length is set to 2. Accordingly, it is possible to combine the one-symbol DMRS pattern Tables 31-1 to 31-5 and the two-symbol DMRS pattern Tables 32-3 to 32-6 into one table for indicating whether the number of symbols is 1 or 2.

It should be noted that the indices may be mapped in the opposite order in all of the tables of the above embodiments. For example, it may be possible to map the index 8 to a port after mapping the index 0 to a port in Table 30-1.

A description is now made of the UE operation for interpreting the DMRS table according to the disclosed DMRS type1/type2 and one-symbol and two-symbol DMRS patterns.

Figure 12:
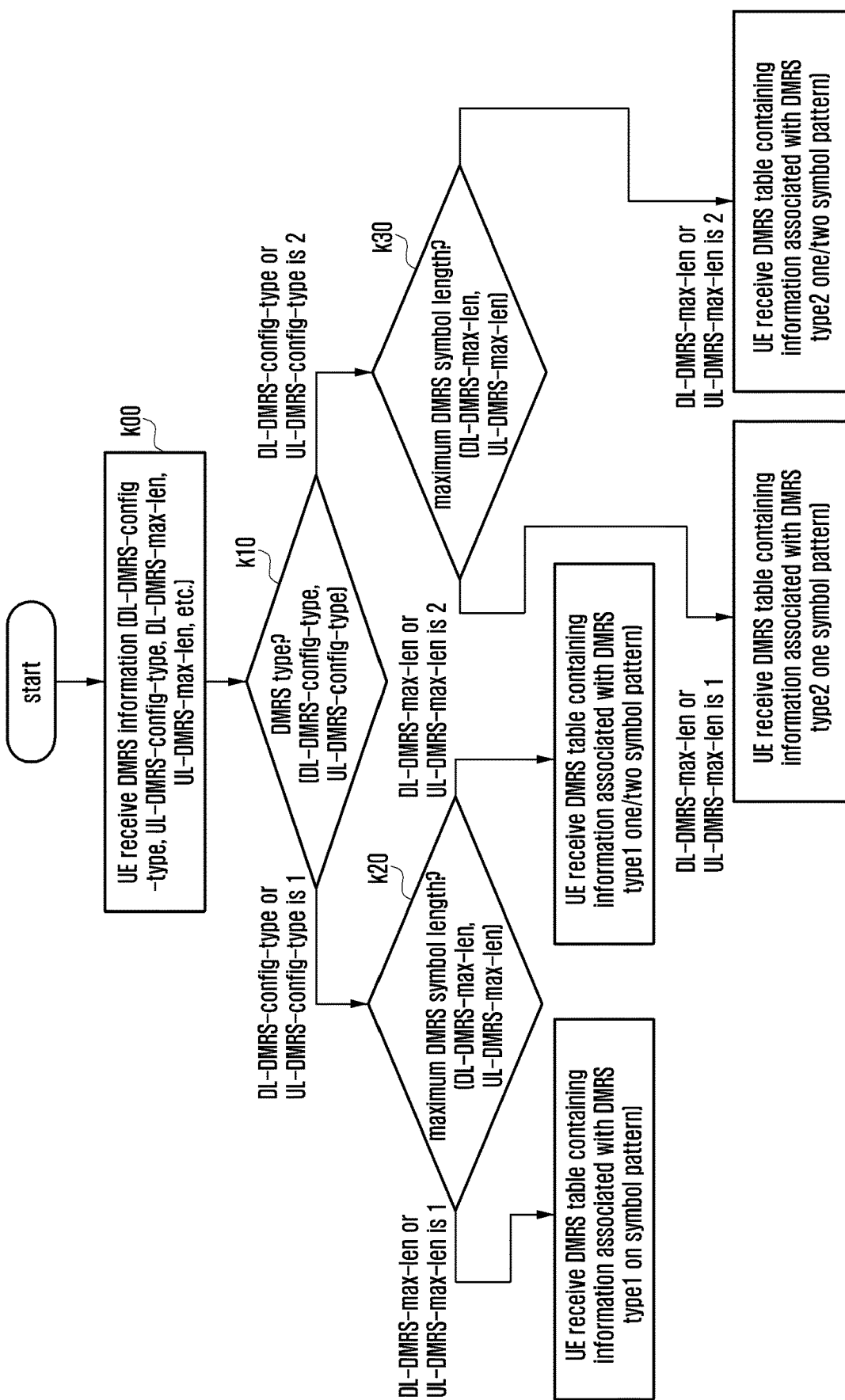
FIG. 12 is a flowchart of a DMRS table interpretation method of a UE, according to an embodiment.

As shown in FIG. 12, the UE receives DMRS information at step k00. As described above, the DMRS information may include DMRS type information (DL-DMRS-config-type and UL-DMRS-config-type) and maximum DMRS symbol length (DL-DMRS-max-len and UL-DMRS-max-len) configured by higher layers.

The UE interprets the DMRS Type information at step k10. If the DMRS type information indicates DMRS type1 (DL-DMRS-config-type or UL-DMRS-config-type is 1), the UE interprets the maximum DMRS symbol length information at step k20. If the DMRS type information indicates DMRS type2 (DL-DMRS-config-type or UL-DMRS-config-type is 2), the UE interprets the maximum DMRS symbol length information at step k30. If it is determined at step k20 that the maximum DMRS symbol length is set to 1 (DL-DMRS-max-len or UL-DMRS-max-len is 1), the UE receives a DMRS table containing the information associated with the DMRS type1 one symbol pattern. Otherwise, if it is determined that the maximum DMRS symbol length is set to 2 (DL-DMRS-max-len or UL-DMRS-max-len is 2), the UE receives a DMRS table containing the information associated with the DMRS type1 one/two symbol pattern.

If it is determined at step k30 that the maximum DMRS symbol length is set to 1 (DL-DMRS-max-len or UL-DMRS-max-len is 1), the UE receives a DMRS table containing information associated with the DMRS type2 one symbol pattern. Otherwise, if it is determined that the maximum DMRS symbol length is set to 2 (DL-DMRS-max-len or UL-DMRS-max-len is 2), the UE receives a DMRS table containing information associated with the DMRS type2 one/two symbol pattern.

It should be noted that step k10 for interpreting the DMRS type information and steps k20 and k30 for interpreting the maximum DMRS type information may be performed in reverse order. The seventh embodiment is directed to the methods for designing a DMRS table containing information on the DMRS ports for a user co-scheduled with the target user, particularly two methods as follows:

Method 1: Include only co-scheduled DMRS CDM group information; and

Method 2: Include co-scheduled DMRS port information.

The seventh embodiment is directed to the DMRS tables generated by the above two methods. Method 1 has a shortcoming in that the UE cannot obtain accurate co-scheduled DMRS port information but is advantageous in terms of reduction of DMRS information signaling overhead. Method 2 is advantageous in that the UE is capable of processing MU-MIMO interference efficiently with the accurate co-scheduled DMRS port information but disadvantageous in terms of high DMRS information signaling overhead because of a large number of MU-pairing cases.

Figure 13:
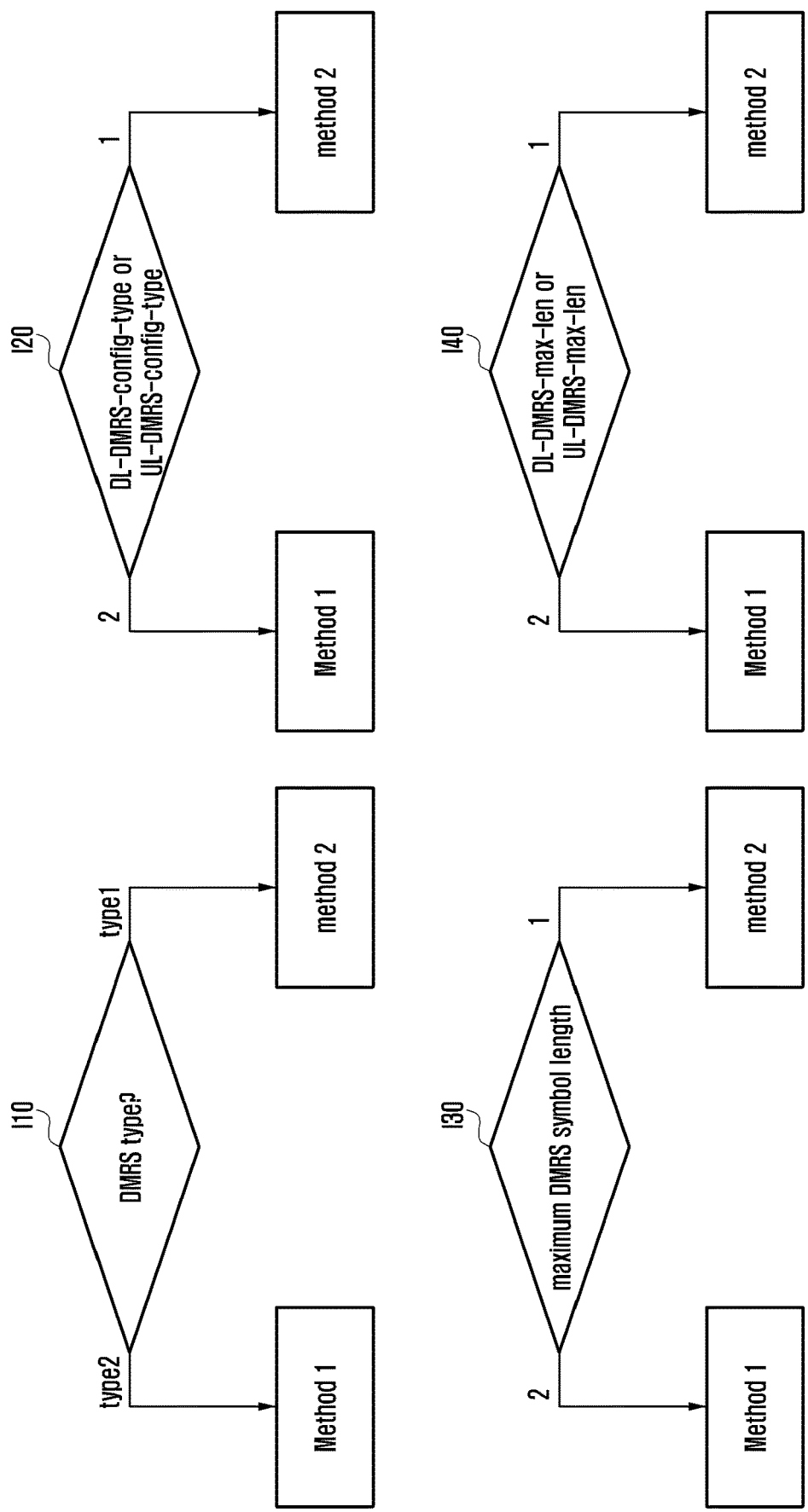
FIG. 13 is a flowchart of a method for selecting a DMRS table determination method, according to an embodiment.

In this respect, there may be a need of a method for determining the DMRS table for Method 1 and Method 2 according to the DMRS type or maximum DMRS symbol length as shown in FIG. 13. Part 110 of FIG. 13 depicts a method for selecting a DMRS table determination method according to the DMRS type. Typically, the number of MU-pairings to be considered is large in the DMRS type2 because DMRS type2 supports up to 12 orthogonal DMRS ports for MU-MIMO while DMRS type1 supports up to 8 orthogonal DMRS ports for MU-MIMO.

Accordingly, it is possible to reduce the DMRS signaling overhead by applying Method 1 for the case where the configuration is made with DMRS type2. In the case where the configuration is made with DMRS type1, it may be possible to transmit the accurate co-scheduled DMRS port information by applying Method 2. Part 120 of FIG. 13 shows a method for selecting a DMRS table determination method based on a parameter such as DMRS type indicator (DL-DMRS-config-type or UL-DMRS-config-type) defined in RRC according to the agreement of 3GPP.

It may also be possible to consider an alternative method for selecting a DMRS table determination method according to the maximum DMRS symbol length. Part 130 of FIG. 13 depicts a DMRS table determination method based on the maximum DMRS symbol length. Typically, the two-symbol DMRS pattern has a large number of DMRS ports twice that of the one-symbol DMRS pattern and, if both the one-symbol and two-symbol DMRS patterns are simultaneously transmitted, the signaling overhead increases significantly. Accordingly, when the maximum DMRS symbol length is set to 2, it is possible to reduce the DMRS signaling overhead by applying Method 1. When the maximum DMRS symbol length is set to 1, it is possible to transmit the accurate co-scheduled DMRS port information by applying Method 2. Part 140 of FIG. 13 shows a method for selecting a DMRS table determination method based on the signaling parameter such as the maximum DMRS symbol length (DL-DMRS-max-len or UL-DMRS-max-len) defined in RRC according to the agreement in 3GPP.

Figure 14:
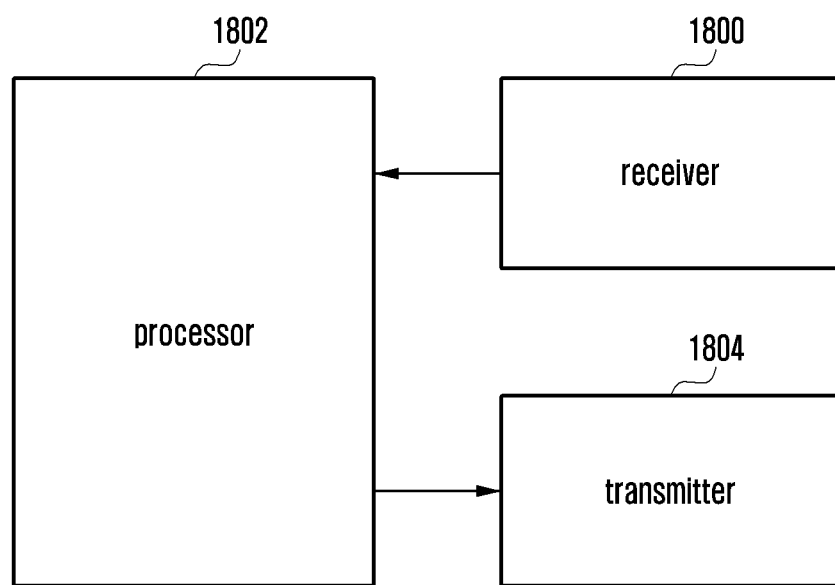
FIG. 14 is a diagram of a UE, according to an embodiment.
Figure 15:
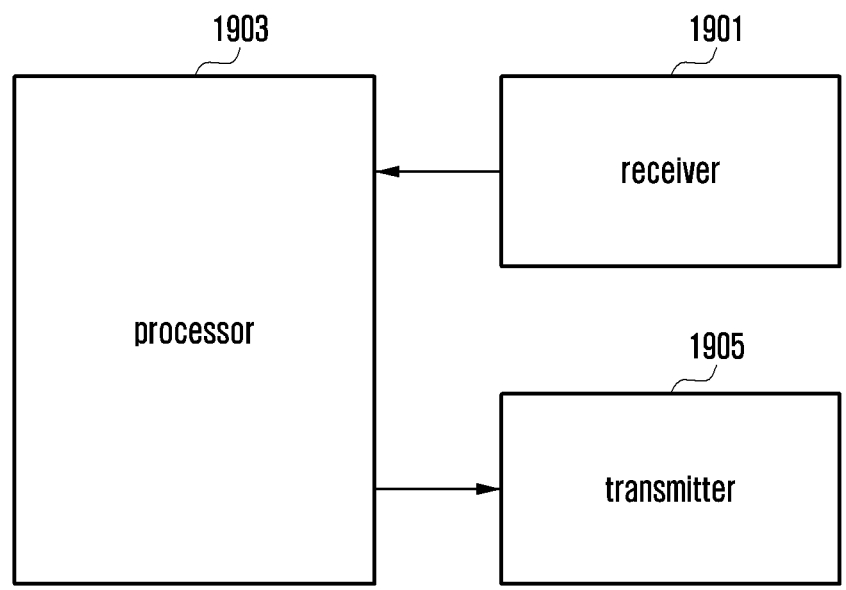
FIG. 15 is a diagram of a gNB, according to an embodiment.

FIGS. 14 and 15 depict a UE and a gNB comprising a transmitter, a receiver, and a processor each for performing the operations described in the above embodiments. The first to fourth embodiments are directed to the methods for configuring DMRS patterns, generating DMRS information at the gNB, and communicating between the gNB and the UE. The receivers, processors, and transmitters of the gNB and UE are configured to perform the above herein described operations and methods.

FIG. 14 is a diagram of a UE, according to an embodiment. As shown in FIG. 14, the UE includes a receiver 1800, a transmitter 1804, and a processor 1802. The receiver 1800 and the transmitter 1804 are herein collectively referred to as transceiver. The transceiver may transmit and receive signals to and from a gNB. The signals may include control information and data. The transceiver may include a radio frequency (RF) transmitter for frequency up-converting and amplifying the signal to be transmitted and an RF receiver for low noise amplifying and frequency down-converting the received signal. The transceiver may output the signal received over a radio channel to the processor 1802 and transmit the signal output from the processor 1802 over the radio channel. The processor 1802 may control overall operations of the UE. For example, the processor 1802 may control the receiver 1800 to receive a reference signal transmitted by the gNB and interpret a reference signal application scheme, as described above. The transmitter 1804 may also transmit a reference signal.

FIG. 15 is a diagram of a gNB, according to an embodiment. As shown in FIG. 15, the gNB includes a receiver 1901, a transmitter 1905, and a processor 1903. The receiver 1901 and the transmitter 1905 are herein collectively referred to as transceiver. The transceiver may transmit and receive signals to and from a UE. The signals may include control information and data. The transceiver may include an RF transmitter for frequency up-converting and amplifying the signal to be transmitted and an RF receiver for low noise amplifying and frequency down-converting the received signal. The transceiver may output the signal received over a radio channel to the processor 1903 and transmit the signal output from the processor 1903 over the radio channel. The processor 1903 may control overall operations of the gNB. For example, the processor 1903 may configure a reference signal pattern and generate information on the reference signal to be transmitted to the UE. The transmitter 1905 may transmit the reference signal information to the UE, and the receiver 1901 may receive a reference signal transmitted by the UE.

As described above, the DMRS generation and DMRS information signaling method of the disclosure is advantageous over conventional DMRS signaling methods typically used in 3GPP/4GPP communication by utilizing radio resources efficiently.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
identifying demodulation reference signal (DMRS) type information and DMRS symbol length information;
receiving downlink control information (DCI) including antenna port information;
determining DMRS port information for receiving a DMRS based on the antenna port information included in the DCI according to the DMRS type information and the DMRS symbol length information;
identifying parameters including at least one of code division multiplexing (CDM) group information, offset information, frequency-domain orthogonal cover code (OCC) information, or time-domain OCC information corresponding to the determined DMRS port information based on the DMRS type information; and
receiving the DMRS based on the DMRS port information and the parameters,
wherein, in case that the DMRS type information is a DMRS type 1, the parameters are identified based on Table 1:

TABLE 1

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

2. The method of claim 1, wherein, in case that the DMRS type information is a DMRS type 2, the parameters are identified based on Table 2:

TABLE 2

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

3. The method of claim 1, wherein the DMRS type for the terminal is indicated based on the DMRS type information as one of the DMRS type 1 or a DMRS type 2.

4. The method of claim 1, wherein the DMRS symbol length information corresponds to a DMRS symbol length of 1 or 2.

5. The method of claim 1, wherein the DMRS type information is identified based on a radio resource control (RRC) message.

6. A terminal in a wireless communication system, the terminal comprising:
a transceiver; and
a controller operably connected to the transceiver and configured to:
identify demodulation reference signal (DMRS) type information and DMRS symbol length information,
control the transceiver to receive downlink control information (DCI) including antenna port information,
determine DMRS port information for receiving a DMRS based on the antenna port information included in the DCI according to the DMRS type information and the DMRS symbol length information;
identify parameters including at least one of code division multiplexing (CDM) group information, offset information, frequency-domain orthogonal cover code (OCC) information, or time-domain OCC information corresponding to the determined DMRS port information based on the DMRS type information; and
receive, via the transceiver, the DMRS based on the DMRS port information and the parameters,
wherein, in case that the DMRS type information is a DMRS type 1, the parameters are identified based on Table 1:

TABLE 1

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

7. The terminal of claim 6, wherein, in case that the DMRS type information is a DMRS type 2, the parameters are identified based on Table 2:

TABLE 2

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |

TABLE 2-continued

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

8. The terminal of claim 6, wherein the DMRS type for the terminal is indicated based on the DMRS type information as one of the DMRS type 1 or a DMRS type 2.

9. The terminal of claim 6, wherein the DMRS symbol length information corresponds to a DMRS symbol length of 1 or 2.

10. The terminal of claim 6, wherein the DMRS type information is identified based on a radio resource control (RRC) message.

11. A method performed by a base station in a wireless communication system, the method comprising:
transmitting a message associated with demodulation reference signal (DMRS) type information and DMRS symbol length information;
transmitting downlink control information (DCI) including antenna port information for receiving a DMRS by a terminal; and
transmitting the DMRS to the terminal based on the message and the DCI,
wherein DMRS port information is determined based on the antenna port information included in the DCI according to the DMRS type information and the DMRS symbol length information,
wherein parameters including at least one of code division multiplexing (CDM) group information, offset information, frequency-domain orthogonal cover code (OCC) information, and time-domain OCC information corresponding to the determined DMRS port information, are identified based on the DMRS type information,
wherein, in case that the DMRS type information is a DMRS type 1, the parameters are identified based on Table 1:

TABLE 1

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

12. The method of claim 11, wherein, in case that the DMRS type information is a DMRS type 2, the parameters are identified based on Table 2:

TABLE 2

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

13. The method of claim 11, wherein the DMRS type for the terminal is indicated based on the DMRS type information as one of the DMRS type 1 or a DMRS type 2.

14. The method of claim 11, wherein the DMRS symbol length information corresponds to a DMRS symbol length of 1 or 2.

15. The method of claim 11, wherein the DMRS type information is identified based on a radio resource control (RRC) message.

16. A base station in a wireless communication system, the base station comprising:
a transceiver; and
a controller operably connected to the transceiver and configured to control the transceiver to:
transmit a message associated with demodulation reference signal (DMRS) type information and DMRS symbol length information,
transmit downlink control information (DCI) including antenna port information for receiving a DMRS by a terminal, and
transmit the DMRS to the terminal based on the message and the DCI,
wherein DMRS port information is determined based on the antenna port information included in the DCI according to the DMRS type information and the DMRS symbol length information, wherein parameters including at least one of code division multiplexing (CDM) group information, offset information, frequency-domain orthogonal cover code (OCC) information, or time-domain OCC information corresponding to the determined DMRS port information, are identified based on the DMRS type information,
wherein, in case that the DMRS type information is a DMRS type 1, the parameters are identified based on Table 1:

TABLE 1

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

17. The base station of claim 16, wherein, in case that the DMRS type information is a DMRS type 2, the parameters are identified based on Table 2:

TABLE 2

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 | wherein p corresponds to the DMRS port information, Δ is corresponds to the offset information, $w_f(k')$ corresponds to the frequency-domain OCC information, and $w_t(l')$ corresponds to the time-domain OCC information.

18. The base station of claim 16, wherein the DMRS type for the terminal is indicated based on the DMRS type information as one of the DMRS type 1 or a DMRS type 2.

19. The base station of claim 16, wherein the DMRS symbol length information corresponds to a DMRS symbol length of 1 or 2.

20. The base station of claim 16, wherein the DMRS type information is identified based on a radio resource control (RRC) message.

* * * * *